United States Patent
Tokuda et al.

(10) Patent No.: US 8,673,489 B2
(45) Date of Patent: Mar. 18, 2014

(54) NONAQUEOUS ELECTROLYTIC SOLUTION AND NONAQEUOUS-ELECTROLYTE SECONDARY BATTERY

(75) Inventors: Hiroyuki Tokuda, Kanagawa (JP); Hiroaki Yoshida, Ibaraki (JP); Atsushi Watarai, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 8 days.

(21) Appl. No.: 13/572,799

(22) Filed: Aug. 13, 2012

(65) Prior Publication Data

US 2012/0308881 A1 Dec. 6, 2012

Related U.S. Application Data

(63) Continuation of application No. PCT/JP2011/052944, filed on Feb. 10, 2011.

(30) Foreign Application Priority Data

Feb. 12, 2010 (JP) ................................ 2010-029484

(51) Int. Cl.
*H01M 6/04* (2006.01)

(52) U.S. Cl.
USPC ............................................ 429/199; 429/188

(58) Field of Classification Search
USPC ............................................................. 429/199
See application file for complete search history.

(56) References Cited

U.S. PATENT DOCUMENTS

| | | | |
|---|---|---|---|
| 6,013,394 A | 1/2000 | Gan et al. | |
| 6,180,283 B1 | 1/2001 | Gan et al. | |
| 6,265,106 B1 | 7/2001 | Gan et al. | |
| 6,350,546 B1 | 2/2002 | Gan et al. | |
| 6,444,360 B2 | 9/2002 | Gan et al. | |
| 7,807,301 B2 | 10/2010 | Wu et al. | |
| 7,960,061 B2 | 6/2011 | Jost et al. | |
| 8,124,279 B2 | 2/2012 | Petrat et al. | |
| 8,173,305 B2 | 5/2012 | Holzapfel et al. | |
| 2007/0059588 A1* | 3/2007 | Lee et al. ........................ | 429/65 |
| 2007/0287071 A1* | 12/2007 | Chiga et al. ................... | 429/332 |
| 2008/0118833 A1* | 5/2008 | Ueda et al. ..................... | 429/209 |
| 2008/0145761 A1* | 6/2008 | Petrat et al. ................. | 429/231.8 |
| 2008/0220335 A1* | 9/2008 | Casteel ......................... | 429/327 |
| 2009/0155697 A1* | 6/2009 | Park et al. ..................... | 429/339 |
| 2009/0214946 A1* | 8/2009 | Shen et al. .................... | 429/176 |
| 2009/0286159 A1* | 11/2009 | Nuspl et al. ................... | 429/221 |
| 2009/0325058 A1* | 12/2009 | Katayama et al. ............. | 429/142 |
| 2010/0099031 A1 | 4/2010 | Kato et al. | |
| 2010/0119956 A1 | 5/2010 | Tokuda et al. | |
| 2012/0244425 A1 | 9/2012 | Tokuda | |

FOREIGN PATENT DOCUMENTS

| | | |
|---|---|---|
| JP | 07-296849 | 11/1995 |
| JP | 2000-077098 | 3/2000 |
| JP | 2001-176548 | 6/2001 |
| JP | 2007-534118 | 11/2007 |
| JP | 2007-534122 | 11/2007 |
| JP | 2008-532912 | 8/2008 |
| JP | 2008-544457 | 12/2008 |
| JP | 2009-302058 | 12/2009 |
| JP | 2010-140959 | 6/2010 |

OTHER PUBLICATIONS

International Search Report issued May 17, 2011 in PCT/JP2011/052944 filed Feb. 10, 2011.
U.S. Appl. No. 13/619,147, filed Sep. 14, 2012, Tokuda, et al.
U.S. Appl. No. 13/846,254, filed Mar. 18, 2013, Tokuda, et al.

* cited by examiner

*Primary Examiner* — Ula C Ruddock
*Assistant Examiner* — Jacob Marks
(74) *Attorney, Agent, or Firm* — Oblon, Spivak, McClelland, Maier & Neustadt, L.L.P.

(57) ABSTRACT

An object of the invention is to provide a nonaqueous electrolytic solution which is capable of bringing about a nonaqueous-electrolyte secondary battery improved in initial charge capacity, input/output characteristics, and impedance characteristics. The invention relates to a nonaqueous electrolytic solution which comprises: a nonaqueous solvent; $LiPF_6$; and a specific fluorosulfonic acid salt, and to a nonaqueous-electrolyte secondary battery containing the nonaqueous electrolytic solution.

30 Claims, No Drawings

NONAQUEOUS ELECTROLYTIC SOLUTION AND NONAQEUOUS-ELECTROLYTE SECONDARY BATTERY

TECHNICAL FIELD

The present invention relates to a nonaqueous electrolytic solution and a nonaqueous-electrolyte secondary battery. More particularly, the invention relates to a nonaqueous electrolytic solution in which $LiPF_6$ and $M(FSO_3)_x$ are used in combination in a specific proportion as electrolytes, and to a nonaqueous-electrolyte secondary battery which employs this nonaqueous electrolytic solution.

BACKGROUND ART

Nonaqueous-electrolyte secondary batteries including lithium secondary batteries are being put to practical use in extensive applications ranging from power sources for applications for so-called public use, such as portable telephones and notebook type personal computers, to vehicle-mounted power sources for driving motor vehicles or the like and stationary large power sources or the like. However, recent nonaqueous-electrolyte secondary batteries are increasingly required to have higher performance, and are required to attain battery characteristics, such as, for example, high capacity, high output, high-temperature storability, and cycle characteristics, on a high level.

Especially in the case where lithium secondary batteries are for use as power sources for electric vehicles, the lithium secondary batteries are required to have high output characteristics and input characteristics because electric vehicles necessitate a large amount of energy when started and accelerated and because the energy which generates in a large amount upon deceleration must be efficiently regenerated. Furthermore, since electric vehicles are used outdoors, the lithium secondary batteries are required to have high input/output characteristics (have low internal impedance) especially at a low temperature such as −30° C. in order that the electric vehicles can be smoothly started and accelerated even in the cold season. In addition, the lithium secondary batteries must deteriorate little in capacity and increase little in internal impedance even when repeatedly charged and discharged in a high-temperature environment.

Meanwhile, when lithium secondary batteries are used not only in electric-vehicle applications but also as stationary large power sources, such as various backup applications, applications for leveling the load of electric power supply, and applications for stabilizing the output of electric-power generation by natural energy, then not only cells having an increased size are used but also a large number of cells are connected serially or in parallel. Because of this, problems concerning reliability and safety due to various kinds of non-uniformity, such as unevenness in discharge characteristics among the individual cells, unevenness in temperature among the individual cells, and unevenness in capacity or charged state among the individual cells, are apt to arise. In case where a cell assembly such as that described above is improperly designed or regulated, this poses a problem, for example, that only some of the cells constituting the cell assembly are kept in a highly charged state or that the internal temperature of the battery rises, resulting in a high-temperature state.

Namely, the current nonaqueous-electrolyte secondary batteries are required to attain the following items on an exceedingly high level: to have a high initial capacity and high input/output characteristics, to have a low internal impedance, to have a high capacity retention after a durability test, such as a high-temperature storage test or a cycle test, and to be excellent in terms of input/output performance and impedance characteristics even after the durability test.

Many techniques have hitherto been investigated with respect to various battery components including positive-electrode and negative-electrode active materials and nonaqueous electrolytic solutions, as means for improving the input/output characteristics, impedance characteristics, high-temperature cycle characteristics, and high-temperature storability of nonaqueous-electrolyte secondary batteries. For example, patent document 1 describes that when $LiFSO_3$ is used as an electrolyte, a battery which has a high discharge capacity when evaluated for 60° C. charge/discharge cycle characteristics is obtained. Patent document 1 includes a statement to the effect that when $LiClO_4$ is used as an electrolyte, the $LiClO_4$ decomposes because of the noble potential of the positive-electrode active material to generate active oxygen and this active oxygen acts on the solvent to accelerate a solvent decomposition reaction. The document further includes a statement to the effect that when $CF_3SO_3Li$, $LiBF_4$, and $LiPF_6$ are used as electrolytes, decomposition of the electrolytes proceeds because of the noble potential of the positive-electrode active material to generate fluorine and this fluorine acts on the solvent to accelerate a solvent decomposition reaction.

PRIOR-ART DOCUMENT

Patent Document

Patent Document 1: JP-A-7-296849

SUMMARY OF THE INVENTION

Problems that the Invention is to Solve

According to the disclosure in cited document 1, it is presumed that when $LiFSO_3$ is used as an electrolyte, a battery having excellent storability and satisfactory cycle characteristics is obtained because the electrolyte itself is chemically and electrochemically stable to render the electrolytic solution less apt to undergo a decomposition reaction.

However, as a result of investigations made by the present inventors, it has been found that the battery which employs an electrolytic solution containing $LiFSO_3$ as an electrolyte has a low initial charge capacity, a high internal impedance, and low input/output characteristics.

A subject for the invention is to provide a nonaqueous electrolytic solution which is capable of bringing about a nonaqueous-electrolyte secondary battery that is free from the problems described above and is improved in initial charge capacity, input/output characteristics, and impedance characteristics and that therefore not only has initial battery characteristics and durability but also retains the high input/output characteristics and the impedance characteristics even after a durability test. Another subject is to provide a nonaqueous-electrolyte secondary battery which employs the nonaqueous electrolytic solution.

Means for Solving the Problems

The present inventors diligently made investigations in order to overcome the problems described above. As a result, it has been found that a nonaqueous electrolytic solution which is capable of bringing about a nonaqueous-electrolyte secondary battery improved in initial charge capacity and input/output characteristics can be rendered possible by adding LiPF$_6$ to a nonaqueous electrolytic solution which contains at least one fluorosulfonic acid salt represented by M(FSO$_3$)$_x$ and regulating the proportion of the fluorosulfonic acid salt to the LiPF$_6$ so as to be in a specific range. The invention has been thus completed.

Namely, the invention relates to the nonaqueous electrolytic solution and nonaqueous-electrolyte secondary battery described below.

<1>
A nonaqueous electrolytic solution which comprises: a nonaqueous solvent; LiPF$_6$; and a fluorosulfonic acid salt represented by formula (1):

[wherein
M is a metal atom, N(R)$_4$, or P(R)$_4$ (where R is either an organic group having 1-12 carbon atoms or a hydrogen atom (not all of the four R's are hydrogen atoms), the R's may be the same or different, and a part or all of the four R's may form a ring in cooperation with the nitrogen atom or phosphorus atom to which the R's have been bonded);
when M is a metal atom, x indicates the valence of the metal atom M and is an integer of 1 or larger; and when M is N(R)$_4$ or P(R)$_4$, x is 1],
wherein the ratio of the molar content of FSO$_3$ in the nonaqueous electrolytic solution to the molar content of PF$_6$ in the nonaqueous electrolytic solution is 0.001-1.2.

<2>
The nonaqueous electrolytic solution according to the item <1> above, wherein the molar content of FSO$_3$ in the nonaqueous electrolytic solution is 0.0005-0.5 mol/L.

<3>
The nonaqueous electrolytic solution according to the item <1> or <2> above, wherein the fluorosulfonic acid salt represented by formula (1) is lithium fluorosulfonate.

<4>
The nonaqueous electrolytic solution according to any one of the items <1> to <3> above, which comprises a cyclic carbonate having a fluorine atom.

<5>
The nonaqueous electrolytic solution according to the item <4> above, which comprises the cyclic carbonate having a fluorine atom in the nonaqueous electrolytic solution in an amount of 0.001-85% by mass.

<6>
The nonaqueous electrolytic solution according to any one of the items <1 to <5> above, which comprises a cyclic carbonate having a carbon-carbon unsaturated bond.

<7>
The nonaqueous electrolytic solution according to the item <6> above, which comprises the cyclic carbonate having a carbon-carbon unsaturated bond in the nonaqueous electrolytic solution in an amount of 0.001-10% by mass.

<8>
The nonaqueous electrolytic solution according to any one of the items <1> to <7> above, which comprises a cyclic sulfonic acid ester.

<9>
The nonaqueous electrolytic solution according to the item <8> above, which comprises the cyclic sulfonic acid ester in the nonaqueous electrolytic solution in an amount of 0.001-10% by mass.

<10>
The nonaqueous electrolytic solution according to any one of the items <1> to <9> above, which comprises a compound having a cyano group.

<11>
The nonaqueous electrolytic solution according to the item <10> above, which comprises the compound having a cyano group in the nonaqueous electrolytic solution in an amount of 0.001-10% by mass.

<12>
The nonaqueous electrolytic solution according to any one of the items <1> to <11> above, which comprises a diisocyanate compound.

<13>
The nonaqueous electrolytic solution according to the item <12> above, which comprises the diisocyanate compound in the nonaqueous electrolytic solution in an amount of 0.001-5%) by mass.

<14>
The nonaqueous electrolytic solution according to any one of the items <1> to <13> above, which comprises at least one salt selected from fluorophosphoric acid lithium salts other than LiPF$_6$ and lithium imide salts.

<15>
The nonaqueous electrolytic solution according to any one of the items <1> to <14> above, which comprises a lithium salt having an oxalic acid group.

<16>
The nonaqueous electrolytic solution according to the item <14> above, wherein the concentration of the at least one salt selected from fluorophosphoric acid lithium salts other than LiPF$_6$ and lithium imide salts in the nonaqueous electrolytic solution is 0.0005-0.5 mol/L.

<17>
The nonaqueous electrolytic solution according to the item <15> above, wherein the concentration of the lithium salt having an oxalic acid group in the nonaqueous electrolytic solution is 0.0005-0.5 mol/L.

<18>
A nonaqueous-electrolyte secondary battery which comprises: a negative electrode and a positive electrode that are capable of occluding and releasing lithium ions; and the nonaqueous electrolytic solution according to any one of the items <1> to <17> above.

<19>
The nonaqueous-electrolyte secondary battery according to the item <18> above, wherein the negative electrode comprises a current collector and a negative-electrode active-material layer disposed on the current collector, the negative-electrode active-material layer containing a negative-electrode active material which comprises at least one member selected from an elemental metal, alloys and compounds of silicon, and an elemental metal, alloys and compounds of tin.

<20>
The nonaqueous-electrolyte secondary battery according to the item <18> above, wherein the negative electrode comprises a current collector and a negative-electrode active-material layer disposed on the current collector, the negative-electrode active-material layer containing a negative-electrode active material which comprises a carbonaceous material.

<21>
The nonaqueous-electrolyte secondary battery according to the item <18> above, wherein the negative electrode comprises a current collector and a negative-electrode active-material layer disposed on the current collector, the negative-electrode active-material layer containing a negative-electrode active material which comprises a lithium-titanium composite oxide.

<22>

The nonaqueous-electrolyte secondary battery according to the item <18> above, wherein the positive electrode comprises a current collector and a positive-electrode active-material layer disposed on the current collector, the positive-electrode active-material layer containing one member selected from the group consisting of lithium-cobalt composite oxides, lithium-manganese composite oxides, lithium-cobalt-manganese composite oxides, lithium-nickel composite oxides, lithium-cobalt-nickel composite oxides, lithium-nickel-manganese composite oxides, and lithium-nickel-cobalt-manganese composite oxides.

<23>

The nonaqueous-electrolyte secondary battery according to the item <18> above, wherein the positive electrode comprises a current collector and a positive-electrode active-material layer disposed on the current collector, the positive-electrode active-material layer containing $Li_xMPO_4$ (M is one element selected from the group consisting of the Group-4 to Group-11 transition metals belonging to the fourth period of the periodic table, and x satisfies 0<x<1.2).

Effects of the Invention $LiPF_6$, among the lithium salts used in nonaqueous electrolytic solutions for use in lithium secondary batteries, is known to bring about a high electrical conductivity. For example, when such a nonaqueous electrolytic solution has been introduced into a battery, the $LiPF_6$ has the effect of reducing the resistance of the electrolytic solution between the positive electrode and the negative electrode. Meanwhile, use of $LiFSO_3$ as the only electrolyte disadvantageously results in an increase in the internal impedance of the battery as demonstrated by the present inventors.

The inventors have found that by adding a fluorosulfonic acid salt represented by $M(FSC_3)_x$ as a second electrolyte ingredient to a system in which $LiPF_6$ is used as an electrolyte and regulating these electrolytes so as to be contained in a specific proportion in the nonaqueous electrolytic solution, the battery is made to have an excellent feature that the battery has a lower internal impedance and better low-temperature output characteristics than the system in which $LiPF_6$ is used as the only electrolyte. It is surprising that a battery employing a nonaqueous electrolytic solution obtained by adding a fluorosulfonic acid salt represented by $M(FSO_3)_x$ as a second electrolyte ingredient to a system in which $LiPF_6$ is used as an electrolyte has a lower internal impedance than the system in which $LiPF_6$ is used as the only electrolyte. Thus, batteries employing a nonaqueous electrolytic solution which contains two electrolytes, i.e., $LiPF_6$ and a fluorosulfonic acid salt represented by $M(FSO_3)_x$, in combination show better low-temperature output characteristics and internal impedance characteristics than batteries in which either of these electrolytes is used alone. In addition, the inventors have found that the former batteries have improved high-temperature durability and high-voltage characteristics and retain the initial internal impedance characteristics and high-output characteristics even after a durability test. The invention has been thus completed.

As described above, by using the nonaqueous electrolytic solution of the invention, a nonaqueous electrolytic solution capable of bringing about a nonaqueous-electrolyte secondary battery improved in initial charge capacity, input/output characteristics, and internal impedance characteristics is provided. Furthermore, the nonaqueous electrolytic solution of the invention makes it possible to provide a nonaqueous-electrolyte battery which, even after a durability test such as a high-temperature storage test or a cycle test, has a high capacity retention and excellent input/output performance and further has excellent impedance characteristics. Namely, from an industrial standpoint, it is possible to provide an excellent battery which can be applied to various fields including the applications shown above such as portable appliances, electric vehicles, and stationary large power sources.

MODES FOR CARRYING OUT THE INVENTION

The invention will be explained below in detail with respect to embodiments thereof. However, the invention should not be construed as being limited to the following embodiments, and can be modified at will.

1. Electrolytic Solution 1-1. Electrolytes

<$M(FSO_3)_x$>

In the invention, one or more fluorosulfonic acid salts represented by formula (1): $M(FSO_3)_x$ are contained as an electrolyte. [In the formula, M is a metal atom, $N(R)_4$, or $P(R)_4$ (where R is either an organic group having 1-12 carbon atoms or a hydrogen atom (however, not all of the four R's are hydrogen atoms), the R's may be the same or different, and a part or all of the four R's may form a ring in cooperation with the nitrogen atom or phosphorus atom to which the R's have been bonded); when M is a metal atom, x indicates the valence of the metal atom M and is an integer of 1 or larger; and when M is $N(R)_4$ or $P(R)_4$, x is 1.] One such fluorosulfonic acid salt may be used alone, or two or more such fluorosulfonic acid salts may be used in combination.

In formula (1), M represents any of a metal atom, a quaternary ammonium represented by $N(R)_4$, and a quaternary phosphonium represented by $P(R)_4$.

When M is a metal atom in formula (1), x indicates the valence of the metal atom and is an integer of 1 or larger. Specific examples thereof include 1, 2, or 3. Examples of the metal atom include alkali metals such as lithium, sodium, potassium, and cesium, alkaline earth metals such as magnesium and calcium, and transition metals such as iron and copper. It is especially preferred that the metal atom should be lithium.

Preferred examples of the fluorosulfonic acid salt include $LiFSO_3$, $NaFSO_3$, $KFSO_3$, $CsFSO_3$, $Mg(FSO_3)_2$, $Ca(FSO_3)_2$, $Fe(FSO_3)_2$, $Cu(FSO_3)_2$, and $Al(FSO_3)_3$. Especially preferred of these are $LiFSO_3$, $NaFSO_3$, and $KFSO_3$. From the standpoint of solubility in the electrolytic solution, $LiFSO_3$ is the most preferred.

When M is a quaternary ammonium represented by $N(R)_4$ or a quaternary phosphonium represented by $P(R)_4$ in formula (1), then x is 1.

In the $N(R)_4$ or $P(R)_4$, R is either an organic group having 1-12 carbon atoms or a hydrogen atom (however, not all of the four R's are hydrogen atoms), the R's may be the same or different, and a part or all of the four R's may form a ring in cooperation with the nitrogen atom or phosphorus atom to which the R's have been bonded.

Examples of the organic group having 1-12 carbon atoms include linear or branched-chain alkyl groups, cyclic alkyl groups, alkenyl groups, alkynyl groups, aryl groups, and aralkyl groups. These groups may have been substituted with halogen atoms. These groups can contain heteroatoms, e.g., oxygen, nitrogen, sulfur, phosphorus, and silicon atoms, and the groups may have been bonded to each other through a saturated or unsaturated bond including any of those atoms. Specific examples include: chain alkyl groups such as methyl, ethyl, n-propyl, isopropyl, n-butyl, isobutyl, t-butyl, and secbutyl; cyclic alkyl groups such as cyclohexyl and norboranyl; alkenyl groups such as vinyl, 1-propenyl, allyl, butenyl, and 1,3-butadienyl; alkynyl groups such as ethynyl, propynyl, and butynyl; aryl groups such as phenyl which may have a substituent, e.g., an alkyl group; aralkyl groups such as benzyl and phenylethyl; halogenated alkyl groups such as trifluoromethyl, trifluoroethyl, and hexafluoropropyl; carbonyl-containing alkyl groups such as ethoxycarbonylethyl; ether-group-containing alkyl groups such as methoxyethyl, phenoxymethyl, ethoxyethyl, allyloxyethyl, methoxyethoxyethyl, and ethoxyethoxyethyl; and sulfonyl-containing alkyl groups such as sulfonylmethyl. Examples thereof further include trialkylsilyl groups such as trimethylsilyl. Preferred are methyl, ethyl, n-propyl, n-butyl, trifluoromethyl, trifluoroethyl, methoxyethyl, methoxyethoxyethyl, and trimethylsilyl.

Preferred examples of the molecular structure of N(R)$_4$ include:

quaternary ammonium cations represented by tetramethylammonium, tetraethylammonium, and tetrabutylammonium;

pyrrolidinium cations represented by dimethylpyrrolidinium, methylethylpyrrolidinium, and diethylpyrrolidinium;

piperidinium cations represented by dimethylpiperidinium, methylethylpiperidinium, and diethylpiperidinium;

morpholinium cations represented by dimethylmorpholinium, methylethylmorpholinium, and diethylmorpholinium;

pyridinium cations represented by 1-methylpyridinium and 1-ethylpyridinium;

pyridazinium cations represented by 1-methylpyridazinium and 1-ethylpyridazinium;

pyrimidinium cations represented by 1-methylpyrimidinium and 1-ethylpyrimidinium;

pyrazinium cations represented by 1-methylpyrazinium and 1-ethylpyrazinium;

imidazolium cations such as 1,3-dimethylimidazolium, 1-ethyl-3-methylimidazolium, and 1,2,3-trimethylimidazolium;

oxazolium cations such as 1-methyloxazolium and 1-ethyloxazolium;

thiazolium cations such as 1-methylthiazolium and 1-ethylthiazolium;

pyrazolium cations such as 1-methylpyrazolium and 1-ethylpyrazolium; and triazolium cations such as 1-methyltriazolium and 1-ethyltriazolium.

Preferred examples of the ammonium cation structures include tetramethylammonium, trimethylethylammonium, trimethylpropylammonium, trimethylbutylammonium, trimethylpentylammonium, trimethylhexylammonium, dimethyldiethylammonium, dimethylethylpropylammonium, dimethylethylbutylammonium, dimethylethylpentylammonium, dimethylethylhexylammonium, dimethyldipropylammonium, dimethylpropylbutylammonium, dimethylpropylpentylammonium, dimethylpropylhexylammonium, dimethyldibutylammonium, dimethylbutylpentylammonium, dimethylbutylhexylammonium, dimethyl dipentyl ammonium, dimethylpentylhexylammonium, dimethyldihexylammonium, methyldiethylpropylammonium, methyldiethylbutylammonium, methyldiethylpentylammonium, methyldiethylhexylammonium, methylethyldipropylammonium, methylethylpropylbutylammonium, methylethylpropylpentylammonium, methylethylpropylhexylammonium, methylethyldibutylammonium, methylethylbutylpentylammonium, methylethylbutylhexylammonium, methylethyldipentylammonium, methylethylpentylhexylammonium, methylethyldihexylammonium, methyltripropylammonium, methyldipropylbutylammonium, methyldipropylpentylammonium, methyldipropylhexylammonium, methylpropyldibutylammonium, methylpropylbutylpentylammonium, methylpropylbutylhexylammonium, methylpropyldipentylammonium, methylpropylpentylhexylammonium, methylpropyldihexylammonium, methyltributylammonium, methyldibutylpentylammonium, methyldibutylhexylammonium, methylbutyldipentylammonium, methylbutylpentylhexylammonium, methylbutyldihexylammonium, methyltripentylammonium, methyldipentylhexylammonium, methylpentyldihexylammonium, methyltrihexylammonium, triethylpropylammonium, triethylbutylammonium, triethylpentylammonium, triethylhexylammonium, and the like or the cations of compounds in which one or more of the hydrogen atoms of the alkyl groups each have been replaced with a fluorine atom. Preferred examples thereof further include trimethylallylammonium, trimethylbutenylammonium, trimethylmethoxymethylammonium, trimethylmethoxyethylammonium, and trimethylmethoxyethoxyethylammonium.

Preferred examples of the pyrrolidinium cation structures include dimethylpyrrolidinium, methylethylpyrrolidinium, diethylpyrrolidinium, methylpropylpyrrolidinium, ethylpropylpyrrolidinium, dipropylpyrrolidinium, methylbutylpyrrolidinium, ethylbutylpyrrolidinium, propylbutylpyrrolidinium, and dibutylpyrrolidinium or the cations of compounds in which one or more of the hydrogen atoms of the alkyl groups each have been replaced with a fluorine atom. Preferred examples thereof further include methylvinylpyrrolidinium, ethylvinylpyrrolidinium, propylvinylpyrrolidinium, butylvinylpyrrolidinium, methylallylpyrrolidinium, ethylallylpyrrolidinium, propylallylpyrrolidinium, butylallylpyrrolidinium, diallylpyrrolidinium, methylbutenylpyrrolidinium, ethylbutenylpyrrolidinium, propylbutenylpyrrolidinium, butylbutenylpyrrolidinium, dibutenylpyrrolidinium, methylmethoxymethylpyrrolidinium, methylmethoxyethylpyrrolidinium, methylethoxyethylpyrrolidinium, methylmethoxyethoxyethylpyrrolidinium, methylethoxyethoxyethylpyrrolidinium, ethylmethoxymethylpyrrolidinium, ethylmethoxyethylpyrrolidinium, ethylethoxyethylpyrrolidinium, ethylmethoxyethoxyethylpyrrolidinium, ethylethoxyethoxyethylpyrrolidinium, propylmethoxymethylpyrrolidinium, propylmethoxyethylpyrrolidinium, propylethoxyethylpyrrolidinium, propylmethoxyethoxyethylpyrrolidinium, propylethoxyethoxyethylpyrrolidinium, butylmethoxymethylpyrrolidinium, butylmethoxyethylpyrrolidinium, butylethoxyethylpyrrolidinium, butylmethoxyethoxyethylpyrrolidinium, and butylethoxyethoxyethylpyrrolidinium.

Preferred examples of the piperidinium cation structures include dimethylpiperidinium, methylethylpiperidinium, diethylpiperidinium, methylpropylpiperidinium, ethylpropylpiperidinium, dipropylpiperidinium, methylbutylpiperidinium, ethylbutylpiperidinium, propylbutylpiperidinium, and dibutylpiperidinium or the cations of compounds in which one or more of the hydrogen atoms of the alkyl groups each have been replaced with a fluorine atom. Preferred examples thereof further include methylvinylpiperidinium, ethylvinylpiperidinium, propylvinylpiperidinium, butylvinylpiperidinium, methylallylpiperidinium, ethylallylpiperidinium, propylallylpiperidinium, butylallylpiperidinium, diallylpiperidinium, methylbutenylpiperidinium, ethylbutenylpiperidinium, propylbutenylpiperidinium, butylbutenylpiperidinium, dibutenylpiperidinium, methylmethoxymethylpiperidinium, methylmethoxyethylpiperidinium, methylethoxyethylpiperidinium, methylmethoxyethoxyethylpiperidinium, methylethoxyethoxyethylpiperidinium, ethylmethoxymethylpiperidinium, ethylmethoxyethylpiperidinium, ethylethoxyethylpiperidinium, ethylmethoxyethoxyethylpiperidinium, ethylethoxyethoxyethylpiperidinium, propylmethoxymethylpiperidinium, propylmethoxyethylpiperidinium, propylethoxyethylpiperidinium, propylmethoxyethoxyethylpiperidinium, propylethoxyethoxyethylpiperidinium, butylmethoxymethylpiperidinium, butylmethoxyethylpiperidinium, butylethoxyethylpiperidinium, butylmethoxyethoxyethylpiperidinium, and butylethoxyethoxyethylpiperidinium.

Preferred examples of the morpholinium cation structures include dimethylmorpholinium, methylethylmorpholinium, diethylmorpholinium, methylpropylmorpholinium, ethylpropylmorpholinium, dipropylmorpholinium, methylbutylmorpholinium, ethylbutylmorpholinium, propylbutylmorpholinium, and dibutylmorpholinium or the cations of compounds in which one or more of the hydrogen atoms of the alkyl groups each have been replaced with a fluorine atom. Preferred examples thereof further include methylvinylmorpholinium, ethylvinylmorpholinium, propylvinylmorpholinium, butylvinylmorpholinium, methylallylmorpholinium, ethylallylmorpholinium, propylallylmorpholinium, butylallylmorpholinium, diallylmorpholinium, methylbutenylmorpholinium, ethylbutenylmorpholinium, propylbutenylmorpholinium, butylbutenylmorpholinium, dibutenylmorpholinium, methylmethoxymethylmorpholinium, methylmethoxyethylmorpholinium, methylethoxyethylmorpholinium, methylmethoxyethoxyethylmorpholinium, methylethoxyethoxyethylmorpholinium, ethylmethoxymethylmorpholinium, ethylmethoxyethylmorpholinium, ethylethoxyethylmorpholinium, ethylmethoxyethoxyethylmorpholinium, ethylethoxyethoxyethylmorpholinium, propylmethoxymethylmorpholinium, propylmethoxyethylmorpholinium, propylethoxyethylmorpholinium, propylmethoxyethoxyethylmorpholinium, propylethoxyethoxyethylmorpholinium, butylmethoxymethylmorpholinium, butylmethoxyethylmorpholinium, butylethoxyethylmorpholinium, butylmethoxyethoxyethylmorpholinium, and butylethoxyethoxyethylmorpholinium.

Preferred examples of the pyridinium cation structures include 1-ethylpyridinium, 1-propylpyridinium, 1-butylpyridinium, 1-pentylpyridinium, 1-hexylpyridinium, 1-allylpyridinium, 1-butenylpyridinium, 1-methoxymethylpyridinium, and 1-methoxyethylpyridinium.

Preferred examples of the pyridazinium cation structures include 1-ethylpyridazinium, 1-propylpyridazinium, 1-butylpyridazinium, 1-pentylpyridazinium, 1-hexylpyridazinium, 1-allylpyridazinium, 1-butenylpyridazinium, 1-methoxymethylpyridazinium, and 1-methoxyethylpyridazinium.

Preferred examples of the pyrimidinium cation structures include 1-ethylpyrimidinium, 1-propylpyrimidinium, 1-butylpyrimidinium, 1-pentylpyrimidinium, 1-hexylpyrimidinium, 1-allylpyrimidinium, 1-butenylpyrimidinium, 1-methoxymethylpyrimidinium, and 1-methoxyethylpyrimidinium.

Preferred examples of the pyrazinium cation structures include 1-ethylpyrazinium, 1-propylpyrazinium, 1-butylpyrazinium, 1-pentylpyrazinium, 1-hexylpyrazinium, 1-allylpyrazinium, 1-butenylpyrazinium, 1-methoxymethylpyrazinium, and 1-methoxyethylpyrazinium.

Preferred examples of the imidazolium cation structures include 1,3-dimethylimidazolium, 1-ethyl-3-methylimidazolium, 1-propyl-3-methylimidazolium, 1-butyl-3-methylimidazolium, 1-pentyl-3-methylimidazolium, 1-hexyl-3-methylimidazolium, 1,3-diethylimidazolium, 1-ethyl-3-propylimidazolium, 1-ethyl-3-butylimidazolium, 1-ethyl-3-pentylimidazolium, 1-ethyl-3-hexylimidazolium, 1,3-dipropylimidazolium, 1-propyl-3-butylimidazolium, 1-propyl-3-pentylimidazolium, 1-hexyl-3-butylimidazolium, 1,2,3-trimethylimidazolium, 1-ethyl-2,3-dimethylimidazolium, 1-propyl-2,3-dimethylimidazolium, 1-butyl-2,3-dimethylimidazolium, 1-pentyl-2,3-dimethylimidazolium, 1-hexyl-2,3-dimethylimidazolium, 1,3-diethyl-2-methylimidazolium, 1-propyl-2-methyl-3-ethylimidazolium, 1-butyl-2-methyl-3-ethylimidazolium, 1-pentyl-2-methyl-3-ethylimidazolium, 1-hexyl-2-methyl-3-ethylimidazolium, 1,2,3,4,5-hexamethylimidazolium, 1-ethyl-2,3,4,5-tetramethylimidazolium, 1-propyl-2,3,4,5-tetramethylimidazolium, 1-butyl-2,3,4,5-tetramethylimidazolium, 1-pentyl-2,3,4,5-tetramethylimidazolium, and 1-hexyl-2,3,4,5-tetramethylimidazolium or the cations of compounds in which one or more of the hydrogen atoms of the alkyl groups each have been replaced with a fluorine atom. Preferred examples thereof further include 1-allyl-3-methylimidazolium, 1-allyl-3-ethylimidazolium, 1-allyl-3-propylimidazolium, 1-allyl-3-butylimidazolium, 1-allyl-2,3-dimethylimidazolium, 1-allyl-2,3,4,5-tetramethylimidazolium, 1-butenyl-3-methylimidazolium, 1-butenyl-3-ethylimidazolium, 1-butenyl-3-propylimidazolium, 1-butenyl-3-butylimidazolium, 1-butenyl-2,3-dimethylimidazolium, 1-butenyl-2,3,4,5-tetramethylimidazolium, 1-methoxymethyl-3-methylimidazolium, 1-methoxymethyl-3-ethylimidazolium, 1-methoxymethyl-3-propylimidazolium, 1-methoxymethyl-3-butylimidazolium, 1-methoxymethyl-2,3-dimethylimidazolium, 1-methoxymethyl-2,3,4,5-etramethylimidazolium, 1-methoxyethyl-3-methylimidazolium, 1-methoxyethyl-3-ethylimidazolium, 1-methoxyethyl-3-propylimidazolium, 1-methoxyethyl-3-butylimidazolium, 1-methoxyethyl-2,3-dimethylimidazolium, and 1-methoxyethyl-2,3,4,5-tetramethylimidazolium.

Preferred examples of the oxazolium cation structures include 1-ethyloxazolium, 1-propyloxazolium, 1-butyloxazolium, 1-pentyloxazolium, 1-hexyloxazolium, 1-allyloxazolium, 1-butenyloxazolium, 1-methoxymethyloxazolium, 1-methoxyethyloxazolium, 1-ethyl-2,4,5-trimethyloxazolium, 1-propyl-2,4,5-trimethyloxazolium, 1-butyl-2,4,5-trimethyloxazolium, 1-pentyl-2,4,5-trimethyloxazolium, 1-hexyl-2,4,5-trimethyloxazolium, 1-allyl-2,4,5-trimethyloxazolium, 1-butenyl-2,4,5-trimethyloxazolium, 1-methoxymethyl-2,4,5-trimethyloxazolium, and 1-methoxyethyl-2,4,5-trimethyloxazolium.

Preferred examples of the thiazolium cation structures include 1-ethylthiazolium, 1-propylthiazolium, 1-butylthiazolium, 1-pentylthiazolium, 1-hexylthiazolium, 1-allylthiazolium, 1-butenylthiazolium, 1-methoxymethylthiazolium, 1-methoxyethylthiazolium, 1-ethyl-2,4,5-trimethylthiazolium, 1-propyl-2,4,5-trimethylthiazolium, 1-butyl-2,4,5-trimethylthiazolium, 1-pentyl-2,4,5-trimethylthiazolium, 1-hexyl-2,4,5-trimethylthiazolium, 1-allyl-2,4,5-trimethyl thiazolium, 1-butenyl-2,4,5-trimethylthiazolium, 1-methoxymethyl-2,4,5-trimethylthiazolium, and 1-methoxy ethyl-2,4,5-trimethylthiazolium.

Preferred examples of the pyrazolium cation structures include 1-ethylpyrazolium, 1-propylpyrazolium, 1-butylpyrazolium, 1-pentylpyrazolium, 1-hexylpyrazolium, 1-allylpyrazolium, 1-butenylpyrazolium, 1-methoxymethylpyrazolium, 1-methoxyethylpyrazolium, 1-ethyl-2,3,4,5-tetramethylpyrazolium, 1-propyl-2,3,4,5-tetramethylpyrazolium, 1-butyl-2,3,4,5-tetramethylpyrazolium, 1-pentyl-2,3,4,5-tetramethylpyrazolium, 1-hexyl-2,3,4,5-tetramethylpyrazolium, 1-allyl-2,3,4,5- tetramethylpyrazolium, 1-butenyl-2,3,4,5-tetramethylpyrazolium, 1-methoxymethyl-2,3,4,5-tetramethylpyrazolium, and 1-methoxyethyl-2,3,4,5-tetramethylpyrazolium.

Preferred examples of the triazolium cation structures include 1-ethyltriazolium, 1-propyltriazolium, 1-butyltriazolium, 1-pentyltriazolium, 1-hexyltriazolium, 1-allyltriazolium, 1-butenyltriazolium, 1-methoxymethyltriazolium, 1-methoxyethyltriazolium, 1-ethyl-2,3,4,5-tetramethyltriazolium, 1-propyl-2,3,4,5-tetramethyltriazolium, 1-butyl-2,3,4,5-tetramethyltriazolium, 1-pentyl-2,3,4,5-tetramethyltriazolium, 1-hexyl-2,3,4,5-tetramethyltriazolium, 1-allyl-2,3,4,5-tetramethylthiazolium, 1-butenyl-2,3,4,5-tetramethyltriazolium, 1-methoxymethyl-2,3,4,5-tetramethyltriazolium, and 1-methoxyethyl-2,3,4,5-tetramethyltriazolium.

Especially preferred of the fluorosulfonic acid salts which include those N(R)$_4$ groups as cation structures, from the standpoints of availability and handleability and of giving a battery having a reduced internal impedance and improved input/output characteristics, are tetramethylammonium fluorosulfonate, tetraethyl ammonium fluorosulfonate, tetrabutylammonium fluorosulfonate, dimethylpyrrolidinium fluorosulfonate, methylethylpyrrolidinium fluorosulfonate, diethylpyrrolidinium fluorosulfonate, dimethylpiperidinium fluorosulfonate, methylethylpiperidinium fluorosulfonate, diethylpiperidinium fluorosulfonate, dimethylmorpholinium fluorosulfonate, methylethylmorpholinium fluorosulfonate, and diethylmorpholinium fluorosulfonate.

Preferred examples of the cation structure P(R)$_4$ include triethylbutylphosphonium, triethylpentylphosphonium, triethylhexylphosphonium, triethylheptylphosphonium, triethyloctylphosphonium, diethylpropylbutylphosphonium, diethylpropylpentylphosphonium, diethylpropylhexylphosphonium, diethylpropylheptylphosphonium, diethylpropyloctylphosphonium, diethylbutylpentylphosphonium, diethylbutylhexylphosphonium, diethylbutylheptylphosphonium, diethylbutyloctylphosphonium, diethylpentylhexylphosphonium, diethylpentylheptylphosphonium, diethylpentyloctylphosphonium, diethylhexylheptylphosphonium, diethylhexyloctylphosphonium, diethylheptyloctylphosphonium, diethyldioctylphosphonium, ethyldipropylbutylphosphonium, ethyldipropylpentylphosphonium, ethyldipropylhexylphosphonium, ethyldipropylheptylphosphonium, ethyldipropyloctylphosphonium, ethylpropyldibutylphosphonium, ethylpropylbutylpentylphosphonium, ethylpropylbutylhexylphosphonium, ethylpropylbutylheptylphosphonium, ethylpropylbutyloctylphosphonium, ethylpropyldipentylphosphonium, ethylpropylpentylhexylphosphonium, ethylpropylpentylheptylphosphonium, ethylpropylpentyloctylphosphonium, ethylpropyldihexylphosphonium, ethylpropylhexylheptylphosphonium, ethylpropylhexyloctylphosphonium, ethylpropyldiheptylphosphonium, ethylpropylheptyloctylphosphonium, ethylpropyldioctylphosphonium, ethyltributylphosphonium, ethyldibutylpentylphosphonium, ethyldibutylhexylphosphonium, ethyldibutylheptylphosphonium, ethyldibutyloctylphosphonium, ethylbutyldipentylphosphonium, ethylbutylpentylhexylphosphonium, ethylbutylpentylheptylphosphonium, ethylbutylpentyloctylphosphonium, ethylbutyldihexylphosphonium, ethylbutylhexylheptylphosphonium, ethylbutylhexyloctylphosphonium, ethylbutylheptyloctylphosphonium, ethylbutyldioctylphosphonium, ethyltripentylphosphonium, ethyldipentylhexylphosphonium, ethyldipentylheptylphosphonium, ethyldipentyloctylphosphonium, ethylpentyldihexylphosphonium, ethylpentylhexylheptylphosphonium, ethylpentylhexyloctylphosphonium, ethylpentyldiheptylphosphonium, ethylpentylheptyloctylphosphonium, ethylpentyldioctylphosphonium, ethyltrihexylphosphonium, ethyldihexylheptylphosphonium, ethyldihexyloctylphosphonium, ethylhexyldiheptylphosphonium, ethylhexylheptyloctylphosphonium, ethylhexyldioctylphosphonium, ethyltriheptylphosphonium, ethyldiheptyloctylphosphonium, ethylheptyldioctylphosphonium, ethyltrioctylphosphonium, tripropylbutylphosphonium, tripropylpentylphosphonium, tripropylhexylphosphonium, tripropylheptylphosphonium, tripropyloctylphosphonium, dipropyldibutylphosphonium, dipropylbutylpentylphosphonium, dipropylbutylhexylphosphonium, dipropylbutylheptylphosphonium, dipropylbutyloctylphosphonium, dipropyldipentylphosphonium, dipropylpentylhexylphosphonium, dipropylpentylheptylphosphonium, dipropylpentyloctylphosphonium, dipropyldihexylphosphonium, dipropylhexylheptylphosphonium, dipropylhexyloctylphosphonium, dipropyldiheptylphosphonium, dipropylheptyloctylphosphonium, dipropyldioctylphosphonium, propyltributylphosphonium, propyldibutylpentylphosphonium, propyldibutylhexylphosphonium, propyldibutylheptylphosphonium, propyldibutyloctylphosphonium, propylbutyldipentylphosphonium, propylbutylpentylhexylphosphonium, propylbutylpentylheptylphosphonium, propylbutylpentyloctylphosphonium, propylbutyldiheptylphosphonium, propylbutylheptyloctylphosphonium, propylbutyldioctylphosphonium, propyltripentylphosphonium, propyldipentylhexylphosphonium, propyldipentylheptylphosphonium, propyldipentyloctylphosphonium, propylpentylhexylheptylphosphonium, propylpentylhexyloctylphosphonium, propylpentyldiheptylphosphonium, propylpentylheptyloctylphosphonium, propylpentyldioctylphosphonium, propyltrihexylphosphonium, propyldihexylheptylphosphonium, propyldihexyloctylphosphonium, propylhexyldiheptylphosphonium, propylhexylheptyloctylphosphonium, propylhexyldioctylphosphonium, propyltriheptylphosphonium, propyldiheptyloctylphosphonium, propylheptyldioctylphosphonium, propyltrioctylphosphonium, tetrabutylphosphonium, tributylpentylphosphonium, tributylhexylphosphonium, tributylheptylphosphonium, tributyloctylphosphonium, tetrapentylphosphonium, tripentylhexylphosphonium, tripentylheptylphosphonium, tripentyloctylphosphonium, tetrahexylphosphonium, trihexylheptylphosphonium, trihexyloctylphosphonium, tetraheptylphosphonium, triheptyloctylphosphonium, tetraoctylphosphonium, and the like or the cations of compounds in which one or more of the hydrogen atoms of the alkyl groups each have been replaced with a fluorine atom. Preferred examples thereof further include triethylallylphosphonium, triethylbutenylphosphonium, tripropylallylphosphonium, tripropylbutenylphosphonium, tributylallylphosphonium, tributylbutenylphosphonium, triethylmethoxyethylphosphonium, triethylmethoxyethoxyethylphosphonium, tripropylmethoxyethylphosphonium, tripropylmethoxyethoxyethylphosphonium, tributylmethoxyethylphosphonium, and tributylmethoxyethoxyethylphosphonium.

Especially preferred of the fluorosulfonic acid salts which include those P(R)$_4$ groups as cation structures, from the standpoints of availability and handleability, are tetramethylphosphonium fluorosulfonate, tetraethylphosphonium fluorosulfonate, and tetrabutylphosphonium fluorosulfonate.

Methods for synthesizing and procuring the fluorosulfonic acid salt represented by formula (1) to be used in the non-aqueous electrolytic solution according to the invention are not particularly limited, and a salt represented by formula (1) which has been synthesized using any method or which has been procured can be used.

Examples of methods for synthesizing a fluorosulfonic acid metal salt represented by formula (1) include: a method in which a metal fluoride or a metal silicofluoride compound is reacted with $SO_3$ to obtain the metal salt of fluorosulfonic acid; a method in which fluorosulfonic acid is reacted with a metal to obtain the metal salt of fluorosulfonic acid through ion exchange; a method in which the ammonium salt of fluorosulfonic acid is reacted with a metal to obtain the metal salt of fluorosulfonic acid; a method in which fluorosulfonic acid is reacted with a metal salt of acetic acid to cause the fluorosulfonic acid to undergo ion exchange and thereby obtain the metal salt of fluorosulfonic acid; and a method in which fluorosulfonic acid is reacted with a metal halide to obtain the metal salt of fluorosulfonic acid. Meanwhile, examples of methods for synthesizing a fluorosulfonic acid ammonium salt or phosphonium salt represented by formula (1) include: a method in which a fluorosulfonic acid ester is reacted with a tertiary amine, a phosphine, or the like to obtain the fluorosulfonic acid salt through the quaternizing reaction of the tertiary amine or phosphine; and a method in which a metal salt of fluorosulfonic acid is subjected to ion exchange with a quaternary ammonium or with a halide of a phosphonium salt to thereby obtain the ammonium or phosphonium salt of fluorosulfonic acid.

The nonaqueous electrolytic solution of the invention contains at least one fluorosulfonic acid salt represented by formula (1), and the nonaqueous electrolytic solution may contain one such salt alone or may contain two or more such salts in combination. In the case where two or more such salts are used, it is preferred that one of these should be $LiFSO_3$. Especially preferred is a combination of $LiFSO_3$ and one or more members selected from $NaFSO_3$, $KFSO_3$, tetraalkylammonium fluorosulfonates (e.g., tetramethylammonium fluorosulfonate, tetraethylammonium fluorosulfonate, and tetrabutylammonium fluorosulfonate), dimethylpyrrolidinium fluorosulfonate, methylethylpyrrolidinium fluorosulfonate, diethylpyrrolidinium fluorosulfonate, dimethylpiperidinium fluorosulfonate, methylethylpiperidinium fluorosulfonate, diethylpiperidinium fluorosulfonate, dimethylmorpholinium fluorosulfonate, methylethylmorpholinium fluorosulfonate, diethylmorpholinium fluorosulfonate, tetramethylphosphonium fluorosulfonate, tetraethylphosphonium fluorosulfonate, and tetrabutylphosphonium fluorosulfonate.

Specifically, the following combinations are preferred from the standpoint of increasing the lithium concentration of the nonaqueous electrolytic solution: $LiFSO_3$ and $NaFSO_3$; $LiFSO_3$ and $KFSO_3$; $LiFSO_3$ and tetramethylammonium fluorosulfonate; $LiFSO_3$ and tetraethylammonium fluorosulfonate; $LiFSO_3$ and tetrabutylammonium fluorosulfonate; $LiFSO_3$ and dimethylpyrrolidinium fluorosulfonate; $LiFSO_3$ and methylethylpyrrolidinium fluorosulfonate; $LiFSO_3$ and diethylpyrrolidinium fluorosulfonate; $LiFSO_3$ and dimethylpiperidinium fluorosulfonate; $LiFSO_3$ and methylethylpiperidinium fluorosulfonate; $LiFSO_3$ and diethylpiperidinium fluorosulfonate; $LiFSO_3$ and dimethylmorpholinium fluorosulfonate; $LiFSO_3$ and methylethylmorpholinium fluorosulfonate; $LiFSO_3$ and diethylmorpholinium fluorosulfonate; $LiFSO_3$ and tetramethylphosphonium fluorosulfonate; $LiFSO_3$ and tetraethylphosphonium fluorosulfonate; and $LiFSO_3$ and tetrabutylphosphonium fluorosulfonate.

<$LiPF_6$>

In the invention, $LiPF_6$ is contained as an electrolyte.

<Fluorosulfonic Acid Salt Represented by Formula (1) and $LiPF_6$>

In the invention, the ratio of the molar content of $FSO_3$ [$FSO_3$] to the molar content of $PF_6$ [$PF_6$] ([$FSO_3$]/[$PF_6$]) in the nonaqueous electrolytic solution is 0.001-1.2.

When the [$FSO_3$]/[$PF_6$] ratio is less than that range, there are cases where input/output characteristics and durability, which are characteristic of the fluorosulfonic acid salt, are not imparted. On the other hand, when the proportion of the fluorosulfonic acid salt exceeds that range, there are cases where the resultant battery has an increased internal impedance and reduced input/output characteristics. From the standpoint of more remarkably producing the effects of the invention, the [$FSO_3$]/[$PF_6$] is preferably 0.01 or greater, more preferably 0.02 or greater, and is preferably 1.1 or less, more preferably 1.0 or less, even more preferably 0.7 or less. The range of [$FSO_3$]/[$PF_6$] is preferably 0.01-1.1, more preferably 0.01-1.0, even more preferably 0.01-0.7.

In the nonaqueous electrolytic solution of the invention, the molar content of $FSO_3$ [$FSO_3$] in the nonaqueous electrolytic solution is as follows. The lower limit thereof is preferably 0.0005 mol/L or higher, more preferably 0.01 mol/L or higher, especially preferably 0.02 mol/L or higher. The upper limit thereof is preferably 0.5 mol/L or less, more preferably 0.45 mol/L or less, especially preferably 0.4 mol/L or less. When the [$FSO_3$] concentration is within that range, the resultant battery has a reduced internal impedance and is more apt to be improved in input/output characteristics and durability. The range of [$FSO_3$] concentration is desirably 0.0005-0.5 mol/L, preferably 0.01-0.5 mol/L, more preferably 0.01-0.45 mol/L, especially preferably 0.01-0.40 mol/L. Although the value thereof may be calculated from the addition amount, the value thereof may be determined by analyzing the electrolytic solution and suitably calculating the value thereof from the amount of the electrolyte contained in the electrolytic solution.

Incidentally, the molar content of $FSO_3$ ([$FSO_3$]) in a nonaqueous electrolytic solution can be determined, for example, from the amount of the $M(FSO_3)_x$ which was used when the nonaqueous electrolytic solution was prepared. In the case where x in formula (1) is 1, the molar content of the $M(FSO_3)$ in the nonaqueous electrolytic solution is equal to the molar content [$FSO_3$]. In the case where x is 2, the molar content [$FSO_3$] is two times the molar content of the $M(FSO_3)$. When x is 3, the molar content [$FSO_3$] is three times the molar content of the $M(FSO_3)$.

In the nonaqueous electrolytic solution of the invention, the molar content of $PF_6$ ([$PF_6$]) in the nonaqueous electrolytic solution is as follows. The lower limit thereof is preferably 0.5 mol/L or higher, more preferably 0.6 mol/L or higher, especially preferably 0.7 mol/L or higher. The upper limit thereof is preferably 3.0 mol/L or less, more preferably 2.0 mol/L or less, especially preferably 1.5 mol/L or less. The range of [$PF_6$] concentration is preferably 0.5-3.0 mol/L, more preferably 0.5-2.0 mol/L, even more preferably 0.5-1.5 mol/L.

When the [$PF_6$] concentration is within that range, the nonaqueous electrolytic solution has a total ion content which attains an appropriate balance between the amount of ions present and the viscosity of the electrolytic solution. Consequently, this nonaqueous electrolytic solution is inhibited from having a reduced ionic conductivity, and the resultant battery has a reduced internal impedance and is apt to have improved input/output characteristics.

<Other Lithium Salts>

Although $LiPF_6$ is used as an electrolyte together with an $M(FSO_3)_x$, the nonaqueous electrolytic solution according to the invention can contain one or more other lithium salts. The other lithium salts are not particularly limited so long as the salts are lithium salts other than both $LiPF_6$ and lithium fluorosulfonate (in the case where M in formula (1) is Li) and are known to be usable in this application. Specific examples include the following.

Examples thereof include: inorganic lithium salts such as $LiBF_4$, $LiClO_4$, $LiAlF_4$, $LiSbF_6$, $LiTaF_6$, and $LiWF_7$;

fluorophosphoric acid lithium salts other than $LiPF_6$, such as $LiPO_3F$ and $LiPO_2F_2$;

tungstic acid lithium salts such as $LiWOF_5$;

carboxylic acid lithium salts such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$;

sulfonic acid lithium salts such as $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$;

lithium imide salts such as $LiN(FCO_2)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, the lithium salt of cyclic 1,2-perfluoroethanedisulfonylimide, the lithium salt of cyclic 1,3-perfluoropropanedisulfonylimide, and $LiN(CF_3SO_2)(C_4F_9SO_2)$;

lithium methide salts such as $LiC(FSO_2)_3$, $LiC(CF_3SO_2)_3$, and $LiC(C_2F_5SO_2)_3$;

lithium salt having an oxalic acid groups such as lithium difluorooxalatoborate, lithium bis(oxalato)borate, lithium tetrafluorooxalatophosphate, lithium difluorobis(oxalato)phosphate, and lithium tris(oxalato)phosphate; and other fluorine-containing organolithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$.

Preferred of these are $LiBF_4$, $LiSbF_6$, $LiTaF_6$, $LiPO_2F_2$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, the lithium salt of cyclic 1,2-perfluoroethanedisulfonylimide, the lithium salt of cyclic 1,3-perfluoropropanedisulfonylimide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, $LiPF_3(C_2F_5)_3$, and the like.

Furthermore, salts selected from the fluorophosphoric acid lithium salts other than $LiPF_6$ and from the lithium imide salts and the lithium salts having an oxalic acid group are preferred because these salts have the effect of improving output characteristics, high-rate charge/discharge characteristics, high-temperature storability, cycle characteristics, etc. In particular, the lithium salts are preferred. Specifically, especially preferred are salts selected from $LiPO_2F_2$, $LiBF_4$, $LiN(CF_3SO_2)_2$, $LiN(FSO_2)_2$, lithium difluorooxalatoborate, lithium bisoxalatoborate, lithium difluorobisoxalatophosphate, and lithium tetrafluorobisoxalatophosphate.

The content of such lithium salts other than both $M(FSO_3)_x$ and $LiPF_6$ is not limited unless the effects of the invention are significantly lessened thereby. However, the lower limit thereof is preferably 0.0005 mol/L or higher, more preferably 0.001 mol/L or higher, especially preferably 0.01 mol/L or higher. The upper limit thereof is preferably 0.5 mol/L or less, more preferably 0.45 mol/L or less, especially preferably 0.4 mol/L or less. When the $[FSO_3]$ concentration is within that range, the effect of improving output characteristics, high-rate charge/discharge characteristics, high-temperature storability, cycle characteristics, etc. is more apt to be produced. The range of the concentration of the lithium salts other than both $M(FSO_3)_x$ and $LiPF_6$ in the nonaqueous electrolytic solution is preferably 0.0005-0.5 mol/L, more preferably 0.001-0.45 mol/L, especially preferably 0.001-0.4 mol/L.

It is preferred that an $M(FSO_3)_x$, $LiPF_6$, and other lithium salt(s) should be used so that the nonaqueous electrolytic solution has a total molar concentration of lithium [Li] of 0.3-3 mol/L, from the standpoints of making the electrolytic solution have an electrical conductivity within a satisfactory range and thereby ensuring satisfactory battery performances. The total molar concentration of lithium [Li] includes the concentration of the lithium derived from the $LiPF_6$ and, in the case where the fluorosulfonic acid salt represented by formula (1) is a lithium salt, from this fluorosulfonic acid salt, and that term means the total molar concentration of lithium [Li] in the nonaqueous electrolytic solution. The total molar concentration of lithium [Li] is more preferably 0.4 mol/L or higher, even more preferably 0.5 mol/L or higher, and is more preferably 2.0 mol/L or less, even more preferably 1.8 mol/L or less, especially preferably 1.7 mol/L or less.

In the case where an electrolytic solution which contains $LiPO_2F_2$ is to be prepared, examples of methods for preparing this electrolytic solution include: a method in which $LiPO_2F_2$ that has been separately synthesized by a known technique is added to an electrolytic solution containing $LiPF_6$; and a method in which water is caused to coexist with battery components which will be described later, e.g., active materials and electrode plates, and $LiPO_2F_2$ is generated in the system when a battery is assembled using an electrolytic solution which contains $LiPF_6$. Either of these techniques may be used in the invention.

Techniques for determining the amount of $LiPO_2F_2$ contained in the nonaqueous electrolytic solution and in a nonaqueous-electrolyte battery are not particularly limited, and known techniques can be used at will. Examples thereof include ion chromatography and F nuclear magnetic resonance spectroscopy (hereinafter sometimes abbreviated to NMR).

1-2. Nonaqueous Solvent

<Saturated Cyclic Carbonates>

Examples of saturated cyclic carbonates include saturated cyclic carbonates which have an alkylene group having 2-4 carbon atoms.

Specifically, examples of the saturated cyclic carbonates having 2-4 carbon atoms include ethylene carbonate, propylene carbonate, and butylene carbonate. Of these, ethylene carbonate and propylene carbonate are especially preferred from the standpoint of an improvement in battery characteristics which is due to an improvement in the degree of dissociation into lithium ions.

One of such saturated cyclic carbonates may be used alone, or any desired two or more thereof may be used in combination in any desired proportion.

The amount of the saturated cyclic carbonate(s) to be incorporated is not particularly limited unless the effects of the invention are considerably lessened thereby. However, in the case where one saturated cyclic carbonate is used alone, the lower limit of the incorporation amount thereof is 3% by volume or more, more preferably 5% by volume or more, per 100% by volume the nonaqueous solvent. By regulating the amount thereof so as to be within that range, a decrease in electrical conductivity due to a decrease in the permittivity of the nonaqueous electrolytic solution is avoided to make it easy to regulate the high-current discharge characteristics of the nonaqueous-electrolyte secondary battery, stability to the negative electrode, and cycle characteristics so as to be within satisfactory ranges. The upper limit thereof is 90% by volume or less, more preferably 85% by volume or less, even more preferably 80% by volume or less. By regulating the amount thereof so as to be within that range, the nonaqueous electrolytic solution is made to have a viscosity within an adequate range and is inhibited from decreasing in ionic conductivity. This in turn makes it easy to regulate the load characteristics of the nonaqueous-electrolyte secondary battery so as to be within a satisfactory range.

Meanwhile, any desired two or more saturated cyclic carbonates can be used in combination. One of preferred combinations is a combination of ethylene carbonate and propylene carbonate. The volume ratio of ethylene carbonate to propylene carbonate in this case is preferably from 99:1 to 40:60, especially preferably from 95:5 to 50:50. Furthermore, the proportion of the propylene carbonate in the whole nonaqueous solvent is 1% by volume or more, preferably 2% by volume or more, more preferably 3% by volume or more, and the upper limit thereof is generally 20% by volume or less, preferably 8% by volume or less, more preferably 5% by volume or less. The nonaqueous electrolytic solution which contains propylene carbonate in an amount within that range is preferred because this electrolytic solution has excellent low-temperature properties while retaining the properties due to a combination of ethylene carbonate and a dialkyl carbonate.

<Chain Carbonates>

Preferred chain carbonates are chain carbonates having 3-7 carbon atoms.

Specifically, examples of the chain carbonates having 3-7 carbon atoms include dimethyl carbonate, diethyl carbonate, di-n-propyl carbonate, diisopropyl carbonate, n-propyl isopropyl carbonate, ethyl methyl carbonate, methyl n-propyl carbonate, n-butyl methyl carbonate, isobutyl methyl carbonate, t-butyl methyl carbonate, ethyl n-propyl carbonate, n-butyl ethyl carbonate, isobutyl ethyl carbonate, and t-butyl ethyl carbonate.

Preferred of these are dimethyl carbonate, diethyl carbonate, di-n-propyl carbonate, diisopropyl carbonate, n-propyl isopropyl carbonate, ethyl methyl carbonate, and methyl n-propyl carbonate. Especially preferred are dimethyl carbonate, diethyl carbonate, and ethyl methyl carbonate.

Chain carbonates having one or more fluorine atoms (hereinafter often referred to simply as "fluorinated chain carbonates") also are suitable for use. The number of the fluorine atoms possessed by each of the fluorinated chain carbonates is not particularly limited so long as the number thereof is 1 or larger. However, the number thereof is generally 6 or less, preferably 4 or less. In the case where a fluorinated chain carbonate has a plurality of fluorine atoms, these fluorine atoms may have been bonded to the same carbon atom or may have been bonded to different carbon atoms. Examples of the fluorinated chain carbonates include fluorinated dimethyl carbonate derivatives, fluorinated ethyl methyl carbonate derivatives, and fluorinated diethyl carbonate derivatives.

Examples of the fluorinated dimethyl carbonate derivatives include fluoromethyl methyl carbonate, difluoromethyl methyl carbonate, trifluoromethyl methyl carbonate, bis(fluoromethyl) carbonate, bis(difluoro)methyl carbonate, and bis(trifluoromethyl) carbonate.

Examples of the fluorinated ethyl methyl carbonate derivatives include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, and ethyl trifluoromethyl carbonate.

Examples of the fluorinated diethyl carbonate derivatives include ethyl 2-fluoroethyl carbonate, ethyl 2,2-difluoroethyl carbonate, bis(2-fluoroethyl) carbonate, ethyl (2,2,2-trifluoroethyl) carbonate, 2,2-difluoroethyl 2'-fluoroethyl carbonate, bis(2,2-difluoroethyl) carbonate, 2,2,2-trifluoroethyl 2'-fluoroethyl carbonate, 2,2,2-trifluoroethyl 2',2'-difluoroethyl carbonate, and bis(2,2,2-trifluoroethyl) carbonate.

One of such chain carbonates may be used alone, or any desired two or more thereof may be used in combination in any desired proportion.

It is preferred that one or more chain carbonates should be contained in an amount of 15% by volume or more per 100% by volume the nonaqueous solvent. By regulating the amount thereof to 15% by volume or more, the nonaqueous electrolytic solution is made to have a viscosity within an adequate range and is inhibited from decreasing in ionic conductivity. This in turn makes it easy to regulate the high-current discharge characteristics of the nonaqueous-electrolyte secondary battery so as to be within a satisfactory range. Furthermore, it is preferred that the amount of the chain carbonate(s) should be 90% by volume or less per 100% by volume the nonaqueous solvent. By regulating the amount thereof to 90% by volume or less, a decrease in electrical conductivity due to a decrease in the permittivity of the nonaqueous electrolytic solution is avoided to make it easy to regulate the high-current discharge characteristics of the nonaqueous-electrolyte secondary battery so as to be within a satisfactory range. The amount of the chain carbonate(s) to be incorporated is more preferably 20%) by volume or more, even more preferably 25% by volume or more, and is more preferably 85% by volume or less, even more preferably 80% by volume or less.

Furthermore, by using one or more specific chain carbonates in combination with ethylene carbonate in specific incorporation amounts, battery performances can be remarkably improved.

For example, in the case where dimethyl carbonate and ethyl methyl carbonate were selected as the specific chain carbonates, it is preferred that ethylene carbonate should be incorporated in an amount of 15-40% by volume, dimethyl carbonate be incorporated in an amount of 20-50% by volume, and ethyl methyl carbonate be incorporated in an amount of 20-50% by volume. By selecting such incorporation amounts, the viscosity of the nonaqueous electrolytic solution can be reduced, while lowering the lower-temperature-side precipitation temperature of the electrolytes, to improve ionic conductivity and thereby enable the nonaqueous-electrolyte secondary battery to produce high output even at low temperatures. It is especially preferred that the amount of ethylene carbonate to be incorporated should be 25-35% by volume, that of dimethyl carbonate to be incorporated should be 30-40% by volume, and that of ethyl methyl carbonate to be incorporated should be 30-40% by volume.

<Cyclic Carbonates Having Fluorine Atom(s)>

Cyclic carbonates having one or more fluorine atoms (hereinafter often referred to simply as "fluorinated cyclic carbonates") are not particularly limited so long as the carbonates are cyclic carbonates having one or more fluorine atoms.

Examples of the fluorinated cyclic carbonates include derivatives of cyclic carbonates which have an alkylene group having 2-6 carbon atoms, e.g., derivatives of ethylene carbonate. Examples of the ethylene carbonate derivatives include products of fluorination of either ethylene carbonate or ethylene carbonate substituted with one or more alkyl groups (e.g., alkyl groups having 1-4 carbon atoms). Preferred of these are such fluorinated carbonates having 1-8 fluorine atoms.

Specific examples thereof include monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methyl ethylene carbonate, 4,4-difluoro-5-methylethylene carbonate, 4-(fluoromethyl)ethylene carbonate, 4-(difluoromethyl)ethylene carbonate, 4-(trifluoromethyl)ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, and 4,4-difluoro-5,5-dimethylethylene carbonate.

More preferred of these, from the standpoints of imparting high ionic conductivity and suitably forming an interface-protective coating film, is at least one member selected from the group consisting of monofluoroethylene carbonate, 4,4-difluoroethylene carbonate, 4,5-difluoroethylene carbonate, and 4,5-difluoro-4,5-dimethylethylene carbonate.

One of such fluorinated cyclic carbonates may be used alone, or any desired two or more thereof may be used in combination in any desired proportion. The amount of the fluorinated cyclic carbonate(s) to be incorporated is not particularly limited unless the effects of the invention are considerably lessened thereby. However, the amount thereof per 100% by mass the nonaqueous electrolytic solution is preferably 0.001%) by mass or more, more preferably 0.01% by mass or more, even more preferably 0.1%) by mass or more, and is preferably 85% by mass or less, more preferably 80% by mass or less, even more preferably 75% by mass or less. The range of the concentration of the fluorinated cyclic carbonate(s) is preferably 0.001-85% by mass, more preferably 0.01-80%) by mass, even more preferably 0.1-75%) by mass.

Incidentally, a fluorinated cyclic carbonate may be used either as a main solvent for the nonaqueous electrolytic solution or as a minor solvent therefor. In the case where a fluorinated cyclic carbonate is used as a main solvent, the amount of this carbonate to be incorporated per 100% by mass the nonaqueous electrolytic solution is preferably 8% by mass or more, more preferably 10% by mass or more, even more preferably 12% by mass or more, and is preferably 85% by mass or less, more preferably 80% by mass or less, even more preferably 75% by mass or less. So long as the amount thereof is within that range, the effect of sufficiently improving the cycle characteristics of the nonaqueous-electrolyte secondary battery is apt to be produced and it is easy to prevent the battery from decreasing in discharge capacity retention. In the case where a fluorinated cyclic carbonate is used as a minor solvent, the amount of this carbonate to be incorporated per 100% by mass the nonaqueous electrolytic solution is preferably 0.001% by mass or more, more preferably 0.01% by mass or more, even more preferably 0.1% by mass or more, and is preferably 8% by mass or less, more preferably 6% by mass or less, even more preferably 5% by mass or less. So long as the amount thereof is within that range, the nonaqueous-electrolyte secondary battery is apt to have sufficient output characteristics.

<Chain Carboxylic Acid Esters>

Examples of chain carboxylic acid esters include chain carboxylic acid esters represented by a structural formula in which the total number of carbon atoms is 3-7.

Specific examples thereof include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, and isopropyl isobutyrate.

Preferred of these, from the standpoint of an improvement in ionic conductivity due to a decrease in viscosity, are methyl acetate, ethyl acetate, n-propyl acetate, n-butyl acetate, methyl propionate, ethyl propionate, n-propyl propionate, isopropyl propionate, methyl butyrate, ethyl butyrate, and the like.

It is preferred that the amount of such a chain carboxylic acid ester should be 5% by volume or more per 100% by volume the nonaqueous solvent. By regulating the amount thereof to 5% by volume or more, the electrical conductivity of the nonaqueous electrolytic solution is improved to make it easy to improve the high-current discharge characteristics of the nonaqueous-electrolyte secondary battery. It is also preferred that the amount of the chain carboxylic acid ester should be 80% by volume or less per 100% by volume the nonaqueous solvent. By regulating the amount thereof to 80% by volume or less, negative-electrode resistance is inhibited from increasing and the nonaqueous-electrolyte secondary battery is made to be easily regulated so as to have satisfactory high-current discharge characteristics and satisfactory cycle characteristics. The amount of the chain carboxylic acid ester to be incorporated is more preferably 8% by volume or more, and is more preferably 70% by volume or less.

<Cyclic Carboxylic Acid Esters>

Examples of cyclic carboxylic acid esters include cyclic carboxylic acid esters represented by a structural formula in which the total number of carbon atoms is 3-12.

Specific examples thereof include γ-butyrolactone, γ-valerolactone, γ-caprolactone, and ϵ-caprolactone. Especially preferred of these is γ-butyrolactone from the standpoint of an improvement in battery characteristics due to an improvement in the degree of dissociation into lithium ions.

It is preferred that the amount of such a cyclic carboxylic acid ester should be 3% by volume or more per 100% by volume the nonaqueous solvent. By regulating the amount thereof to 3% by volume or more, the electrical conductivity of the nonaqueous electrolytic solution is improved to make it easy to improve the high-current discharge characteristics of the nonaqueous-electrolyte secondary battery. It is also preferred that the amount of the cyclic carboxylic acid ester should be 60% by volume or less. By regulating the amount thereof to 60% by volume or less, the nonaqueous electrolytic solution is made to have a viscosity within an appropriate range and is prevented from decreasing in electrical conductivity and negative-electrode resistance is inhibited from increasing. This makes it easy to regulate the high-current discharge characteristics of the nonaqueous-electrolyte secondary battery so as to be within a satisfactory range. The amount of the cyclic carboxylic acid ester to be incorporated is more preferably 5% by volume or more, and is more preferably 50% by volume or less.

<Ether Compounds>

Preferred ether compounds are chain ethers having 3-10 carbon atoms and cyclic ethers having 3-6 carbon atoms.

Examples of the chain ethers having 3-10 carbon atoms include diethyl ether, di(2-fluoroethyl)ether, di(2,2-difluoroethyl)ether, di(2,2,2-trifluoroethyl)ether, ethyl (2-fluoroethyl)ether, ethyl 2,2,2-trifluoroethyl ether, ethyl (1,1,2,2-tetrafluoroethyl)ether, (2-fluoroethyl) (2,2,2-trifluoroethyl) ether, (2-fluoroethyl) (1,1,2,2-tetrafluoroethyl)ether, (2,2,2-trifluoroethyl) (1,1,2,2-tetrafluoroethyl)ether, ethyl n-propyl ether, ethyl (3-fluoro-n-propyl)ether, ethyl (3,3,3-trifluoro-n-propyl)ether, ethyl (2,2,3,3-tetrafluoro-n-propyl)ether, ethyl (2,2,3,3,3-pentafluoro-n-propyl)ether, 2-fluoroethyl n-propyl ether, (2-fluoroethyl) (3-fluoro-n-propyl)ether, (2-fluoroethyl) (3,3,3-trifluoro-n-propyl)ether, (2-fluoroethyl) (2,2,3,3-tetrafluoro-n-propyl)ether, (2-fluoroethyl) (2,2,3,3,3-pentafluoro-n-propyl)ether, 2,2,2-trifluoroethyl n-propyl ether, (2,2,2-trifluoroethyl) (3-fluoro-n-propyl)ether, (2,2,2-trifluoroethyl) (3,3,3-trifluoro-n-propyl)ether, (2,2,2-trifluoroethyl) (2,2,3,3-tetrafluoro-n-propyl)ether, (2,2,2-trifluoroethyl) (2,2,3,3,3-pentafluoro-n-propyl)ether, 1,1,2,2-tetrafluoroethyl n-propyl ether, (1,1,2,2-tetrafluoroethyl) (3-fluoro-n-propyl)ether, (1,1,2,2-tetrafluoroethyl) (3,3,3-trifluoro-n-propyl)ether, (1,1,2,2-tetrafluoroethyl) (2,2,3,3-tetrafluoro-n-propyl)ether, (1,1,2,2-tetrafluoroethyl) (2,2,3,3,3-pentafluoro-n-propyl)ether, di-n-propyl ether, (n-propyl) (3-fluoro-n-propyl)ether, (n-propyl) (3,3,3-trifluoro-n-propyl)ether, (n-propyl) (2,2,3,3-tetrafluoro-n-propyl)ether, (n-propyl) (2,2,3,3,3-pentafluoro-n-propyl)ether, di(3-fluoro-n-propyl)ether, (3-fluoro-n-propyl) (3,3,3-trifluoro-n-propyl)ether, (3-fluoro-n-propyl) (2,2,3,3-tetrafluoro-n-propyl)ether, (3-fluoro-n-propyl) (2,2,3,3,3-pentafluoro-n-propyl)ether, di(3,3,3-trifluoro-n-propyl)ether, (3,3,3-trifluoro-n-propyl) (2,2,3,3-tetrafluoro-n-propyl)ether, (3,3,3-trifluoro-n-propyl) (2,2,3,3,3-pentafluoro-n-propyl)ether, di(2,2,3,3-tetrafluoro-n-propyl)ether, (2,2,3,3-tetrafluoro-n-propyl) (2,2,3,3,3-pentafluoro-n-propyl)ether, di(2,2,3,3,3-pentafluoro-n-propyl)ether, di-n-butyl ether, dimethoxymethane, methoxyethoxymethane, methoxy(2-fluoroethoxy)methane, methoxy(2,2,2-trifluoroethoxy)methane methoxy(1,1,2,2-tetrafluoroethoxy)methane, diethoxymethane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, (2-fluoroethoxy)(2,2,2-trifluoroethoxy)methane, (2-fluoroethoxy)(1,1,2,2-tetrafluoroethoxy)methane di(2,2,2-trifluoroethoxy)methane, (2,2,2-trifluoroethoxy)(1,1,2,2-tetrafluoroethoxy)methane, di(1,1,2,2-tetrafluoroethoxy)methane, dimethoxyethane, methoxyethoxyethane, methoxy(2-fluoroethoxy)ethane, methoxy(2,2,2-trifluoroethoxy)ethane, methoxy(1,1,2,2-tetrafluoroethoxy)ethane, diethoxyethane, ethoxy(2-fluoroethoxy)ethane, ethoxy(2,2,2-trifluoroethoxy)ethane, ethoxy(1,1,2,2-tetrafluoroethoxy)ethane, di(2-fluoroethoxy)ethane, (2-fluoroethoxy)(2,2,2-trifluoroethoxy)ethane, (2-fluoroethoxy)(1,1,2,2-tetrafluoroethoxy)ethane, di(2,2,2-trifluoroethoxy)ethane, (2,2,2-trifluoroethoxy)(1,1,2,2-tetrafluoroethoxy)ethane, di(1,1,2,2-tetrafluoroethoxy)ethane, ethylene glycol di-n-propyl ether, ethylene glycol di-n-butyl ether, and diethylene glycol dimethyl ether.

Examples of the cyclic ethers having 3-6 carbon atoms include tetrahydrofuran, 2-methyltetrahydrofuran, 3-methyltetrahydrofuran, 1,3-dioxane, 2-methyl-1,3-dioxane, 4-methyl-1,3-dioxane, 1,4-dioxane, and the like and compounds formed by fluorinating these compounds.

Preferred of these are dimethoxymethane, diethoxymethane, ethoxymethoxymethane, ethylene glycol di-n-propyl ether, ethylene glycol di-n-butyl ether, and diethylene glycol dimethyl ether, from the standpoint that these compounds have the high ability to solvate lithium ions and improve the property of dissociating into ions. Especially preferred are dimethoxymethane, diethoxymethane, and ethoxymethoxymethane, because these compounds have a low viscosity and impart a high ionic conductivity.

The amount of such an ether compound to be incorporated per 100% by volume the nonaqueous solvent usually is preferably 3% by volume or more, more preferably 4% by volume or more, even more preferably 5% by volume or more, and is preferably 70% by volume or less, more preferably 65% by volume or less, even more preferably 60% by volume or less.

So long as a chain ether is incorporated in an amount within this range, it is easy to ensure the effects of the chain ether, i.e., an improvement in the degree of dissociation into lithium ions and an improvement in ionic conductivity due to a decrease in viscosity. In addition, in the case where the negative-electrode active material is a carbonaceous material, it is easy to avoid the trouble that the chain ether is inserted together with lithium ions to cause a decrease in capacity.

<Sulfone Compounds>

Preferred sulfone compounds are cyclic sulfones having 3-6 carbon atoms and chain sulfones having 2-6 carbon atoms. It is preferred that the number of sulfonyl groups per molecule should be 1 or 2.

Examples of the cyclic sulfones include monosulfone compounds such as trimethylene sulfone compounds, tetramethylene sulfone compounds, and hexamethylene sulfone compounds and disulfone compounds such as trimethylene disulfone compounds, tetramethylene disulfone compounds, and hexamethylene disulfone compounds. From the standpoints of permittivity and viscosity, tetramethylene sulfone compounds, tetramethylene disulfone compounds, hexamethylene sulfone compounds, and hexamethylene disulfone compounds are more preferred of those, and tetramethylene sulfone compounds (sulfolane compounds) are especially preferred.

The sulfolane compounds preferably are sulfolane and/or sulfolane derivatives (hereinafter, these compounds including sulfolane are often referred to simply as "sulfolane compounds"). The sulfolane derivatives preferably are sulfolane compounds in which one or more of the hydrogen atoms bonded to the carbon atoms constituting the sulfolane ring each have been replaced with a fluorine atom or an alkyl group.

Preferred of these are 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethylsulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane, 5-fluoro-3-(trifluoromethyl)sulfolane, and the like, from the standpoint that these sulfolane compounds have a high ionic conductivity and bring about high input/output characteristics.

Examples of the chain sulfones include dimethyl sulfone, ethyl methyl sulfone, diethyl sulfone, n-propyl methyl sulfone, n-propyl ethyl sulfone, di-n-propyl sulfone, isopropyl methyl sulfone, isopropyl ethyl sulfone, diisopropyl sulfone, n-butyl methyl sulfone, n-butyl ethyl sulfone, t-butyl methyl sulfone, t-butyl ethyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, perfluoroethyl methyl sulfone, ethyl trifluoroethyl sulfone, ethyl pentafluoroethyl sulfone, di(trifluoroethyl) sulfone, perfluorodiethyl sulfone, fluoromethyl n-propyl sulfone, difluoromethyl n-propyl sulfone, trifluoromethyl n-propyl sulfone, fluoromethyl isopropyl sulfone, difluoromethyl isopropyl sulfone, trifluoromethyl isopropyl sulfone, trifluoroethyl n-propyl sulfone, trifluoroethyl isopropyl sulfone, pentafluoroethyl n-propyl sulfone, pentafluoroethyl isopropyl sulfone, trifluoroethyl n-butyl sulfone, trifluoroethyl t-butyl sulfone, pentafluoroethyl n-butyl sulfone, and pentafluoroethyl t-butyl sulfone.

Preferred of these are dimethyl sulfone, ethyl methyl sulfone, diethyl sulfone, n-propyl methyl sulfone, isopropyl methyl sulfone, n-butyl methyl sulfone, t-butyl methyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, ethyl trifluoroethyl sulfone, ethyl pentafluoroethyl sulfone, trifluoromethyl n-propyl sulfone, trifluoromethyl isopropyl sulfone, trifluoroethyl n-butyl sulfone, trifluoroethyl t-butyl sulfone, trifluoromethyl n-butyl sulfone, trifluoromethyl t-butyl sulfone, and the like, from the standpoint that these sulfone compounds have a high ionic conductivity and bring about high input/output characteristics.

The amount of such a sulfone compound to be incorporated per 100% by volume the nonaqueous solvent is preferably 0.3% by volume or more, and is preferably 80% by volume or less. So long as the amount thereof is within that range, it is easy to obtain the effect of improving durability such as cycle characteristics and storability. In addition, the viscosity of the nonaqueous electrolytic solution can be regulated so as to be within an adequate range, and a decrease in electrical conductivity can be avoided. Furthermore, it is easy to avoid the trouble that the nonaqueous-electrolyte secondary battery decreases in charge/discharge capacity retention when charged and discharged at a high current density. The amount of the sulfone compound to be incorporated is more preferably 0.5% by volume or more, even more preferably 1% by volume or more, and is more preferably 75% by volume or less, even more preferably 70% by volume or less.

1-3. Aids

<Cyclic Carbonates Having Carbon-Carbon Unsaturated Bond>

In the nonaqueous electrolytic solution of the invention, a cyclic carbonate having a carbon-carbon unsaturated bond (hereinafter often referred to simply as "unsaturated cyclic carbonate") can be used in order to form a coating film on the surface of the negative electrode of the nonaqueous-electrolyte battery to attain battery life prolongation.

The cyclic carbonate having a carbon-carbon unsaturated bond is not particularly limited so long as the carbonate is a cyclic carbonate having a carbon-carbon unsaturated bond, and any desired carbonate having a carbon-carbon unsaturated bond can be used. Cyclic carbonates which have a substituent having an aromatic ring are also included in the cyclic carbonate having a carbon-carbon unsaturated bond.

Examples of the unsaturated cyclic carbonate include vinylene carbonate compounds, ethylene carbonate compounds substituted with one or more aromatic rings or substituents having a carbon-carbon unsaturated bond, phenyl carbonate compounds, vinyl carbonate compounds, and ally carbonate compounds.

Examples of the vinylene carbonate compounds include vinylene carbonate, methylvinylene carbonate, 4,5-dimethylvinylene carbonate, phenylvinylene carbonate, 4,5-diphenylvinylene carbonate, vinylvinylene carbonate, and allylvinylene carbonate.

Examples of the ethylene carbonate compounds substituted with one or more aromatic rings or substituents having a carbon-carbon unsaturated bond include vinylethylene carbonate, 4,5-divinylethylene carbonate, phenylethylene carbonate, 4,5-diphenylethylene carbonate, ethynylethylene carbonate, and 4,5-diethynylethylene carbonate.

Preferred of these are the vinylene carbonate compounds and the ethylene carbonates substituted with one or more aromatic rings or substituents having a carbon-carbon unsaturated bond. In particular, vinylene carbonate, 4,5-diphenyl vinylene carbonate, 4,5-dimethyl vinylene carbonate, vinylethylene carbonate, and ethynylethylene carbonate are more suitable for use because these compounds form a stable interface-protective coating film.

The molecular weight of such an unsaturated cyclic carbonate is not particularly limited, and the carbonate may have any desired molecular weight unless the effects of the invention are considerably lessened thereby. The molecular weight thereof is preferably 50-250. So long as the unsaturated cyclic carbonate has a molecular weight within this range, it is easy to ensure the solubility of the unsaturated cyclic carbonate in the nonaqueous electrolytic solution and the effects of the invention are apt to be sufficiently produced. The molecular weight of the unsaturated cyclic carbonate is more preferably 80 or higher, and is more preferably 150 or less. Methods for producing the unsaturated cyclic carbonate are not particularly limited, and the carbonate can be produced by a known method selected at will.

One unsaturated cyclic carbonate may be used alone, or any desired two or more unsaturated cyclic carbonates may be used in combination in any desired proportion. The amount of the unsaturated cyclic carbonate to be incorporated is not particularly limited, and the carbonate may be incorporated in any desired amount unless the effects of the invention are considerably lessened thereby. The amount of the unsaturated cyclic carbonate per 100% by mass the nonaqueous electrolytic solution is preferably 0.001% by mass or more, more preferably 0.01% by mass or more, even more preferably 0.1% by mass or more, especially preferably 0.2% by mass or more, and is preferably 10% by mass or less, more preferably 8% by mass or less, even more preferably 5% by mass or less. The range of the concentration of the unsaturated cyclic carbonate is preferably 0.001-10% by mass, more preferably 0.001-8% by mass, even more preferably 0.001-5%) by mass.

So long as the amount of the unsaturated cyclic carbonate is within that range, it is easy to produce the effect of sufficiently improving the cycle characteristics of the nonaqueous-electrolyte secondary battery. In addition, it is easy to avoid the trouble that the battery has reduced high-temperature storability to evolve a gas in an increased amount and decreases in discharge capacity retention.

<Fluorinated Unsaturated Cyclic Carbonates>

It is also preferred that a cyclic carbonate having one or more unsaturated bonds and one or more fluorine atoms (hereinafter often referred to simply as "fluorinated unsaturated cyclic carbonate") should be used as the fluorinated cyclic carbonate. The fluorinated unsaturated cyclic carbonate is not particularly limited. Especially preferred are fluorinated unsaturated cyclic carbonates having one or two fluorine atoms.

Examples of the fluorinated unsaturated cyclic carbonate include vinylene carbonate derivatives and ethylene carbonate derivatives substituted with one or more aromatic rings or substituents having a carbon-carbon unsaturated bond.

Examples of the vinylene carbonate derivatives include 4-fluorovinylene carbonate, 4-fluoro-5-methylvinylene carbonate, 4-fluoro-5-phenylvinylene carbonate, and 4,5-difluoroethylene carbonate.

Examples of the ethylene carbonate derivatives substituted with one or more aromatic rings or substituents having a carbon-carbon unsaturated bond include 4-fluoro-4-vinylethylene carbonate, 4-fluoro-5-vinyl ethylene carbonate, 4,4-difluoro-4-vinylethylene carbonate, 4,5-difluoro-4-vinylethylene carbonate, 4-fluoro-4,5-divinylethylene carbonate, 4,5-difluoro-4,5-divinylethylene carbonate, 4-fluoro-4-phenylethylene carbonate, 4-fluoro-5-phenylethylene carbonate, 4,4-difluoro-5-phenylethylene carbonate, and 4,5-difluoro-4-phenylethylene carbonate.

The molecular weight of the fluorinated unsaturated cyclic carbonate is not particularly limited, and the carbonate may have any desired molecular weight unless the effects of the invention are considerably lessened thereby. The molecular weight thereof is preferably 50-250. So long as the fluorinated unsaturated cyclic carbonate has a molecular weight within this range, it is easy to ensure the solubility of the fluorinated cyclic carbonate in the nonaqueous electrolytic solution and the effects of the invention are apt to be produced. Methods for producing the fluorinated unsaturated cyclic carbonate are not particularly limited, and the carbonate can be produced by a known method selected at will. The molecular weight of this carbonate is more preferably 80 or higher, and is more preferably 150 or less.

One fluorinated unsaturated cyclic carbonate may be used alone, or any desired two or more fluorinated unsaturated cyclic carbonates may be used in combination in any desired proportion. The amount of the fluorinated unsaturated cyclic carbonate to be incorporated is not particularly limited, and the carbonate may be incorporated in any desired amount unless the effects of the invention are considerably lessened thereby. The amount of the fluorinated unsaturated cyclic carbonate per 100% by mass the nonaqueous electrolytic solution is preferably 0.01% by mass or more, and is preferably 5% by mass or less. So long as the amount of the fluorinated unsaturated cyclic carbonate is within that range, it is easy to produce the effect of sufficiently improving the cycle characteristics of the nonaqueous-electrolyte secondary battery. In addition, it is easy to avoid the trouble that the battery has reduced high-temperature storability to evolve a gas in an increased amount and decreases in discharge capacity retention. The amount of the fluorinated unsaturated cyclic carbonate to be incorporated is more preferably 0.1% by mass or more, even more preferably 0.2% by mass or more, and is more preferably 4% by mass or less, even more preferably 3% by mass or less.

<Cyclic Sulfonic Acid Ester Compounds>

Cyclic sulfonic acid ester compounds usable in the nonaqueous electrolytic solution of the invention are not particularly limited in the kind thereof. However, compounds represented by general formula (2) are more preferred.

[Chem. 1]

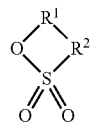

(2)

In the formula, $R^1$ and $R^2$ each independently represent an organic group configured of atoms selected from the group consisting of carbon, hydrogen, nitrogen, oxygen, sulfur, phosphorus, and halogen atoms. $R^1$ and $R^2$ each may contain an unsaturated bond together with —O—SO$_2$—.

It is preferred that $R^1$ and $R^2$ should be organic groups configured of atoms comprising carbon, hydrogen, oxygen, and sulfur atoms. In particular, it is preferred that $R^1$ and $R^2$ each should be a hydrocarbon group having 1-3 carbon atoms or an organic group having —O—SO$_2$—.

The molecular weight of such a cyclic sulfonic acid ester compound is not particularly limited, and the ester may have any desired molecular weight unless the effects of the invention are considerably lessened thereby. The molecular weight thereof is preferably 100-250. So long as the cyclic sulfonic acid ester compound has a molecular weight within that range, it is easy to ensure the solubility of the cyclic sulfonic acid ester compound in the nonaqueous electrolytic solution and the effects of the invention are apt to be produced. Methods for producing the cyclic sulfonic acid ester compound are not particularly limited, and the ester compound can be produced by a known method selected at will.

Examples of the compounds represented by general formula (2) include:
sultone compounds such as
1,3-propanesultone,
1-fluoro-1,3-propanesultone,
2-fluoro-1,3-propanesultone,
3-fluoro-1,3-propanesultone,
1-methyl-1,3-propanesultone,
2-methyl-1,3-propanesultone,
3-methyl-1,3-propanesultone,
1-propene-1,3-sultone,
2-propene-1,3-sultone,
1-fluoro-1-propene-1,3-sultone,
2-fluoro-1-propene-1,3-sultone,
3-fluoro-1-propene-1,3-sultone,
1-fluoro-2-propene-1,3-sultone,
2-fluoro-2-propene-1,3-sultone,
3-fluoro-2-propene-1,3-sultone,
1-methyl-1-propene-1,3-sultone,
2-methyl-1-propene-1,3-sultone,
3-methyl-1-propene-1,3-sultone,
1-methyl-2-propene-1,3-sultone,
2-methyl-2-propene-1,3-sultone,
3-methyl-2-propene-1,3-sultone,
1,4-butanesultone,
1-fluoro-1,4-butanesultone,
2-fluoro-1,4-butanesultone,
3-fluoro-1,4-butanesultone,
4-fluoro-1,4-butanesultone,
1-methyl-1,4-butanesultone,
2-methyl-1,4-butanesultone,
3-methyl-1,4-butanesultone,
4-methyl-1,4-butanesultone,
1-butene-1,4-sultone,
2-butene-1,4-sultone,
3-butene-1,4-sultone,
1-fluoro-1-butene-1,4-sultone,
2-fluoro-1-butene-1,4-sultone,
3-fluoro-1-butene-1,4-sultone,
4-fluoro-1-butene-1,4-sultone,
1-fluoro-2-butene-1,4-sultone,
2-fluoro-2-butene-1,4-sultone,
3-fluoro-2-butene-1,4-sultone,
4-fluoro-2-butene-1,4-sultone,
1-fluoro-3-butene-1,4-sultone,
2-fluoro-3-butene-1,4-sultone,
3-fluoro-3-butene-1,4-sultone,
4-fluoro-3-butene-1,4-sultone,
1-methyl-1-butene-1,4-sultone,
2-methyl-1-butene-1,4-sultone,
3-methyl-1-butene-1,4-sultone,
4-methyl-1-butene-1,4-sultone,
1-methyl-2-butene-1,4-sultone, 2-methyl-2-butene-1,4-sultone,
3-methyl-2-butene-1,4-sultone,
4-methyl-2-butene-1,4-sultone,
1-methyl-3-butene-1,4-sultone,
2-methyl-3-butene-1,4-sultone,
3-methyl-3-butene-1,4-sultone,
4-methyl-3-butene-1,4-sultone,
1,5-pentanesultone,
1-fluoro-1,5-pentanesultone,
2-fluoro-1,5-pentanesultone,
3-fluoro-1,5-pentanesultone,
4-fluoro-1,5-pentanesultone,
5-fluoro-1,5-pentanesultone,
1-methyl-1,5-pentanesultone,
2-methyl-1,5-pentanesultone,
3-methyl-1,5-pentanesultone,
4-methyl-1,5-pentanesultone,
5-methyl-1,5-pentanesultone,
1-pentene-1,5-sultone,
2-pentene-1,5-sultone,
3-pentene-1,5-sultone,
4-pentene-1,5-sultone,
1-fluoro-1-pentene-1,5-sultone,
2-fluoro-1-pentene-1,5-sultone,
3-fluoro-1-pentene-1,5-sultone,
4-fluoro-1-pentene-1,5-sultone,
5-fluoro-1-pentene-1,5-sultone,
1-fluoro-2-pentene-1,5-sultone,
2-fluoro-2-pentene-1,5-sultone,
3-fluoro-2-pentene-1,5-sultone,
4-fluoro-2-pentene-1,5-sultone,
5-fluoro-2-pentene-1,5-sultone,
1-fluoro-3-pentene-1,5-sultone,
2-fluoro-3-pentene-1,5-sultone,
3-fluoro-3-pentene-1,5-sultone,
4-fluoro-3-pentene-1,5-sultone,
5-fluoro-3-pentene-1,5-sultone,
1-fluoro-4-pentene-1,5-sultone,
2-fluoro-4-pentene-1,5-sultone,
3-fluoro-4-pentene-1,5-sultone,
4-fluoro-4-pentene-1,5-sultone,
5-fluoro-4-pentene-1,5-sultone,
1-methyl-1-pentene-1,5-sultone,
2-methyl-1-pentene-1,5-sultone,
3-methyl-1-pentene-1,5-sultone,
4-methyl-1-pentene-1,5-sultone,
5-methyl-1-pentene-1,5-sultone,
1-methyl-2-pentene-1,5-sultone,
2-methyl-2-pentene-1,5-sultone,
3-methyl-2-pentene-1,5-sultone,
4-methyl-2-pentene-1,5-sultone,
5-methyl-2-pentene-1,5-sultone,
1-methyl-3-pentene-1,5-sultone,
2-methyl-3-pentene-1,5-sultone,
3-methyl-3-pentene-1,5-sultone,
4-methyl-3-pentene-1,5-sultone,
5-methyl-3-pentene-1,5-sultone,
1-methyl-4-pentene-1,5-sultone,
2-methyl-4-pentene-1,5-sultone,
3-methyl-4-pentene-1,5-sultone,
4-methyl-4-pentene-1,5-sultone, and
5-methyl-4-pentene-1,5-sultone;
sulfate compounds such as
methylene sulfate,
ethylene sulfate, and
propylene sulfate;
disulfonate compounds such as
methylene methanedisulfonate and
ethylene methanedisulfonate;
nitrogen-containing compounds such as
1,2,3-oxathiazolidine-2,2-dioxide,
3-methyl-1,2,3-oxathiazolidine-2,2-dioxide,
3H-1,2,3-oxathiazole-2,2-dioxide,
5H-1,2,3-oxathiazole-2,2-dioxide,
1,2,4-oxathiazolidine-2,2-dioxide,
4-methyl-1,2,4-oxathiazolidine-2,2-dioxide,
3H-1,2,4-oxathiazole-2,2-dioxide,
5H-1,2,4-oxathiazole-2,2-dioxide,
1,2,5-oxathiazolidine-2,2-dioxide,
5-methyl-1,2,5-oxathiazolidine-2,2-dioxide,
3H-1,2,5-oxathiazole-2,2-dioxide,
5H-1,2,5-oxathiazole-2,2-dioxide,
1,2,3-oxathiazinane-2,2-dioxide,
3-methyl-1,2,3-oxathiazinane-2,2-dioxide,
5,6-dihydro-1,2,3-oxathiazine-2,2-dioxide,
1,2,4-oxathiazinane-2,2-dioxide,
4-methyl-1,2,4-oxathiazinane-2,2-dioxide,
5,6-dihydro-1,2,4-oxathiazine-2,2-dioxide,
3,6-dihydro-1,2,4-oxathiazine-2,2-dioxide,
3,4-dihydro-1,2,4-oxathiazine-2,2-dioxide,
1,2,5-oxathiazinane-2,2-dioxide,
5-methyl-1,2,5-oxathiazinane-2,2-dioxide,
5,6-dihydro-1,2,5-oxathiazine-2,2-dioxide,
3,6-dihydro-1,2,5-oxathiazine-2,2-dioxide,
3,4-dihydro-1,2,5-oxathiazine-2,2-dioxide,
1,2,6-oxathiazinane-2,2-dioxide,
6-methyl-1,2,6-oxathiazinane-2,2-dioxide,
5,6-dihydro-1,2,6-oxathiazine-2,2-dioxide,
3,4-dihydro-1,2,6-oxathiazine-2,2-dioxide, and
5,6-dihydro-1,2,6-oxathiazine-2,2-dioxide; and
phosphorus-containing compounds such as
1,2,3-oxathiaphoslane-2,2-oxide,
3-methyl-1,2,3-oxathiaphoslane-2,2-oxide,
3-methyl-1,2,3-oxathiaphoslane-2,2,3-trioxide,
3-methoxy-1,2,3-oxathiaphoslane-2,2,3-trioxide,
1,2,4-oxathiaphoslane-2,2-dioxide,
4-methyl-1,2,4-oxathiaphoslane-2,2-dioxide,
4-methyl-1,2,4-oxathiaphoslane-2,2,4-trioxide,
4-methoxy-1,2,4-oxathiaphoslane-2,2,4-trioxide,
1,2,5-oxathiaphoslane-2,2-dioxide,
5-methyl-1,2,5-oxathiaphoslane-2,2-dioxide,
5-methyl-1,2,5-oxathiaphoslane-2,2,5-trioxide,
5-methoxy-1,2,5-oxathiaphoslane-2,2,5-trioxide,
1,2,3-oxathiaphosphinane-2,2-dioxide,
3-methyl-1,2,3-oxathiaphosphinane-2,2-dioxide,
3-methyl-1,2,3-oxathiaphosphinane-2,2,3-trioxide,
3-methoxy-1,2,3-oxathiaphosphinane-2,2,3-trioxide,
1,2,4-oxathiaphosphinane-2,2-dioxide,
4-methyl-1,2,4-oxathiaphosphinane-2,2-dioxide,
4-methyl-1,2,4-oxathiaphosphinane-2,2,3-trioxide,
4-methyl-1,5,2,4-dioxathiaphosphinane-2,4-dioxide,
4-methoxy-1,5,2,4-dioxathiaphosphinane-2,4-dioxide,
3-methoxy-1,2,4-oxathiaphosphinane-2,2,3-trioxide,
1,2,5-oxathiaphosphinane-2,2-dioxide,
5-methyl-1,2,5-oxathiaphosphinane-2,2-dioxide,
5-methyl-1,2,5-oxathiaphosphinane-2,2,3-trioxide,
5-methoxy-1,2,5-oxathiaphosphinane-2,2,3-trioxide,
1,2,6-oxathiaphosphinane-2,2-dioxide,
6-methyl-1,2,6-oxathiaphosphinane-2,2-dioxide,
6-methyl-1,2,6-oxathiaphosphinane-2,2,3-trioxide, and
6-methoxy-1,2,6-oxathiaphosphinane-2,2,3-trioxide.

Preferred of these from the standpoint of improving storability are 1,3-propanesultone, 1-fluoro-1,3-propanesultone, 2-fluoro-1,3-propanesultone, 3-fluoro-1,3-propanesultone, 1-propene-1,3-sultone, 1-fluoro-1-propene-1,3-sultone, 2-fluoro-1-propene-1,3-sultone, 3-fluoro-1-propene-1,3-sultone, 1,4-butanesultone, methylene methanedisulfonate, and ethylene methanedisulfonate. More preferred are 1,3-propanesultone, 1-fluoro-1,3-propanesultone, 2-fluoro-1,3-propanesultone, 3-fluoro-1,3-propanesultone, and 1-propene-1,3-sultone.

One cyclic sulfonic acid ester compound may be used alone, or any desired two or more cyclic sulfonic acid ester compounds may be used in combination in any desired proportion. The amount of the cyclic sulfonic acid ester compound to be incorporated, based on the whole nonaqueous electrolytic solution of the invention, is not limited, and the ester compound may be incorporated in any desired amount unless the effects of the invention are considerably lessened thereby. However, the ester compound is incorporated in a concentration which is generally 0.001% by mass or more, preferably 0.1% by mass or more, more preferably 0.3% by mass or more, based on the nonaqueous electrolytic solution of the invention, and is generally 10% by mass or less, preferably 5% by mass or less, more preferably 3% by mass or less. When the concentration thereof satisfies that range, the effects concerning output characteristics, load characteristics, low-temperature characteristics, cycle characteristics, high-temperature storability, etc. are more improved.

<Compounds Having Cyano Group>

Compounds which have one or more cyano groups and are usable in the nonaqueous electrolytic solution of the invention are not particularly limited in the kind thereof so long as the compounds each have one or more cyano groups in the molecule. However, compounds represented by general formula (3) are more preferred.

[Chem. 2]

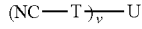

(3)

(In the formula, T represents an organic group configured of atoms selected from the group consisting of carbon, hydrogen, nitrogen, oxygen, sulfur, phosphorus, and halogen atoms, and U is a V-valent organic group which has 1-10 carbon atoms and may have a substituent. V is an integer of 1 or larger. When V is 2 or larger, the T's may be the same or different.)

The molecular weight of such a compound having one or more cyano groups is not particularly limited, and the compound may have any desired molecular weight unless the effects of the invention are considerably lessened thereby. The molecular weight thereof is preferably 50 or higher, more preferably 80 or higher, even more preferably 100 or higher, and is preferably 200 or less. So long as the compound having one or more cyano groups has a molecular weight within that range, it is easy to ensure the solubility of this compound in the nonaqueous electrolytic solution and the effects of the invention are apt to be produced. Methods for producing the compounds having one or more cyano groups are not particularly limited, and the compounds can be produced by a known method selected at will.

Examples of the compounds represented by general formula (3) include:
compounds having one cyano group, such as
acetonitrile,
propionitrile,
butyronitrile,
isobutyronitrile,
valeronitrile,
isovaleronitrile,
lauronitrile,
2-methylbutyronitrile,
trimethylacetonitrile,
hexanenitrile,
cyclopentanecarbonitrile,
cyclohexanecarbonitrile,
acrylonitrile,
methacrylonitrile,
crotononitrile,
3-methylcrotononitrile,
2-methyl-2-butenenitrile,
2-pentenenitrile,
2-methyl-2-pentenenitrile,
3-methyl-2-pentenenitrile,
2-hexenenitrile,
fluoroacetonitrile,
difluoroacetonitrile,
trifluoroacetonitrile,
2-fluoropropionitrile,
3-fluoropropionitrile,
2,2-difluoropropionitrile,
2,3-difluoropropionitrile,
3,3-difluoropropionitrile,
2,2,3-trifluoropropionitrile,
3,3,3-trifluoropropionitrile,
3,3'-oxydipropionitrile,
3,3'-thiodipropionitrile,
1,2,3-propanetricarbonitrile,
1,3,5-pentanetricarbonitrile, and
pentafluoropropionitrile;
compounds having two cyano groups, such as
malononitrile,
succinonitrile,
glutaronitrile,
adiponitrile,
pimelonitrile,
suberonitrile,
azelanitrile,
sebaconitrile,
undecanedinitrile,
dodecanedinitrile,
methylmalononitrile,
ethylmalononitrile,
isopropylmalononitrile,
tert-butylmalononitrile,
methylsuccinonitrile,
2,2-dimethylsuccinonitrile,
2,3-dimethylsuccinonitrile,
trimethylsuccinonitrile,
tetramethylsuccinonitrile,
3,3'-(ethylenedioxy)dipropionitrile, and
3,3'-(ethylenedithio)dipropionitrile;
compounds having three cyano groups, such as
1,2,3-tris(2-cyanoethoxy)propane and
tris(2-cyanoethyl)amine;
cyanate compounds such as
methyl cyanate,
ethyl cyanate,
propyl cyanate,
butyl cyanate,
pentyl cyanate,
hexyl cyanate, and
heptyl cyanate;
sulfur-containing compounds such as
methyl thiocyanate, ethyl thiocyanate,
propyl thiocyanate,
butyl thiocyanate,
pentyl thiocyanate,
hexyl thiocyanate,
heptyl thiocyanate,
methanesulfonyl cyanide,
ethanesulfonyl cyanide,
propanesulfonyl cyanide,
butanesulfonyl cyanide,
pentanesulfonyl cyanide,
hexanesulfonyl cyanide,
heptanesulfonyl cyanide,
methyl sulfurocyanidate,
ethyl sulfurocyanidate,
propyl sulfurocyanidate,
butyl sulfurocyanidate,
pentyl sulfurocyanidate,
hexyl sulfurocyanidate, and
heptyl sulfurocyanidate; and
phosphorus-containing compounds such as
cyanodimethylphosphine,
cyanodimethylphosphine oxide,
methyl cyanomethylphosphinate,
the methyl ester of cyanomethylphosphinous acid,
dimethylphosphinic cyanide,
dimethylphosphinous cyanide,
dimethyl cyanophosphonate,
the dimethyl ester of cyanophosphonous acid,
cyanomethyl methylphosphonate,
the cyanomethyl ester of methylphosphonous acid,
cyanodimethyl phosphate, and
cyanodimethyl phosphite.

Preferred of these, from the standpoint of improving storability, are
acetonitrile, propionitrile, butyronitrile, isobutyronitrile, valeronitrile, isovaleronitrile, lauronitrile, crotononitrile, 3-methylcrotononitrile, malononitrile, succinonitrile, glutaronitrile, adiponitrile, pimelonitrile, suberonitrile, azelanitrile, sebaconitrile, undecanedinitrile, and dodecanedinitrile. More preferred are compounds having two cyano groups, such as malononitrile, succinonitrile, glutaronitrile, adiponitrile, pimelonitrile, suberonitrile, azelanitrile, sebaconitrile, undecanedinitrile, and dodecanedinitrile.

One compound having one or more cyano groups may be used alone, or any desired two or more compounds having one or more cyano groups may be used in combination in any desired proportion. The amount of the compound having one or more cyano groups to be incorporate, based on the whole nonaqueous electrolytic solution of the invention, is not limited, and the compound may be incorporated in any desired amount unless the effects of the invention are considerably lessened thereby. However, the compound is incorporated in a concentration which is generally 0.001% by mass or higher, preferably 0.1% by mass or higher, more preferably 0.3% by mass or higher, based on the nonaqueous electrolytic solution of the invention, and is generally 10% by mass or less, preferably 5% by mass or less, more preferably 3% by mass or less. When the concentration thereof satisfies that range, the effects concerning output characteristics, load characteristics, low-temperature characteristics, cycle characteristics, high-temperature storability, etc. are more improved.

<Diisocyanate Compounds>

Diisocyanate compounds usable in the nonaqueous electrolytic solution of the invention are not particularly limited so long as the compounds each have two isocyanate groups in the molecule. However, diisocyanate compounds represented by the following general formula (4) are preferred.

[Chem. 3]

$$NCO—X—NCO \quad (4)$$

(In the formula, X is a hydrocarbon group which has 1-16 carbon atoms and may have been substituted with fluorine.)

In general formula (4), X is a hydrocarbon group which has 1-16 carbon atoms and may have been substituted with fluorine. The number of carbon atoms of X is preferably 2 or greater, more preferably 3 or greater, especially preferably 4 or greater, and is preferably 14 or less, more preferably 12 or less, especially preferably 10 or less, most preferably 8 or less. The kind of X is not particularly limited so long as X is a hydrocarbon group. Although X may be any of an aliphatic chain alkylene group, an aliphatic cyclic alkylene group, and an aromatic-ring-containing hydrocarbon group, it is preferred that X should be an aliphatic chain alkylene group or an aliphatic cyclic alkylene group.

Examples of the diisocyanates in the invention include:
linear polymethylene diisocyanates such as ethylene diisocyanate, trimethylene diisocyanate, tetramethylene diisocyanate, pentamethylene diisocyanate, hexamethylene diisocyanate, heptamethylene diisocyanate, octamethylene diisocyanate, decamethylene diisocyanate, dodecamethylene diisocyanate, and tetradecamethylene diisocyanate; branched alkylene diisocyanates such as methyltetramethylene diisocyanate, dimethyltetramethylene diisocyanate, trimethyltetramethylene diisocyanate, methylhexamethylene diisocyanate, dimethylhexamethylene diisocyanate, trimethylhexamethylene diisocyanate, methyloctamethylene diisocyanate, dimethyloctamethylene diisocyanate, and trimethyloctamethylene diisocyanate; diisocyanatoalkenes such as 1,4-diisocyanato-2-butene, 1,5-diisocyanato-2-pentene, 1,5-diisocyanato-3-pentene, 1,6-diisocyanato-2-hexene, 1,6-diisocyanato-3-hexene, 1,8-diisocyanato-2-octene, 1,8-diisocyanato-3-octene, and 1,8-diisocyanato-4-octene; fluorine-substituted diisocyanatoalkanes such as 1,3-diisocyanato-2-fluoropropane, 1,3-diisocyanato-2,2-difluoropropane, 1,4-diisocyanato-2-fluorobutane, 1,4-diisocyanato-2,2-difluorobutane, 1,4-diisocyanato-2,3-difluorobutane, 1,6-diisocyanato-2-fluorohexane, 1,6-diisocyanato-3-fluorohexane, 1,6-diisocyanato-2,2-difluorohexane, 1,6-diisocyanato-2,3-difluorohexane, 1,6-diisocyanato-2,4-difluorohexane, 1,6-diisocyanato-2,5-difluorohexane, 1,6-diisocyanato-3,3-difluorohexane, 1,6-diisocyanato-3,4-difluorohexane, 1,8-diisocyanato-2-fluorooctane, 1,8-diisocyanato-3-fluorooctane, 1,8-diisocyanato-4-fluorooctane, 1,8-diisocyanato-2,2-difluorooctane, 1,8-diisocyanato-2,3-difluorooctane, 1,8-diisocyanato-2,4-difluorooctane, 1,8-diisocyanato-2,5-difluorooctane, 1,8-diisocyanato-2,6-difluorooctane, and 1,8-diisocyanato-2,7-difluorooctane; cycloalkane-ring-containing diisocyanates such as 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, 1,2-bis(isocyanatomethyl)cyclohexane, 1,3-bis(isocyanatomethyl)cyclohexane, 1,4-bis(isocyanatomethyl)cyclohexane, dicyclohexylmethane 2,2'-diisocyanate, dicyclohexylmethane 2,4'-diisocyanate, dicyclohexylmethane 3,3'-diisocyanate, and dicyclohexylmethane 4,4'-diisocyanate; and aromatic-ring-containing diisocyanates such as 1,2-phenylene diisocyanate, 1,3-phenylene diisocyanate, 1,4-phenylene diisocyanate, tolylene 2,3-diisocyanate, tolylene 2,4-diisocyanate, tolylene 2,5-diisocyanate, tolylene 2,6-diisocyanate, tolylene 3,4-diisocyanate, tolylene 3,5-diisocyanate, 1,2-bis(isocyanatomethyl)benzene, 1,3-bis(isocyanatomethyl)benzene, 1,4-bis(isocyanatomethyl)benzene, 2,4-diisocyanatobiphenyl, 2,6-diisocyanatobiphenyl, 2,2'-diisocyanatobiphenyl, 3,3'-diisocyanatobiphenyl, 4,4'-diisocyanato-2-methylbiphenyl, 4,4'-diisocyanato-3-methylbiphenyl, 4,4'-diisocyanato-3,3'-dimethylbiphenyl, 4,4'-diisocyanatodiphenylmethane, 4,4'-diisocyanato-2-methyldiphenylmethane, 4,4'-diisocyanato-3-methyldiphenylmethane, 4,4'-diisocyanato-3,3'-dimethyldiphenylmethane, 1,5-diisocyanatonaphthalene, 1,8-diisocyanatonaphthalene, 2,3-diisocyanatonaphthalene, 1,5-bis(isocyanatomethyl)naphthalene, 1,8-bis(isocyanatomethyl)naphthalene, and 2,3-bis(isocyanatomethyl)naphthalene.

Preferred of these are:

linear polymethylene diisocyanates such as ethylene diisocyanate, trimethylene diisocyanate, tetramethylene diisocyanate, pentamethylene diisocyanate, hexamethylene diisocyanate, heptamethylene diisocyanate, octamethylene diisocyanate, decamethylene diisocyanate, dodecamethylene diisocyanate, and tetradecamethylene diisocyanate; branched alkylene diisocyanates such as methyltetramethylene diisocyanate, dimethyltetramethylene diisocyanate, trimethyltetramethylene diisocyanate, methylhexamethylene diisocyanate, dimethylhexamethylene diisocyanate, trimethylhexamethylene diisocyanate, methyloctamethylene diisocyanate, dimethyloctamethylene diisocyanate, and trimethyloctamethylene diisocyanate; and cycloalkane-ring-containing diisocyanates such as 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, 1,2-bis(isocyanatomethyl)cyclohexane, 1,3-bis(isocyanatomethyl)cyclohexane, 1,4-bis(isocyanatomethyl)cyclohexane, dicyclohexylmethane 2,2'-diisocyanate, dicyclohexylmethane 2,4'-diisocyanate, dicyclohexylmethane 3,3'-diisocyanate, and dicyclohexylmethane 4,4'-diisocyanate.

Especially preferred of these are:

a linear polymethylene diisocyanate selected from tetramethylene diisocyanate, pentamethylene diisocyanate, hexamethylene diisocyanate, heptamethylene diisocyanate, and octamethylene diisocyanate; and a cycloalkane-ring-containing diisocyanate selected from 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, 1,2-bis(isocyanatomethyl)cyclohexane, 1,3-bis(isocyanatomethyl)cyclohexane, 4-bis(isocyanatomethyl)cyclohexane, dicyclohexylmethane 2,2'-diisocyanate, dicyclohexylmethane 2,4'-diisocyanate, dicyclohexylmethane 3,3'-diisocyanate, and dicyclohexylmethane 4,4'-diisocyanate.

One of those diisocyanates in the invention may be used alone, or any desired two or more thereof may be used in combination in any desired proportion.

The content of such a diisocyanate usable in the nonaqueous electrolytic solution of the invention, based on the whole nonaqueous electrolytic solution, is usually 0.001% by mass or higher, preferably 0.01% by mass or higher, more preferably 0.1% by mass or higher, even more preferably 0.3% by mass or higher, and is usually 5% by mass or less, preferably 4.0% by mass or less, more preferably 3.0% by mass or less, even more preferably 2% by mass or less. When the content thereof is within that range, durability such as cycle characteristics and storability can be improved and the effects of the invention can be sufficiently produced.

<Overcharge Inhibitor>

An overcharge inhibitor can be used in the nonaqueous electrolytic solution of the invention in order to effectively inhibit the nonaqueous-electrolyte secondary battery from bursting or firing when brought into an overcharged state or the like.

Examples of the overcharge inhibitor include: aromatic compounds such as biphenyl, alkylbiphenyls, terphenyl, partly hydrogenated terphenyls, cyclohexylbenzene, t-butylbenzene, t-amylbenzene, diphenyl ether, and dibenzofuran; products of partial fluorination of these aromatic compounds, such as 2-fluorobiphenyl, o-cyclohexylfluorobenzene, and p-cyclohexylfluorobenzene; and fluorine-containing anisole compounds such as 2,4-difluoroanisole, 2,5-difluoroanisole, 2,6-difluoroanisole, and 3,5-difluoroanisole. Preferred of these are aromatic compounds such as biphenyl, alkylbiphenyls, terphenyl, partly hydrogenated terphenyls, cyclohexylbenzene, t-butylbenzene, t-amylbenzene, diphenyl ether, and dibenzofuran. One of these may be used alone, or two or more thereof may be used in combination. In the case where two or more compounds are used in combination, the following combinations are especially preferred from the standpoint of a balance between overcharge-preventive properties and high-temperature storability: a combination of cyclohexylbenzene with t-butylbenzene or t-amylbenzene; and a combination of at least one member selected from aromatic compounds containing no oxygen, such as biphenyl, alkylbiphenyls, terphenyl, partly hydrogenated terphenyls, cyclohexylbenzene, t-butylbenzene, and t-amylbenzene, with at least one member selected from oxygen-containing aromatic compounds such as diphenyl ether and dibenzofuran.

The amount of the overcharge inhibitor to be incorporated is not particularly limited, and the overcharge inhibitor may be incorporated in any desired amount unless the effects of the invention are considerably lessened thereby. The amount of the overcharge inhibitor is preferably 0.1-5% by mass per 100% by mass the nonaqueous electrolytic solution. So long as the amount thereof is within that range, it is easy to sufficiently produce the effect of the overcharge inhibitor and it is easy to avoid the trouble that battery characteristics including high-temperature storability decrease. The amount of the overcharge inhibitor is more preferably 0.2% by mass or more, even more preferably 0.3% by mass or more, especially preferably 0.5% by mass or more, and is more preferably 3% by mass or less, even more preferably 2% by mass or less.

<Other Aids>

Other known aids can be used in the nonaqueous electrolytic solution of the invention. Examples of the other aids include: carbonate compounds such as erythritane carbonate, spiro-bis-dimethylene carbonate, and methoxyethyl methyl carbonate; carboxylic acid anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride; spiro compounds such as 2,4,8,10-tetraoxaspiro[5.5]undecane and 3,9-divinyl-2,4,8,10-tetraoxaspiro[5.5]undecane; sulfur-containing compounds such as ethylene sulfite, methyl fluorosulfonate, ethyl fluorosulfonate, methyl methanesulfonate, ethyl methanesulfonate, busulfan, sulfolene, ethylene sulfate, vinylene sulfate, diphenyl sulfone, N,N-dimethylmethanesulfonamide, and N,N-diethylmethanesulfonamide; nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide; hydrocarbon compounds such as heptane, octane, nonane, decane, and cycloheptane; fluorine-containing aromatic compounds such as fluorobenzene, difluorobenzene, hexafluorobenzene, and benzotrifluoride; and silane compounds such as tris(trimethylsilyl) borate, tris(trimethoxysilyl) borate, tris(trimethylsilyl) phosphate, tris(trimethoxysilyl) phosphate, dimethoxyaluminoxytrimethoxysilane, diethoxyaluminoxytriethoxysilane, dipropoxyaluminoxytriethoxysilane, dibutoxyaluminoxytrimethoxysilane, dibutoxyaluminoxytriethoxysilane, titanium tetrakis(trimethylsiloxide), and titanium tetrakis(triethylsiloxide). One of these aids may be used alone, or two or more thereof may be used in combination. By adding these aids, capacity retentivity after high-temperature storage and cycle characteristics can be improved.

The amount of the other aids to be incorporated is not particularly limited, and the other aids may be incorporated in any desired amount unless the effects of the invention are considerably lessened thereby. The amount of the other aids is preferably 0.01-5% by mass per 100%) by mass the nonaqueous electrolytic solution. So long as the amount thereof is within that range, it is easy to sufficiently produce the effects of the other aids and it is easy to avoid the trouble that battery characteristics including high-load discharge characteristics decrease. The amount of the other aids to be incorporated is more preferably 0.1% by mass or more, even more preferably 0.2% by mass or more, and is more preferably 3% by mass or less, even more preferably 1% by mass or less.

The nonaqueous electrolytic solution described above includes the nonaqueous electrolytic solution present in inner parts of the nonaqueous-electrolyte battery according to the invention. Specifically, the invention includes: the nonaqueous electrolytic solution present in a nonaqueous-electrolyte battery obtained by separately synthesizing constituent elements for a nonaqueous electrolytic solution, such as a lithium salt, a solvent, and aids, preparing the nonaqueous electrolytic solution from the substantially separate constituent elements, and introducing the nonaqueous electrolytic solution into a battery separately assembled by the method which will be described later. The invention further includes: the case in which constituent elements for a nonaqueous electrolytic solution of the invention are separately introduced into a battery and mixed together within the battery to thereby obtain the same composition as the nonaqueous electrolytic solution of the invention; and the case in which a compound serving as a component of a nonaqueous electrolytic solution of the invention is generated within the nonaqueous-electrolyte battery to obtain the same composition as the nonaqueous electrolytic solution of the invention.

2. Nonaqueous-Electrolyte Secondary Battery

The nonaqueous-electrolyte secondary battery of the invention includes: a negative electrode and a positive electrode which are capable of occluding and releasing ions; and the nonaqueous electrolytic solution of the invention.

<2-1. Battery Configuration>

The nonaqueous-electrolyte secondary battery of the invention has the same configuration as conventionally known nonaqueous-electrolyte secondary batteries, except for the negative electrode and the nonaqueous electrolytic solution. Usually, the battery of the invention has a configuration obtained by superposing a positive electrode and a negative electrode through a porous film (separator) impregnated with the nonaqueous electrolytic solution of the invention and disposing the stack in a case (outer case). Consequently, the shape of the nonaqueous-electrolyte secondary battery of the invention is not particularly limited, and may be any of cylindrical, prismatic, laminate type, coin type, large-size, and other shapes.

<2-2. Nonaqueous Electrolyte Solution>

As the nonaqueous electrolytic solution, use is made of the nonaqueous electrolytic solution of the invention described above. Incidentally, a blend of the nonaqueous electrolytic solution of the invention with another nonaqueous electrolytic solution can be used so long as use of this blend does not depart from the spirit of the invention.

<2-3. Negative Electrode>

The negative electrode includes a current collector and a negative-electrode active-material layer disposed thereon. The negative-electrode active material is described below.

The negative-electrode active material is not particularly limited so long as the active material is capable of electrochemically occluding and releasing lithium ions. Examples thereof include a carbonaceous material, an alloy material, and a lithium-containing composite metal oxide material. One of these materials may be used alone, or any desired two or more thereof may be used in combination in any desired proportion.

<2-3-1. Carbonaceous Material>

The carbonaceous material to be used as a negative-electrode active material preferably is a material selected from:
(1) natural graphites;
(2) carbonaceous materials obtained by subjecting artificial carbonaceous substances and artificial graphitic substances to a heat treatment at a temperature in the range of 400-3,200° C. one or more times;
(3) carbonaceous materials giving a negative-electrode active-material layer which is composed of at least two carbonaceous substances differing in crystallinity and/or has an interface where at least two carbonaceous substances differing in crystallinity are in contact with each other; and
(4) carbonaceous materials giving a negative-electrode active-material layer which is composed of at least two carbonaceous substances differing in orientation and/or has an interface where at least two carbonaceous substances differing in orientation are in contact with each other.

This is because this carbonaceous material brings about a satisfactory balance between initial irreversible capacity and high-current-density charge/discharge characteristics. One of the carbonaceous materials (1) to (4) may be used alone, or any desired two or more thereof may be used in combination in any desired proportion.

Examples of the artificial carbonaceous substances and artificial graphitic substances in (2) above include natural graphites, coal coke, petroleum coke, coal pitch, petroleum pitch, carbonaceous substances obtained by oxidizing these pitches, needle coke, pitch coke, carbon materials obtained by partly graphitizing these cokes, products of the pyrolysis of organic substances, such as furnace black, acetylene black, and pitch-derived carbon fibers, organic substances capable of carbonization and products of the carbonization thereof, or solutions obtained by dissolving any of such organic substances capable of carbonization in a low-molecular organic solvent, e.g., benzene, toluene, xylene, quinoline, or n-hexane, and products of the carbonization of these solutions.

<2-3-2. Configuration and Properties of Carbonaceous Negative Electrode and Method for Preparation Thereof>

With respect to the properties of a carbonaceous material, the negative electrode containing the carbonaceous material, techniques for electrode formation, the current collector, and the nonaqueous-electrolyte secondary battery, it is desirable that any one or more of the following (1) to (13) should be simultaneously satisfied.

(1) X-Ray Parameter

The carbonaceous material preferably has a value of d (interplanar spacing) for the lattice planes (002), as determined by X-ray diffractometry in accordance with the method of the Japan Society for Promotion of Scientific Research, of generally 0.335-0.340 nm, especially 0.335-

0.338 nm, in particular 0.335-0.337 nm. The crystallite size (Lc) thereof as determined by X-ray diffractometry in accordance with the method of the Japan Society for Promotion of Scientific Research is generally 1.0 nm or larger, preferably 1.5 nm or larger, especially preferable 2 nm or larger.

(2) Volume-Average Particle Diameter

The volume-average particle diameter of the carbonaceous material, in terms of volume-average particle diameter (median diameter) as determined by the laser diffraction/scattering method, is generally 1 μm or more, preferably 3 μm or more, more preferably 5 μm or more, especially preferably 7 μm or more, and is generally 100 μm or less, preferably 50 μm or less, more preferably 40 μm or less, even more preferably 30 μm or less, especially preferably 25 μm or less. When the volume-average particle diameter thereof is less than that range, there are cases where irreversible capacity increases, leading to a loss in initial battery capacity. When the volume-average particle diameter thereof exceeds that range, there are cases where such a carbonaceous material is undesirable from the standpoint of battery production because an uneven coating surface is apt to result when an electrode is produced through coating fluid application.

Volume-average particle diameter is determined by dispersing the carbon powder in a 0.2% by mass aqueous solution (about 10 mL) of poly(oxyethylene(20)) sorbitan monolaurate as a surfactant and examining the dispersion with a laser diffraction/scattering type particle size distribution analyzer (LA-700, manufactured by HORIBA, Ltd.). The median diameter determined through this measurement is defined as the volume-average particle diameter of the carbonaceous material according to the invention.

(3) Raman R Value, Raman Half-Value Width

The Raman R value of the carbonaceous material as determined by the argon ion laser Raman spectroscopy is generally 0.01 or higher, preferably 0.03 or higher, more preferably 0.1 or higher, and is generally 1.5 or less, preferably 1.2 or less, more preferably 1 or less, especially preferably 0.5 or less.

When the Raman R value thereof is less than that range, there are cases where the surface of the particles has too high crystallinity and the number of intercalation sites into which lithium comes with charge/discharge decreases. Namely, there are cases where the carbonaceous material decreases in suitability for charge. In addition, there are cases where when a coating fluid containing the carbonaceous material is applied to a current collector and the resultant coating is pressed to heighten the density of the negative electrode, then the crystals are apt to orient in directions parallel to the electrode plate and this leads to a decrease in load characteristics. On the other hand, when the Raman R value thereof exceeds that range, there are cases where the surface of the particles has reduced crystallinity and enhanced reactivity with the nonaqueous electrolytic solution and this leads to a decrease in efficiency and enhanced gas evolution.

The Raman half-value width around 1,580 $cm^{-1}$ of the carbonaceous material is not particularly limited. However, the half-value width thereof is generally 10 $cm^{-1}$ or more, preferably 15 $cm^{-1}$ or more, and is generally 100 $cm^{-1}$ or less, preferably 80 $cm^{-1}$ or less, more preferably 60 $cm^{-1}$ or less, especially preferably 40 $cm^{-1}$ or less.

When the Raman half-value width thereof is less than that range, there are cases where the surface of the particles has too high crystallinity and the number of intercalation sites into which lithium comes with charge/discharge decreases. Namely, there are cases where the carbonaceous material decreases in suitability for charge. In addition, there are cases where when a coating fluid containing the carbonaceous material is applied to a current collector and the resultant coating is pressed to heighten the density of the negative electrode, then the crystals are apt to orient in directions parallel to the electrode plate and this leads to a decrease in load characteristics. On the other hand, when the Raman half-value width thereof exceeds that range, there are cases where the surface of the particles has reduced crystallinity and enhanced reactivity with the nonaqueous electrolytic solution and this leads to a decrease in efficiency and enhanced gas evolution.

The examination for Raman spectrum is made with a Raman spectrometer (Raman spectrometer manufactured by Japan Spectroscopic Co., Ltd.). In the examination, a sample is charged into a measuring cell by causing the sample to fall naturally into the cell and the surface of the sample in the cell is irradiated with argon ion laser light while rotating the cell in a plane perpendicular to the laser light. The Raman spectrum obtained is examined for the intensity IA of a peak PA around 1,580 $cm^{-1}$ and the intensity IB of a peak PB around 1,360 $cm^{-1}$. The ratio between these intensities $R(R=IB/IA)$ is calculated. The Raman R value calculated through this examination is defined as the Raman R value of the carbonaceous material according to the invention. Furthermore, the half-value width of the peak PA around 1,580 $cm^{-1}$ in the Raman spectrum obtained is measured, and this value is defined as the Raman half-value width of the carbonaceous material according to the invention.

Conditions for the Raman spectroscopy are as follows.
Wavelength of argon ion laser: 514.5 nm
Laser power on sample: 15-25 mW
Resolution: 10-20 $cm^{-1}$
Examination range: 1,100 $cm^{-1}$ to 1,730 $cm^{-1}$
Analysis for Raman R value and Raman half-value width: background processing
Smoothing: simple average; convolution, 5 points (4) BET Specific Surface Area The BET specific surface area of the carbonaceous material, in terms of the value of specific surface area as determined by the BET method, is generally 0.1 $m^2 \cdot g^{-1}$ or larger, preferably 0.7 $m^2 \cdot g^{-1}$ or larger, more preferably 1.0 $m^2 \cdot g^{-1}$ or larger, especially preferably 1.5 $m^2 \cdot g^{-1}$ or larger, and is generally 100 $m^2 \cdot g^{-1}$ or smaller, preferably 25 $m^2 \cdot g^{-1}$ or smaller, more preferably 15 $m^2 \cdot g^{-1}$ or smaller, especially preferably 10 $m^2 \cdot g^{-1}$ or smaller.

In case where the BET specific surface area thereof is less than that range, this carbonaceous material, when used as a negative-electrode material, is less apt to accept lithium during charge and lithium deposition is apt to occur on the electrode surface. Namely, there is the possibility of resulting in a decrease in stability. On the other hand, when the BET specific surface area thereof exceeds that range, there are cases where this carbonaceous material, when used as a negative-electrode material, is apt to have increased reactivity with the nonaqueous electrolytic solution to cause enhanced gas evolution, making it difficult to give a preferred battery.

The determination of specific surface area by the BET method is made with a surface area meter (a fully automatic surface area measuring apparatus manufactured by Ohkura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmospheric pressure. The specific surface area determined through this measurement is defined as the BET specific surface area of the carbonaceous material according to the invention.

(5) Roundness

When the carbonaceous material is examined for roundness as an index to the degree of sphericity thereof, the roundness thereof is preferably within the range shown below. Roundness is defined by "Roundness=(length of periphery of equivalent circle having the same area as projected particle shape)/(actual length of periphery of projected particle shape)". When a particle has a roundness of 1, this particle theoretically is a true sphere.

The closer to 1 the roundness of carbonaceous-material particles having a particle diameter in the range of 3-40 µm, the more the particles are desirable. The roundness of the particles is desirably 0.1 or higher, preferably 0.5 or higher, more preferably 0.8 or higher, even more preferably 0.85 or higher, especially preferably 0.9 or higher.

The higher the roundness, the more the high-current-density charge/discharge characteristics are improved. Consequently, when the carbonaceous-material particles have a roundness less than that range, there are cases where the negative-electrode active material has reduced suitability for loading and has enhanced interparticle resistance, resulting in a decrease in short-time high-current-density charge/discharge characteristics.

Roundness is determined with a flow type particle image analyzer (FPIA, manufactured by Sysmex Industrial Corp.). About 0.2 g of a sample is dispersed in a 0.2% by mass aqueous solution (about 50 mL) of poly(oxyethylene(20)) sorbitan monolaurate as a surfactant, and an ultrasonic wave of 28 kHz is propagated to the dispersion for 1 minute at an output of 60 W. Thereafter, particles having a particle diameter in the range of 3-40 µm are examined with the analyzer having a detection range set at 0.6-400 µm. The roundness determined through this measurement is defined as the roundness of the carbonaceous material according to the invention.

Methods for improving roundness are not particularly limited. However, a carbonaceous material in which the particles have been rounded by a rounding treatment is preferred because this material gives an electrode in which the interstices among particles are uniform in shape. Examples of the rounding treatment include: a method in which shear force or compressive force is applied to thereby mechanically make the shape of the particles close to sphere; and a method of mechanical/physical treatment in which fine particles are aggregated into particles by means of the bonding force of either a binder or the fine particles themselves.

(6) Tap Density

The tap density of the carbonaceous material is generally 0.1 g·cm$^{-3}$ or higher, preferably 0.5 g·cm$^{-3}$ or higher, more preferably 0.7 g·cm$^{-3}$ or higher, especially preferably 1 g·cm$^{-3}$ or higher, and is preferably 2 g·cm$^{-3}$ or less, more preferably 1.8 g·cm$^{-3}$ or less, especially preferably 1.6 g·cm$^{-3}$ or less.

When the tap density thereof is less than that range, there are cases where this carbonaceous material, when used in a negative electrode, is less apt to attain an increased loading density, making it impossible to obtain a high-capacity battery. When the tap density thereof exceeds that range, there are cases where the amount of interparticle interstices in the electrode is too small and, hence, electrical conductivity among the particles is less apt to be ensured, making it difficult to obtain preferred battery characteristics.

Tap density is determined by dropping a sample through a sieve having an opening size of 300 µm into a 20-cm$^3$ tapping cell to fill the cell with the sample up to the brim, subsequently conducting a tapping operation 1,000 times over a stroke length of 10 mm using a powder densimeter (e.g., Tap Denser, manufactured by Seishin Enterprise Co., Ltd.), and calculating the tap density from the resultant volume of the sample and the weight thereof. The tap density calculated through this measurement is defined as the tap density of the carbonaceous material according to the invention.

(7) Orientation Ratio

The orientation ratio of the carbonaceous material is generally 0.005 or greater, preferably 0.01 or greater, more preferably 0.015 or greater, and is generally 0.67 or less. When the orientation ratio thereof is less than that range, there are cases where high-density charge/discharge characteristics decrease. The upper limit of that range is a theoretical upper limit of the orientation ratio of carbonaceous materials.

Orientation ratio is determined by X-ray diffractometry after a sample is molded by compaction. A molded object obtained by packing 0.47 g of a sample into a molding machine having a diameter of 17 mm and compacting the sample at 58.8 MN·m$^{-2}$ is set with clay on a sample holder for examination so as to be flush with the holder. This sample is examined for X-ray diffraction. From the intensities of the resultant (110) diffraction peak and (004) diffraction peak for the carbon, the ratio represented by (110) diffraction peak intensity/(004) diffraction peak intensity is calculated. The orientation ratio calculated through this measurement is defined as the orientation ratio of the carbonaceous material according to the invention.

Conditions for the X-ray diffractometry are as follows. Incidentally, "2θ" represents diffraction angle.

Target: Cu (Kα line) graphite monochromator
Slits:
Divergence slit=0.5 degrees
Receiving slit=0.15 mm
Scattering slit=0.5 degrees
Examination range and step angle/measuring time:
(110) plane: 75°≤2θ≤80° 1°/60 sec
(004) plane: 52°≤2θ≤57° 1°/60 sec (8) Aspect Ratio (Powder)

The aspect ratio of the carbonaceous material is generally 1 or greater, and is generally 10 or less, preferably 8 or less, more preferably 5 or less. When the aspect ratio thereof exceeds that range, there are cases where the carbonaceous material causes streak lines in electrode plate formation and an even coating surface cannot be obtained, resulting in a decrease in high-current-density charge/discharge characteristics. Incidentally, the lower limit of that range is a theoretical lower limit of the aspect ratio of carbonaceous materials.

In determining aspect ratio, particles of the carbonaceous material are examined with a scanning electron microscope with enlargement. Fifty are arbitrarily selected from graphite particles fixed to an edge face of a metal having a thickness of 50 µm or less, and each particle is examined in a three-dimensional manner while rotating and inclining the stage to which the sample is fixed. In this examination, the length of the longest axis A of each carbonaceous-material particle and the length of the shortest axis B perpendicular to that axis are measured, and the average of the A/B values is determined. The aspect ratio (A/B) determined through this measurement is defined as the aspect ratio of the carbonaceous material according to the invention.

(9) Electrode Production

Any known method can be used for electrode production unless this considerably lessens the effects of the invention. For example, a binder and a solvent are added to a negative-electrode active material optionally together with a thickener, conductive material, filler, etc. to obtain a slurry, and this slurry is applied to a current collector and dried. Thereafter, the coated current collector is pressed. Thus, an electrode can be formed.

At the stage just before the step of introducing the nonaqueous electrolytic solution in battery production, the thickness of the negative-electrode active-material layer per surface is generally 15 μm or more, preferably 20 μm or more, more preferably 30 μm or more, and is generally 150 μm or less, preferably 120 μm or less, more preferably 100 μm or less. The reasons for this are as follows. When the thickness of the negative-electrode active material exceeds that range, there are cases where high-current-density charge/discharge characteristics decrease because the nonaqueous electrolytic solution is less apt to infiltrate into around the current collector interface. Furthermore, when the thickness thereof is less than that range, there are cases where the battery has a reduced capacity because the volume ratio of the current collector to the negative-electrode active material is high. Meanwhile, a negative-electrode active material may be formed into a sheet electrode by rolling, or may be compression-molded into a pellet electrode.

(10) Current Collector

As the current collector for holding the negative-electrode active material, a known current collector can be used at will. Examples of the current collector for the negative electrode include metallic materials such as copper, nickel, stainless steel, and nickel-plated steel. Copper is especially preferred from the standpoints of processability and cost.

In the case where the current collector is a metallic material, examples of the shape of the current collector include metal foils, metal cylinders, metal coils, metal plates, thin metal films, expanded metals, punching metals, and metal foam. Preferred of these are thin metal films. More preferred are copper foils. Even more preferred are a rolled copper foil, which is produced by the rolling process, and an electrolytic copper foil, which is produced by the electrolytic process. Either of these can be used as a current collector.

In the case where a copper foil having a thickness less than 25 μm is to be used, this copper foil can be a foil of a copper alloy (phosphor bronze, titanium-copper, Corson alloy, Cu—Cr—Zr alloy, etc.) which has higher strength than pure copper.

(10-1) Thickness of Current Collector

The current collector may have any desired thickness. However, the thickness thereof is generally 1 μm or more, preferably 3 μm or more, more preferably 5 μm or more, and is generally 1 mm or less, preferably 100 μm or less, more preferably 50 μm or less. When the thickness of the metal film is less than 1 μm, there are cases where coating fluid application thereto is difficult because of the reduced strength thereof. When the thickness thereof is larger than 100 μm, there are cases where the electrode shape obtained by, for example, winding is deformed. Incidentally, the current collector may be a meshy material.

(11) Thickness Ratio Between Current Collector and Negative-Electrode Active-Material Layer The thickness ratio between the current collector and the negative-electrode active-material layer is not particularly limited. However, the value of "(thickness of the negative-electrode active-material layer on one surface just before impregnation with nonaqueous electrolytic solution)/(thickness of the current collector)" is preferably 150 or less, more preferably 20 or less, especially preferably 10 or less, and is preferably 0.1 or greater, more preferably 0.4 or greater, especially preferably 1 or greater.

When the thickness ratio between the current collector and the negative-electrode active-material layer exceeds that range, there are cases where this current collector is heated up by Joule's heat during high-current-density charge/discharge. When the thickness ratio therebetween is less than that range, there are cases where the battery has a reduced capacity because the proportion by volume of the current collector to the negative-electrode active material is high.

(12) Electrode Density

The structure of the electrode formed using a negative-electrode active material is not particularly limited. However, the density of the negative-electrode active material present on the current collector is preferably 1 g·cm$^{-3}$ or higher, more preferably 1.2 g·cm$^{-3}$ or higher, especially preferably 1.3 g·cm$^{-3}$ or higher, and is preferably 2.2 g·cm$^{-3}$ or less, more preferably 2.1 g·cm$^{-3}$ or less, even more preferably 2.0 g·cm$^{-3}$ or less, especially preferably 1.9 g·cm$^{-3}$ or less. When the density of the negative-electrode active material present on the current collector exceeds that range, there are cases where the negative-electrode active-material particles are broken and this increases the initial irreversible capacity and reduces the infiltration of the nonaqueous electrolytic solution into around the current collector/negative-electrode active material interface, resulting in a deterioration in high-current-density charge/discharge characteristics. When the density thereof is less than that range, there are cases where electrical conductivity among the negative-electrode active-material particles decreases and this increases battery resistance, resulting in a decrease in capacity per unit volume.

(13) Binder

The binder for binding the negative-electrode active material is not particularly limited so long as the binder is stable to the nonaqueous electrolytic solution and to the solvent to be used for electrode production.

Examples thereof include resinous polymers such as polyethylene, polypropylene, poly(ethylene terephthalate), poly(methyl methacrylate), aromatic polyamides, cellulose, and nitrocellulose; rubbery polymers such as SBR (styrene/butadiene rubbers), isoprene rubbers, butadiene rubbers, fluororubbers, NBR (acrylonitrile/butadiene rubbers), and ethylene/propylene rubbers; styrene/butadiene/styrene block copolymers or products of hydrogenation thereof; thermoplastic elastomeric polymers such as EPDM (ethylene/propylene/diene terpolymers), styrene/ethylene/butadiene/styrene copolymers, and styrene/isoprene/styrene block copolymers or products of hydrogenation thereof; flexible resinous polymers such as syndiotactic 1,2-polybutadiene, poly(vinyl acetate), ethylene/vinyl acetate copolymers, and propylene/α-olefin copolymers; fluorochemical polymers such as poly(vinylidene fluoride), polytetrafluoroethylene, fluorinated poly(vinylidene fluoride), and polytetrafluoroethylene/ethylene copolymers; and polymer compositions having the property of conducting alkali metal ions (especially lithium ions). One of these binders may be used alone, or any desired two or more thereof may be used in combination in any desired proportion.

The kind of the solvent to be used for forming a slurry is not particularly limited so long as the negative-electrode active material and binder and the thickener and conductive material which are optionally used according to need can be dissolved or dispersed therein. Either an aqueous solvent or an organic solvent may be used.

Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethyl ether, dimethylacetamide, hexamethylphosphoramide, dimethyl sulfoxide, benzene, xylene, quinoline, pyridine, methylnaphthalene, and hexane.

Especially when an aqueous solvent is used, it is preferred to add a dispersant or the like in combination with a thickener and prepare a slurry using a latex of, for example, SBR. One of those solvents may be used alone, or any desired two or more thereof may be used in combination in any desired proportion.

The proportion of the binder to the negative-electrode active material is preferably 0.1% by mass or higher, more preferably 0.5% by mass or higher, especially preferably 0.6% by mass or higher, and is preferably 20% by mass or less, more preferably 15% by mass or less, even more preferably 10% by mass or less, especially preferably 8% by mass or less. When the proportion of the binder to the negative-electrode active material exceeds that range, there are cases where the proportion of the binder which does not contribute to battery capacity increases and this leads to a decrease in battery capacity. When the proportion thereof is less than that range, there are cases where the negative electrode has a reduced strength.

Especially when the binder includes a rubbery polymer represented by SBR as the main component, the proportion of this binder to the negative-electrode active material is generally 0.1% by mass or higher, preferably 0.5% by mass or higher, more preferably 0.6% by mass or higher, and is generally 5% by mass or less, preferably 3% by mass or less, more preferably 2% by mass or less.

In the case where the binder includes a fluorochemical polymer represented by poly(vinylidene fluoride) as the main component, the proportion of this binder to the negative-electrode active material is generally 1% by mass or higher, preferably 2% by mass or higher, more preferably 3% by mass or higher, and is generally 15% by mass or less, preferably 10%) by mass or less, more preferably 8% by mass or less.

A thickener is used generally for the purpose of regulating the slurry viscosity. The thickener is not particularly limited. Examples thereof include carboxymethyl cellulose, methyl cellulose, hydroxymethyl cellulose, ethyl cellulose, polyvinyl alcohol), oxidized starch, phosphorylated starch, casein, and salts of these. One of these thickeners may be used alone, or any desired two or more thereof may be used in combination in any desired proportion.

In the case where such a thickener is further added, the proportion of the thickener to the negative-electrode active material is generally 0.1% by mass or higher, preferably 0.5% by mass or higher, more preferably 0.6% by mass or higher, and is generally 5% by mass or less, preferably 3% by mass or less, more preferably 2% by mass or less. When the proportion of the thickener to the negative-electrode active material is less than that range, there are cases where applicability decreases considerably. When the proportion thereof exceeds that range, the proportion of the negative-electrode active material in the negative-electrode active-material layer is low. There is hence a problem that the battery has a reduced capacity, and there are cases where resistance among the particles of the negative-electrode active material increases.

<2-3-3. Metal Compound Material, Configuration and Properties of Negative Electrode Employing Metal Compound Material, and Methods for Preparing the Negative Electrode>

The metal compound material to be used as a negative-electrode active material is not particularly limited so long as the material is capable of occluding and releasing lithium. The metal compound material may be an elemental metal or alloy which forms a lithium alloy or may be any of compounds of such metals, such as oxides, carbides, nitrides, silicides, sulfides, and phosphides. Examples of such metal compounds include compounds containing metals such as Ag, Al, Ba, Bi, Cu, Ga, Ge, In, Ni, P, Pb, Sb, Si, Sn, Sr, and Zn. Preferred of these is an elemental metal or alloy which forms a lithium alloy. More preferred is a material which includes a metallic or semimetallic element belonging to Group 13 or Group 14 (that is, carbon is excluded). Even more preferred is the elemental metal of silicon (Si), tin (Sn), or lead (Pb) (hereinafter, these three elements are often referred to as "specific metallic elements"), an alloy which contains one or more atoms of these elements, or a compound of any of these metals (specific metallic elements). Especially preferred are the elemental metal, alloys, and compounds of silicon and the elemental metal, alloys, and compounds of tin. One of these materials may be used alone, or any desired two or more thereof may be used in combination in any desired proportion.

Examples of the negative-electrode active material which has atoms of at least one member selected from the specific metallic elements include: the elemental metal which is any one of the specific metallic elements; alloys constituted of two or more specific metallic elements; alloys constituted of one or more specific metallic elements and one or more other metallic elements; and compounds containing one or more specific metallic elements or composite compounds, e.g., oxides, carbides, nitrides, silicides, sulfides, and phosphides, of these compounds. By using any of these elemental metals, alloys, and metal compounds as a negative-electrode active material, a battery having a higher capacity can be obtained.

Examples of the negative-electrode active material further include compounds formed by the complicated bonding of any of those composite compounds to one or more elemental metals or alloys or to several elements, e.g., nonmetallic elements. Specifically, in the case of silicon and tin, for example, use can be made of an alloy of those elements with a metal which does not function as a negative electrode. In the case of tin, for example, use can be made of a complicated compound constituted of a combination of five to six elements including tin, a metal which functions as a negative electrode and is not silicon, a metal which does not function as a negative electrode, and a nonmetallic element.

Preferred of those negative-electrode active materials are the elemental metal which is any one of the specific metallic elements, alloys of two or more of the specific metallic elements, and oxides, carbides, nitrides, and other compounds of the specific metallic elements. This is because these negative-electrode active materials give a battery having a high capacity per unit mass. Especially preferred are the elemental metal(s), alloys, oxides, carbides, nitrides, and the like of silicon and/or tin from the standpoints of capacity per unit mass and environmental burden.

The following compounds containing silicon and/or tin are also preferred because these compounds bring about excellent cycle characteristics although inferior in capacity per unit mass to the metallic elements or alloys.

An "oxide of silicon and/or tin" in which the element ratio of silicon and/or tin to oxygen is generally 0.5 or greater, preferably 0.7 or greater, more preferably 0.9 or greater, and is generally 1.5 or less, preferably 1.3 or less, more preferably 1.1 or less.

A "nitride of silicon and/or tin" in which the element ratio of silicon and/or tin to nitrogen is generally 0.5 or greater, preferably 0.7 or greater, more preferably 0.9 or greater, and is generally 1.5 or less, preferably 1.3 or less, more preferably 1.1 or less.

A "carbide of silicon and/or tin" in which the element ratio of silicon and/or tin to carbon is generally 0.5 or greater, preferably 0.7 or greater, more preferably 0.9 or greater, and is generally 1.5 or less, preferably 1.3 or less, more preferably 1.1 or less.

Any one of the negative-electrode active materials described above may be used alone, or any desired two or more thereof may be used in combination in any desired proportion.

The negative electrode in the nonaqueous-electrolyte secondary battery of the invention can be produced using any of known methods. Examples of methods for producing the negative electrode include: a method in which a mixture obtained by adding a binder, a conductive material, etc. to any of the negative-electrode active materials described above is formed as such into a sheet electrode by rolling; and a method in which the mixture is compression-molded into a pellet electrode. Usually, however, use is made of a method in which a thin-film layer (negative-electrode active-material layer) that contains any of the negative-electrode active materials described above is formed on a current collector for negative electrodes (hereinafter often referred to as "negative-electrode current collector") by a technique such as coating fluid application, vapor deposition, sputtering, or plating. In this case, a binder, thickener, conductive material, solvent, etc. are added to the negative-electrode active material to obtain a slurry and this slurry is applied to a negative-electrode current collector and dried. Thereafter, the coated negative-electrode current collector is pressed to densify the coating film, thereby forming a negative-electrode active-material layer on the negative-electrode current collector.

Examples of the material of the negative-electrode current collector include steel, copper alloys, nickel, nickel alloys, and stainless steel. Preferred of these are copper foils from the standpoints of ease of processing into thin films and cost.

The thickness of the negative-electrode current collector is generally 1 µm or more, preferably 5 µm or more, and is generally 100 µm or less, preferably 50 µm or less. The reasons for this are as follows. When the negative-electrode current collector has too large a thickness, there are cases where the battery as a whole has an excessively reduced capacity. Conversely, too small thicknesses thereof render the current collector difficult to handle.

It is preferred that the surfaces of the negative-electrode current collector should be subjected to a surface-roughening treatment beforehand in order to improve the effect of binding to the negative-electrode active-material layer to be formed on the surfaces. Examples of techniques for the surface roughening include blasting, rolling with a roll having a roughened surface, a mechanical polishing method in which the current collector surfaces are polished with a polishing cloth or paper having abrasive grains fixed thereto or with a grindstone, emery buff, wire brush equipped with steel bristles, etc., an electrolytic polishing method, and a chemical polishing method.

For the purpose of reducing the mass of a negative-electrode current collector to improve the energy density of the battery per unit mass, use can be made of a negative-electrode current collector of a perforated type, such as an expanded metal or a punching metal. This type of negative-electrode current collector can be freely changed in mass by changing the percentage of openings thereof. Furthermore, in the case where a negative-electrode active-material layer has been formed on each of both surfaces of this type of negative-electrode current collector, the negative-electrode active-material layers are even less apt to peel off because of the rivet effect due to the holes. However, in case where the negative-electrode current collector has too high a percentage of openings, the area of contact between the negative-electrode active-material layer and the negative-electrode current collector is reduced. There are hence cases where the adhesion strength decreases rather than increases.

The slurry for forming a negative-electrode active-material layer is produced usually by adding a binder, a thickener, etc. to a negative-electrode material. The term "negative-electrode material" in this description means a material which includes both a negative-electrode active material and a conductive material.

It is preferred that the content of the negative-electrode active material in the negative-electrode material should be generally 70% by mass or higher, especially 75% by mass or higher, and be generally 97% by mass or less, especially 95% by mass or less. The reasons for this are as follows. In case where the content of the negative-electrode active material is too low, the secondary battery employing the negative electrode thus obtained tends to have an insufficient capacity. In case where the content thereof is too high, the content of the binder and other components is relatively insufficient and, hence, the negative electrode obtained tends to have insufficient strength. Incidentally, in the case where two or more negative-electrode active materials are used in combination, these negative-electrode active materials may be incorporated so that the total amount thereof satisfies that range.

Examples of the conductive material for use in the negative electrode include metallic materials such as copper and nickel and carbon materials such as graphite and carbon black. One of such materials may be used alone, or any desired two or more thereof may be used in combination in any desired proportion. In particular, use of a carbon material as the conductive material is preferred because the carbon material functions also as an active material. It is preferred that the content of the conductive material in the negative-electrode material should be generally 3% by mass or higher, especially 5% by mass or higher, and be generally 30% by mass or less, especially 25% by mass or less. The reasons for this are as follows. In case where the content of the conductive material is too low, the resultant negative electrode tends to have insufficient electrical conductivity. In case where the content thereof is too high, the content of the negative-electrode active material and other components is relatively insufficient and, hence, battery capacity and strength tend to decrease. Incidentally, in the case where two or more conductive materials are used in combination, these conductive materials may be incorporated so that the total amount thereof satisfies that range.

As the binder for the negative electrode, use can be made of any desired material which is safe for the solvent and electrolytic solution to be used in electrode production. Examples thereof include poly(vinylidene fluoride), polytetrafluoroethylene, polyethylene, polypropylene, styrene/butadiene rubbers, isoprene rubbers, butadiene rubbers, ethylene/acrylic acid copolymers, and ethylene/methacrylic acid copolymers. One of these materials may be used alone, or any desired two or more thereof may be used in combination in any desired proportion. It is preferred that the content of the binder per 100 parts by mass of the negative-electrode material should be generally 0.5 parts by mass or more, especially 1 part by mass or more, and be generally 10 parts by mass or less, especially 8 parts by mass or less. The reasons for this are follows. In case where the content of the binder is too low, the negative electrode obtained tends to have insufficient strength. In case where the content thereof is too high, the content of the negative-electrode active material and other components is relatively insufficient and, hence, battery capacity and electrical conductivity tend to become insufficient. Incidentally, in the case where two or more binders are used in combination, these binders may be incorporated so that the total amount thereof satisfies that range.

Examples of the thickener to be used for the negative electrode include carboxymethyl cellulose, methyl cellulose, hydroxymethyl cellulose, ethyl cellulose, poly(vinyl alcohol), oxidized starch, phosphorylated starch, and casein. One of these thickeners may be used alone, or any desired two or more thereof may be used in combination in any desired proportion. A thickener may be used according to need. In the case of using a thickener, however, it is preferred to use the thickener so that the content of the thickener in the negative-electrode active-material layer is generally in the range of 0.5-5% by mass.

The slurry for forming a negative-electrode active-material layer is prepared by mixing the negative-electrode active material with a conductive material, a binder, and a thickener according to need using an aqueous solvent or an organic solvent as a dispersion medium. Water is usually used as the aqueous medium. However, a solvent other than water, such as, for example, an alcohol, e.g., ethanol, or a cyclic amide, e.g., N-methylpyrrolidone, can be used in combination with water in an amount of up to about 30% by mass based on the water. Preferred organic solvents usually include aromatic amides such as N-methylpyrrolidone, linear amides such as N,N-dimethylformamide and N,N-dimethylacetamide, aromatic hydrocarbons such as anisole, toluene, and xylene, and alcohols such as butanol and cyclohexanol. Preferred of these are cyclic amides such as N-methylpyrrolidone and linear amides such as N,N-dimethylformamide and N,N-dimethylacetamide. Any one of these solvents may be used alone, or any desired two or more thereof may be used in combination in any desired proportion.

The viscosity of the slurry is not particularly limited so long as the viscosity thereof renders the slurry applicable to the current collector. The slurry may be suitably prepared so as to attain such viscosity which renders the slurry applicable, by changing the amount of the solvent to be use for the slurry preparation.

The slurry obtained is applied to the negative-electrode current collector described above, subsequently dried, and then pressed. Thus, a negative-electrode active-material layer is formed. Techniques for the application are not particularly limited, and use can be made of a technique which itself is known. Techniques for the drying also are not particularly limited, and use can be made of a known technique such as air drying, drying by heating, or vacuum drying.

The structure of the electrode formed using a negative-electrode active material by the method described above is not particularly limited. However, the density of the active material present on the current collector is preferably 1 g·cm$^{-3}$ or higher, more preferably 1.2 g·cm$^{-3}$ or higher, especially preferably 1.3 g·cm$^{-3}$ or higher, and is preferably 2.2 g·cm$^{-3}$ or less, more preferably 2.1 g·cm$^{-3}$ or less, even more preferably 2.0 g·cm$^{-3}$ or less, especially preferably 1.9 g·cm$^{-3}$ or less.

When the density of the active material present on the current collector exceeds that range, there are cases where the active-material particles are broken and this increases the initial irreversible capacity and reduces the infiltration of the nonaqueous electrolytic solution into around the current collector/active material interface, resulting in a deterioration in high-current-density charge/discharge characteristics. When the density thereof is less than that range, there are cases where electrical conductivity among the active-material particles decreases and this increases battery resistance, resulting in a decrease in capacity per unit volume.

<2-3-4. Lithium-Containing Composite Metal Oxide Material, Configuration and Properties of Negative Electrode Employing Lithium-Containing Composite Metal Oxide Material, and Methods for Preparing the Negative Electrode>

The lithium-containing composite metal oxide material to be used as a negative-electrode active material is not particularly limited so long as the material is capable of occluding and releasing lithium. However, lithium-containing composite metal oxide materials which contain titanium are preferred, and a composite oxide of lithium and titanium (hereinafter often referred to simply as "lithium-titanium composite oxide") is especially preferred. Namely, a lithium-titanium composite oxide having a spinel structure is especially preferred because use of a negative-electrode active material for nonaqueous-electrolyte secondary batteries which includes that composite oxide brings about a significant decrease in output resistance.

Also preferred is a lithium-titanium composite oxide in which the lithium and the titanium have been replaced with one or more other metallic elements, e.g., at least one element selected from the group consisting of Na, K, Co, Al, Fe, Ti, Mg, Cr, Ga, Cu, Zn, and Nb.

It is preferred that the metal oxide should be a lithium-titanium composite oxide represented by general formula (5) wherein $0.7 \leq x \leq 1.5$, $1.5 \leq y \leq 2.3$, and $0 \leq z \leq 1.6$, because this composite oxide retains a stable structure during lithium-ion doping/undoping.

$$Li_xTi_yM_zO_4 \qquad (5)$$

[In general formula (5), M represents at least one element selected from the group consisting of Na, K, Co, Al, Fe, Ti, Mg, Cr, Ga, Cu, Zn, and Nb.]

Especially preferred of the compositions represented by general formula (5) are the following structures,
(a) $1.2<x<1.4$, $1.5<y<1.7$, $z=0$
(b) $0.9<x<1.1$, $1.9<y<2.1$, $z=0$
(c) $0.7<x<0.9$, $2.1<y<2.3$, $z=0$
This is because these structures bring about a satisfactory balance among battery performances.

Especially preferred representative compositions of that compound are $Li_{4/3}Ti_{5/3}O_4$ for (a), $Li_1Ti_2O_4$ for (b), and $Li_{4/5}Ti_{11/5}O_4$ for (c). With respect to structures in which $Z \neq 0$, preferred examples thereof include $Li_{4/3}Ti_{4/3}Al_{1/3}O_4$.

It is preferred that the lithium-titanium composite oxide to be used as a negative-electrode active material in the invention should satisfy at least one of the following features (1) to (13) concerning properties, shape, etc., besides the requirements shown above. It is especially preferred that the composite oxide should simultaneously satisfy two or more of the following features.

(1) BET Specific Surface Area

The BET specific surface area of the lithium-titanium composite oxide to be used as a negative-electrode active material, in terms of the value of specific surface area as determined by the BET method, is preferably 0.5 m$^2$·g$^{-1}$ or larger, more preferably 0.7 m$^2$·g$^{-1}$ or larger, even more preferably 1.0 m$^2$·g$^{-1}$ or larger, especially preferably 1.5 m$^2$·g$^{-1}$ or larger, and is preferably 200 m$^2$·g$^1$ or less, more preferably 100 m$^2$·g$^{-1}$ or less, even more preferably 50 m$^2$·g$^{-1}$ or less, especially preferably 25 m$^2$·g$^{-1}$ or less.

When the BET specific surface area thereof is less than that range, this composite oxide, when used as a negative-electrode material, has a reduced reaction area where the composite oxide is in contact with the nonaqueous electrolytic solution. There are hence cases where the output resistance increases. On the other hand, in case where the BET specific surface area thereof exceeds that range, the proportion of the surfaces and the edge faces in the crystals of the titanium-containing metal oxide increases and crystal strains occur due to this increase. Consequently, there are cases where irreversible capacity becomes not negligible and a preferred battery is difficult to obtain.

The determination of specific surface area by the BET method is made with a surface area meter (a fully automatic surface area measuring apparatus manufactured by Ohkura Riken Co., Ltd.) by preliminarily drying a sample at 350° C. for 15 minutes in a nitrogen stream and then measuring the specific surface area thereof by the gas-flowing nitrogen adsorption BET one-point method using a nitrogen/helium mixture gas precisely regulated so as to have a nitrogen pressure of 0.3 relative to atmospheric pressure. The specific surface area determined through this measurement is defined as the BET specific surface area of the lithium-titanium composite oxide according to the invention.

(2) Volume-average Particle Diameter

The volume-average particle diameter of the lithium-titanium composite oxide (in the case where the primary particles have aggregated to form secondary particles, that volume-average particle diameter is the diameter of the secondary particles) is defined as a volume-average particle diameter (median diameter) as determined by the laser diffraction/scattering method.

The volume-average particle diameter of the lithium-titanium composite oxide is generally 0.1 µm or more, preferably 0.5 µm or more, more preferably 0.7 µm or more, and is generally 50 µm or less, preferably 40 µm or less, even more preferably 30 µm or less, especially preferably 25 µm or less.

Volume-average particle diameter is determined by dispersing the carbon powder in a 0.2% by mass aqueous solution (10 mL) of poly(oxyethylene(20)) sorbitan monolaurate as a surfactant and examining the dispersion with a laser diffraction/scattering type particle size distribution analyzer (LA-700, manufactured by HORIBA, Ltd.). The median diameter determined through this measurement is defined as the volume-average particle diameter of the carbonaceous material according to the invention.

In case where the volume-average particle diameter of the lithium-titanium composite oxide is less than that range, a large amount of a binder is necessary for electrode production and there are cases where the large binder amount results in a decrease in battery capacity. When the volume-average particle diameter thereof exceeds that range, there are cases where such a composite oxide is undesirable from the standpoint of battery production because an uneven coating surface is apt to result during electrode plate formation.

(3) Average Primary-Particle Diameter

In the case where the primary particles have aggregated to form secondary particles, the average primary-particle diameter of the lithium-titanium composite oxide is generally 0.01 µm or more, preferably 0.05 µm or more, more preferably 0.1 µm or more, especially preferably 0.2 µm or more, and is generally 2 µm or less, preferably 1.6 µm or less, more preferably 1.3 µm or less, especially preferably 1 µm or less. In case where the volume-average primary-particle diameter thereof exceeds that range, such primary particles are less apt to form spherical secondary particles, resulting in an adverse influence on powder loading, and this material has a considerably reduced specific surface area. There are hence cases where battery performances, e.g., output characteristics, are apt to decrease. When the average primary-particle diameter thereof is less than that range, the crystals usually are in an insufficiently grown state and, hence, there are cases where this composite oxide makes the secondary battery have reduced performances, e.g., poor charge/discharge reversibility.

Incidentally, primary-particle diameter is determined through an examination with a scanning electron microscope (SEM). Specifically, arbitrarily selected 50 primary-particle images in a photograph having a magnification which renders the particles recognizable, e.g., 10,000-100,000 diameters, each are examined for the length of the longest segment of a horizontal line which extends across the primary-particle image from one side to the other side of the boundary. These measured lengths are averaged to determine the average value.

(4) Shape

The shape of the particles of the lithium-titanium composite oxide may be any of massive, polyhedral, spherical, ellipsoidal, platy, acicular, columnar, and other shapes such as those in common use. Preferred of these is one in which the primary particles have aggregated to form secondary particles and these secondary particles have a spherical or ellipsoidal shape.

In electrochemical elements, the active material in each electrode usually expands/contracts with the charge/discharge of the element and, hence, a deterioration, such as active-material breakage or conduction path breakage, that is caused by the resultant stress is apt to occur. Consequently, an active material in which the primary particles have aggregated to form secondary particles is preferable to an active material composed of primary particles only, since the particles in the former active material relieve the stress caused by expansion/contraction to prevent the deterioration.

Furthermore, particles of a spherical or ellipsoidal shape are preferable to particles showing axial orientation, e.g., platy particles, because the former particles are less apt to orient during electrode forming and hence this electrode is reduced in expansion/contraction during charge/discharge, and because these particles are apt to be evenly mixed with a conductive material in electrode production.

(5) Tap Density

The tap density of the lithium-titanium composite oxide is preferably 0.05 $g \cdot cm^{-3}$ or higher, more preferably 0.1 $g \cdot cm^{-3}$ or higher, even more preferably 0.2 $g \cdot cm^{-3}$ or higher, especially preferably 0.4 $g \cdot cm^{-3}$ or higher, and is preferably 2.8 $g \cdot cm^{-3}$ or less, more preferably 2.4 $g \cdot cm^{-3}$ or less, especially preferably 2 $g \cdot cm^{-3}$ or less. In case where the tap density thereof is less than that range, this composite oxide, when used in a negative electrode, is less apt to attain an increased loading density and has a reduced area of contact between the particles. There are hence cases where interparticle resistance increases and output resistance increases. In case where the tap density thereof exceeds that range, the amount of interparticle interstices in the electrode becomes too small and the amount of passages for the nonaqueous electrolytic solution decreases. There are hence cases where output resistance increases.

Tap density is determined by dropping a sample through a sieve having an opening size of 300 µm into a 20-$cm^3$ tapping cell to fill the cell with the sample up to the brim, subsequently conducting a tapping operation 1,000 times over a stroke length of 10 mm using a powder densimeter (e.g., Tap Denser, manufactured by Seishin Enterprise Co., Ltd.), and calculating the density from the resultant volume of the sample and the mass thereof. The tap density calculated through this measurement is defined as the tap density of the lithium-titanium composite oxide according to the invention.

(6) Roundness

When the lithium-titanium composite oxide is examined for roundness as an index to the degree of sphericity thereof, the roundness thereof is preferably within the range shown below. Roundness is defined by "Roundness=(length of periphery of equivalent circle having the same area as projected particle shape)/(actual length of periphery of projected particle shape)". When a particle has a roundness of 1, this particle theoretically is a true sphere.

The closer to 1 the roundness of the lithium-titanium composite oxide, the more the composite oxide is preferred. The roundness of the composite oxide is generally 0.10 or higher, preferably 0.80 or higher, more preferably 0.85 or higher, especially preferably 0.90 or higher. The higher the roundness, the more the high-current-density charge/discharge characteristics are improved. Consequently, in case where the roundness thereof is less than that range, the negative-electrode active material has reduced loading characteristics and enhanced interparticle resistance. There are hence cases where short-time high-current-density charge/discharge characteristics decrease.

Roundness is determined with a flow type particle image analyzer (FPIA, manufactured by Sysmex Industrial Corp.). About 0.2 g of a sample is dispersed in a 0.2% by mass aqueous solution (about 50 mL) of poly(oxyethylene(20)) sorbitan monolaurate as a surfactant, and an ultrasonic wave of 28 kHz is propagated to the dispersion for 1 minute at an output of 60 W. Thereafter, particles having a particle diameter in the range of 3-40 μm are examined with the analyzer having a detection range set at 0.6-400 μm. The roundness determined through this measurement is defined as the roundness of the lithium-titanium composite oxide according to the invention.

(7) Aspect Ratio

The aspect ratio of the lithium-titanium composite oxide is generally 1 or greater, and is generally 5 or less, preferably 4 or less, more preferably 3 or less, especially preferably 2 or less. When the aspect ratio thereof exceeds that range, there are cases where the composite oxide causes streak lines in electrode plate formation and an even coating surface cannot be obtained, resulting in a decrease in short-time high-current-density charge/discharge characteristics. Incidentally, the lower limit of that range is a theoretical lower limit of the aspect ratio of the lithium-titanium composite oxide.

In determining aspect ratio, particles of the lithium-titanium composite oxide are examined with a scanning electron microscope with enlargement. Fifty are arbitrarily selected from particles fixed to an edge face of a metal having a thickness of 50 μm or smaller, and each particle is examined in a three-dimensional manner while rotating and inclining the stage to which the sample is fixed. In this examination, the length of the longest axis A of each particle and the length of the shortest axis B perpendicular to that axis are measured, and the average of the A/B values is determined. The aspect ratio (A/B) determined through this measurement is defined as the aspect ratio of the lithium-titanium composite oxide according to the invention.

(8) Processes for Producing the Negative-Electrode Active Material

Processes for producing the lithium-titanium composite oxide are not particularly limited unless the processes depart from the spirit of the invention. Examples thereof include several processes, and use may be made of general processes for producing inorganic compounds.

Examples thereof include a process in which a titanium source, e.g., titanium oxide, is evenly mixed optionally with a source of another element and with a lithium source, e.g., $LiOH$, $Li_2CO_3$, or $LiNO_3$, and the mixture is burned at a high temperature to obtain an active material.

Various processes are thought to be usable for producing, in particular, a spherical or ellipsoidal active material. Examples thereof include a process in which a titanium source, e.g., titanium oxide, and a source of another element, which is used according to need, are dissolved in or pulverized and dispersed in a solvent, e.g., water, and the pH of this solution or dispersion is regulated with stirring to produce spherical precursor particles. The precursor particles are recovered and optionally dried. A lithium source, e.g., $LiOH$, $Li_2CO_3$, or $LiNO_3$, is added to the precursor, and the mixture is burned at a high temperature to obtain an active material.

Another example is a process in which a titanium source, e.g., titanium oxide, and a source of another element, which is used according to need, are dissolved in or pulverized and dispersed in a solvent, e.g., water, and this solution or dispersion is dried and molded with a spray dryer or the like to obtain spherical or ellipsoidal precursor particles. A lithium source, e.g., $LiOH$, $Li_2CO_3$, or $LiNO_3$, is added to the precursor, and the mixture is burned at a high temperature to obtain an active material.

Still another process is a process in which a titanium source, e.g., titanium oxide, a lithium source, e.g., $LiOH$, $Li_2CO_3$, or $LiNO_3$, and a source of another element, which is used according to need, are dissolved in or pulverized and dispersed in a solvent, e.g., water, and this solution or dispersion is dried and molded with a spray dryer or the like to obtain spherical or ellipsoidal precursor particles. This precursor is burned at a high temperature to obtain an active material.

During these steps, elements other than Ti, such as, for example, Al, Mn, Ti, V, Cr, Mn, Fe, Co, Li, Ni, Cu, Zn, Mg, Ga, Zr, C, Si, Sn, and Ag, can be present so that these elements are present in the structure of the titanium-containing metal oxide and/or are in contact with the titanium-containing oxide. Use of the lithium-titanium composite oxide which contains these elements makes it possible to regulate the operating voltage and capacity of the battery.

(9) Electrode Production

Any known method can be used for electrode production. For example, a binder and a solvent are added to a negative-electrode active material optionally together with a thickener, conductive material, filler, etc. to obtain a slurry and this slurry is applied to a current collector and dried. Thereafter, the coated current collector is pressed. Thus, an electrode can be formed.

At the stage just before the step of introducing the nonaqueous electrolytic solution in battery production, the thickness of the negative-electrode active-material layer per surface is generally 15 μm or more, preferably 20 μm or more, more preferably 30 μm or more. It is desirable that the upper limit thereof should be 150 μm or less, preferably 120 μm or less, more preferably 100 μm or less.

When the thickness of the negative-electrode active-material layer exceeds that range, there are cases where high-current-density charge/discharge characteristics decrease because the nonaqueous electrolytic solution is less apt to infiltrate into around the current collector interface. Furthermore, when the thickness thereof is less than that range, there are cases where the battery has a reduced capacity because the volume ratio of the current collector to the negative-electrode active material is high. Meanwhile, a negative-electrode active material may be formed into a sheet electrode by rolling, or may be compression-molded into a pellet electrode.

(10) Current Collector

As the current collector for holding the negative-electrode active material, a known current collector can be used at will. Examples of the current collector for the negative electrode include metallic materials such as copper, nickel, stainless steel, and nickel-plated steel. Copper is especially preferred of these from the standpoints of processability and cost.

In the case where the current collector is a metallic material, examples of the shape of the current collector include metal foils, metal cylinders, metal coils, metal plates, thin metal films, expanded metals, punching metals, and metal foam. Preferred of these are metal foils which contain copper (Cu) and/or aluminum (Al). More preferred are copper foils and aluminum foils. Even more preferred are a rolled copper foil, which is produced by the rolling process, and an electrolytic copper foil, which is produced by the electrolytic process. Either of these can be used as a current collector.

In the case where a copper foil having a thickness less than 25 μm is to be used, this copper foil can be a foil of a copper alloy (phosphor bronze, titanium-copper, Corson alloy, Cu—Cr—Zr alloy, etc.) which has higher strength than pure copper. Use of an aluminum foil as a current collector is preferred because aluminum has a small specific gravity and it is hence possible to reduce the mass of the battery.

A current collector constituted of a copper foil produced by the rolling process is suitable for use in small cylindrical batteries because the copper crystals have been oriented along the rolling direction and, hence, this current collector is less apt to break even when the negative electrode is closely wound or is bent at an acute angle.

The electrolytic copper foil is a foil obtained, for example, by immersing a metallic drum in a nonaqueous electrolytic solution which contains copper ions dissolved therein, causing an electric current to flow while rotating the drum, thereby depositing copper on the surface of the drum, and peeling off the copper deposit. Copper may have been deposited on the surfaces of the rolled copper foil by an electrolytic process. One or both surfaces of the copper foil may have undergone a surface-roughening treatment or a surface treatment (e.g., a chromate treatment or undercoating with, for example, Ti, which are for forming a layer having a thickness of several nanometers to about 1 μm).

The current collector substrate is desired to further have the following properties.

(10-1) Average Surface Roughness (Ra)

The average surface roughness (Ra) of that surface of the current collector substrate on which a thin active-material film is to be formed, the roughness (Ra) being determined by the method described in JIS B0601-1994, is not particularly limited. However, the average surface roughness (Ra) thereof is generally 0.01 μm or higher, preferably 0.03 μm or higher, and is generally 1.5 μm or less, preferably 1.3 μm or less, more preferably 1.0 μm or less.

The reasons for this are as follows. When the current collector substrate has an average surface roughness (Ra) within that range, satisfactory charge/discharge cycle characteristics can be expected. Furthermore, the interface between this current collector substrate and a thin active-material layer has an increased area to improve adhesion to the thin negative-electrode active-material layer. Incidentally, there is no particular upper limit on the average surface roughness (Ra) thereof. However, a current collector substrate having an average surface roughness (Ra) of 1.5 μm or less is usually employed because current collector substrates having an Ra exceeding 1.5 μm generally are not easily available as foils having a thickness practical for batteries.

(10-2) Tensile Strength

The tensile strength of a test piece is obtained by dividing the maximum tensile force required for the test piece to break by the sectional area of the test piece. Tensile strength in the invention is determined using the same apparatus and method as those described in JIS Z2241 (Method of Tensile Test of Metallic Materials).

The tensile strength of the current collector substrate is not particularly limited. However, the tensile strength thereof is generally 50 $N \cdot mm^{-2}$ or higher, preferably 100 $N \cdot mm^{-2}$ or higher, more preferably 150 $N \cdot mm^{-2}$ or higher. The higher the tensile strength, the more the current collector substrate is preferred. However, it is usually desirable that the tensile strength thereof should be 1,000 $N \cdot mm^{-2}$ or less, from the standpoint of industrial availability.

So long as a current collector substrate having a high tensile strength is used, this current collector substrate can be inhibited from suffering the cracking due to the expansion and contraction of the thin active-material film which accompany charge/discharge. Satisfactory cycle characteristics can hence be obtained.

(10-3) 0.2% Proof Stress

"0.2% proof stress" is the magnitude of a load necessary for imparting a plastic (permanent) strain of 0.2%, and means that the material retains a 0.2% deformation after a load of that magnitude which has been applied thereto is removed. For determining 0.2% proof stress, use may be made of the same apparatus and method as those for the tensile strength.

The 0.2% proof stress of the current collector substrate is not particularly limited. However, the 0.2% proof stress thereof is generally 30 $N \cdot mm^{-2}$ or higher, preferably 100 $N \cdot mm^{-2}$ or higher, especially preferably 150 $N \cdot mm^{-2}$ or higher. The higher the 0.2% proof stress, the more the current collector substrate is preferred. However, it is generally desirable that the 0.2% proof stress thereof should be 900 $N \cdot mm^{-2}$ or less, from the standpoint of industrial availability.

So long as a current collector substrate having a high 0.2% proof stress is used, this current collector substrate can be inhibited from suffering the plastic deformation due to the expansion and contraction of the thin active-material film which accompany charge/discharge. Satisfactory cycle characteristics can hence be obtained.

(10-4) Thickness of Current Collector

The current collector may have any desired thickness. However, the thickness thereof is generally 1 μm or more, preferably 3 μm or more, more preferably 5 μm or more, and is generally 1 mm or less, preferably 100 μm or less, more preferably 50 μm or less.

When the thickness of the metal film is less than 1 μm, there are cases where coating fluid application thereto is difficult because of the reduced strength thereof. When the thickness thereof is larger than 100 μm, there are cases where the electrode shape obtained by, for example, winding is deformed. Incidentally, the thin metal film may be a meshy material.

(11) Thickness Ratio between Current Collector and Active-Material Layer

The thickness ratio between the current collector and the active-material layer is not particularly limited. However, the value of "(thickness of the active-material layer on one surface just before impregnation with nonaqueous electrolytic solution)/(thickness of the current collector)" is generally 150 or less, preferably 20 or less, more preferably 10 or less, and is generally 0.1 or greater, preferably 0.4 or greater, more preferably 1 or greater.

When the thickness ratio between the current collector and the negative-electrode active-material layer exceeds that range, there are cases where this current collector is heated up by Joule's heat during high-current-density charge/discharge. When the thickness ratio therebetween is less than that range, there are cases where the battery has a reduced capacity because the proportion by volume of the current collector to the negative-electrode active material is high.

(12) Electrode Density

The structure of the electrode formed using a negative-electrode active material is not particularly limited. However, the density of the active material present on the current collector is preferably 1 g·cm$^{-3}$ or higher, more preferably 1.2 g·cm$^{-3}$ or higher, even more preferably 1.3 g·cm$^{-3}$ or higher, especially preferably 1.5 g·cm$^{-3}$ or higher, and is preferably 3 g·cm$^{-3}$ or less, more preferably 2.5 g·cm$^{-3}$ or less, even more preferably 2.2 g·cm$^{-3}$ or less, especially preferably 2 g·cm$^{-3}$ or less.

When the density of the active material present on the current collector exceeds that range, there are cases where bonding between the current collector and the negative-electrode active material is weak and separation occurs between the electrode and the active material. When the density thereof is less than that range, there are cases where electrical conductivity among the negative-electrode active-material particles decreases and this increases battery resistance.

(13) Binder

The binder for binding the negative-electrode active material is not particularly limited so long as the binder is stable to the nonaqueous electrolytic solution and to the solvent to be used for electrode production.

Examples thereof include resinous polymers such as polyethylene, polypropylene, poly(ethylene terephthalate), poly(methyl methacrylate), polyimides, aromatic polyamides, cellulose, and nitrocellulose; rubbery polymers such as SBR (styrene/butadiene rubbers), isoprene rubbers, butadiene rubbers, fluororubbers, NBR (acrylonitrile/butadiene rubbers), and ethylene/propylene rubbers; styrene/butadiene/styrene block copolymers and products of hydrogenation thereof; thermoplastic elastomeric polymers such as EPDM (ethylene/propylene/diene terpolymers), styrene/ethylene/butadiene/styrene copolymers, and styrene/isoprene/styrene block copolymers and products of hydrogenation thereof; flexible resinous polymers such as syndiotactic 1,2-polybutadiene, poly(vinyl acetate), ethylene/vinyl acetate copolymers, and propylene/α-olefin copolymers; fluorochemical polymers such as poly(vinylidene fluoride), polytetrafluoroethylene, fluorinated poly(vinylidene fluoride), and polytetrafluoroethylene/ethylene copolymers; and polymer compositions having the property of conducting alkali metal ions (especially lithium ions). One of these binders may be used alone, or any desired two or more thereof may be used in combination in any desired proportion.

The kind of the solvent to be used for forming a slurry is not particularly limited so long as the negative-electrode active material and binder and the thickener and conductive material which are optionally used according to need can be dissolved or dispersed therein. Either an aqueous solvent or an organic solvent may be used.

Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, dimethyl ether, dimethylacetamide, hexamethylphosphoramide, dimethyl sulfoxide, benzene, xylene, quinoline, pyridine, methylnaphthalene, and hexane. Especially when an aqueous solvent is used, a dispersant or the like is added in combination with the thickener to prepare a slurry using a latex of, for example, SBR. One of those solvents may be used alone, or any desired two or more thereof may be used in combination in any desired proportion.

The proportion of the binder to the negative-electrode active material is generally 0.1% by mass or higher, preferably 0.5% by mass or higher, more preferably 0.6% by mass or higher, and is generally 20% by mass or less, preferably 15% by mass or less, more preferably 10% by mass or less, especially preferably 8% by mass or less.

When the proportion of the binder to the negative-electrode active material exceeds that range, there are cases where the proportion of the binder which does not contribute to battery capacity increases and this leads to a decrease in battery capacity. When the proportion thereof is less than that range, there are cases where the negative electrode has a reduced strength and this is undesirable from the standpoint of battery production.

Especially when the binder includes a rubbery polymer represented by SBR as the main component, the proportion of this binder to the active material is generally 0.1% by mass or higher, preferably 0.5% by mass or higher, more preferably 0.6% by mass or higher, and is generally 5% by mass or less, preferably 3% by mass or less, more preferably 2% by mass or less.

In the case where the binder includes a fluorochemical polymer represented by poly(vinylidene fluoride) as the main component, the proportion of this binder to the active material is 1% by mass or higher, preferably 2% by mass or higher, more preferably 3% by mass or higher, and is generally 15% by mass or less, preferably 10% by mass or less, more preferably 8% by mass or less.

A thickener is used generally for the purpose of regulating the slurry viscosity. The thickener is not particularly limited. Examples thereof include carboxymethyl cellulose, methyl cellulose, hydroxymethyl cellulose, ethyl cellulose, poly(vinyl alcohol), oxidized starch, phosphorylated starch, casein, and salts of these. One of these thickeners may be used alone, or any desired two or more thereof may be used in combination in any desired proportion.

In the case where such a thickener is further added, the proportion of the thickener to the negative-electrode active material is 0.1% by mass or higher, preferably 0.5% by mass or higher, more preferably 0.6% by mass or higher, and is generally 5% by mass or less, preferably 3% by mass or less, more preferably 2% by mass or less. When the proportion of the thickener to the negative-electrode active material is less than that range, there are cases where applicability decreases considerably. When the proportion thereof exceeds that range, the proportion of the active material in the negative-electrode active-material layer is low. There is hence a problem that the battery has a reduced capacity, and there are cases where resistance among the particles of the negative-electrode active material increases.

<2-4 Positive Electrode>

The positive electrode includes a current collector and a positive-electrode active-material layer disposed thereon. The positive-electrode active material is described below.

<2-4-1 Positive-electrode Active Material>

The positive-electrode active material to be used in the positive electrode is explained below.

(1) Composition

The positive-electrode active material is not particularly limited so long as the active material is capable of electrochemically occluding and releasing lithium ions. For example, a substance which contains lithium and at least one transition metal is preferred. Examples thereof include a lithium-transition metal composite oxide and a lithium-containing transition metal/phosphoric acid compound.

Preferred examples of the transition metal of the lithium-transition metal composite oxide include V, Ti, Cr, Mn, Fe, Co, Ni, and Cu. Specific examples of the composite oxide include lithium-cobalt composite oxides such as $LiCoO_2$, lithium-manganese composite oxides such as $LiMnO_2$, $LiMn_2O_4$, and $Li_2MnO_4$, and lithium-nickel composite oxides such as $LiNiO_2$. Examples of the composite oxide further include these lithium-transition metal composite oxides in which part of the atoms of the transition metals, which serve as main components of the composite oxides, have been replaced with other metals, e.g., Al, Ti, V, Cr, Mn, Fe, Co, Li, Ni, Cu, Zn, Mg, Ga, Zr, and Si. Examples thereof include lithium-cobalt-nickel composite oxides, lithium-cobalt-manganese composite oxides, lithium-nickel-manganese composite oxides, and lithium-nickel-cobalt-manganese composite oxides.

Specific examples of such replacement products include $Li_{1+a}Ni_{0.5}Mn_{0.5}O_2$, $Li_{1+a}Ni_{0.8}Co_{0.2}O_2$, $Li_{1+a}Ni_{0.85}Co_{0.10}Al_{0.05}O_2$, $Li_{1+a}Ni_{0.33}Co_{0.33}Mn_{0.33}O_2$, $Li_{1+a}Ni_{0.45}Co_{0.45}Mn_{0.1}O_2$, $Li_{1+a}Mn_{1.8}Al_{0.2}O_4$, $Li_{1+a}Mn_{1.5}Ni_{0.5}O_4$, and $xLi_2MnO_3\cdot(1-x)Li_{1+a}MO_2$ (M is a transition metal) (a satisfies $0<a<3.0$).

The lithium-containing transition metal/phosphoric acid compound can be represented by $Li_xMPO_4$ (wherein M is at least one element selected from the group consisting of the Group-4 to Group-11 transition metals belonging to the fourth period of the periodic table, and x satisfies $0<x<1.2$). The transition metal (M) preferably is at least one element selected from the group consisting of V, Ti, Cr, Mg, Zn, Ca, Cd, Sr, Ba, Co, Ni, Fe, Mn, and Cu, and more preferably is at least one element selected from the group consisting of Co, Ni, Fe, and Mn. Examples of the compound include iron phosphate compounds such as $LiFePO_4$, $Li_3Fe_2(PO_4)_3$, and $LiFeP_2O_7$, cobalt phosphate compounds such as $LiCoPO_4$, manganese phosphate compounds such as $LiMnPO_4$, nickel phosphate compounds such as $LiNiPO_4$, and these lithium-containing transition metal/phosphoric acid compounds in which part of the atoms of the transition metals, which serves as main components of the compounds, have been replaced with other metals, e.g., Al, Ti, V, Cr, Mn, Fe, Co, Li, Ni, Cu, Zn, Mg, Ga, Zr, Nb, and Si. Especially suitable of these are lithium/manganese composite oxides such as $LiMnO_2$, $LiMn_2O_4$, and $Li_2MnO_4$ and iron phosphate compounds such as $LiFePO_4$, $Li_3Fe_2(PO_4)_3$, and $LiFeP_2O_7$, because these compounds are less apt to suffer metal dissolution when in a high-temperature charged state and are inexpensive.

The expression "including $Li_xMPO_4$ as a basic composition" used above means that not only compounds having a composition represented by the empirical formula but also compounds in which the Fe or other sites in the crystal structure have been partly replaced by another element are included. Furthermore, that expression means that not only compounds having the stoichiometric composition but also compounds having non-stoichiometric compositions which include, for example, sites where part of the elements is deficient are included. It is preferred that the element which replaces should be an element such as Al, Ti, V, Cr, Mn, Fe, Co, Li, Ni, Cu, Zn, Mg, Ga, Zr, or Si. In the case where replacement by such an element is conducted, the degree of replacement is preferably 0.1-5 mol %, more preferably 0.2-2.5 mol %.

The positive-electrode active materials described above may be used alone or in combination of two or more thereof.

(2) Surface Coating

Use may also be made of a material composed of any of the positive-electrode active materials and, adherent to the surface thereof, a substance which differs in composition from the positive-electrode active material as the main component (the adherent substance is hereinafter suitably referred to as "surface-adherent substance"). Examples of the surface-adherent substance include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, and carbonates such as lithium carbonate, calcium carbonate, and magnesium carbonate.

Those surface-adherent substances each can be adhered to the surface of a positive-electrode active material, for example, by: a method in which the substance is dissolved or suspended in a solvent and this solution or suspension is infiltrated into the positive-electrode active material and then dried; a method in which a precursor for the surface-adherent substance is dissolved or suspended in a solvent and this solution or suspension is infiltrated into the positive-electrode active material and then heated or otherwise treated to react the precursor; or a method in which the substance is added to a precursor for the positive-electrode active material and burned together with the precursor.

The mass of the surface-adherent substance which is adherent to the surface of the positive-electrode active material, based on the mass of the positive-electrode active material, is generally 0.1 ppm or more, preferably 1 ppm or more, more preferably 10 ppm or more, and is generally 20% or less, preferably 10% or less, more preferably 5% or less.

The surface-adherent substance can inhibit the nonaqueous electrolytic solution from undergoing an oxidation reaction on the surface of the positive-electrode active material, and an improvement in battery life can hence be attained. However, in case where the adhesion amount is less than that range, this effect is not sufficiently produced. When the adhesion amount exceeds that range, there are cases where the surface-adherent substance inhibits lithium ions from going in and out and this results in an increase in resistance. Consequently, that range is preferred.

(3) Shape

The shape of the particles of the positive-electrode active material may be any of massive, polyhedral, spherical, ellipsoidal, platy, acicular, columnar, and other shapes such as those in common use. Preferred of these is one in which the primary particles have aggregated to form secondary particles and these secondary particles have a spherical or ellipsoidal shape.

The reason for this is as follows. In electrochemical elements, the active material in each electrode usually expands/contracts with the charge/discharge of the element and, hence, a deterioration, such as active-material breakage or conduction path breakage, that is caused by the resultant stress is apt to occur. Consequently, a positive-electrode active material in which the primary particles have aggregated to form secondary particles is preferable to an active material composed of primary particles only, since the particles in the former active material relieve the stress caused by expansion/contraction to prevent the deterioration.

Furthermore, particles of a spherical or ellipsoidal shape are preferable to particles showing axial orientation, e.g., platy particles, because the former particles are less apt to orient during electrode formation and hence this electrode is reduced in expansion/contraction during charge/discharge, and because these particles are apt to be evenly mixed with a conductive material in electrode production.

(4) Tap Density

The tap density of the positive-electrode active material is generally 0.4 g·cm$^{-3}$ or higher, preferably 0.6 g·cm$^{-3}$ or higher, more preferably 0.8 g·cm$^{-3}$ or higher, especially preferably 1.0 g·cm$^{-3}$ or higher, and is generally 4.0 g·cm$^{-3}$ or less, preferably 3.8 g·cm$^{-3}$ or less.

By using a composite metal oxide powder having a high tap density, a positive-electrode active-material layer having a high density can be formed. Consequently, in case where the tap density of the positive-electrode active material is less than that range, not only it is necessary to use a larger amount of a dispersion medium and larger amounts of a conductive material and a binder when a positive-electrode active-material layer is formed, but also there are cases where the loading of the positive-electrode active material in the positive-electrode active-material layer is limited, resulting in a limited battery capacity. The higher the tap density, the more the positive-electrode active material is generally preferred. There is no particular upper limit on the tap density thereof. However, when the tap density thereof is less than that range, there are cases where the diffusion of lithium ions which occurs within the positive-electrode active-material layer using the nonaqueous electrolytic solution as a medium becomes a rate-determining process and this is apt to reduce load characteristics.

Tap density is determined by dropping a sample through a sieve having an opening size of 300 μm into a 20-cm$^3$ tapping cell to fill the cell capacity, subsequently conducting a tapping operation 1,000 times over a stroke length of 10 mm using a powder densimeter (e.g., Tap Denser, manufactured by Seishin Enterprise Co., Ltd.), and calculating the density from the resultant volume of the sample and the mass thereof. The tap density calculated through this measurement is defined as the tap density of the positive-electrode active material according to the invention.

(5) Median Diameter d50

The median diameter d50 (secondary-particle diameter in the case where the primary particles have aggregated to form secondary particles) of the particles of the positive-electrode active material can be determined also with a laser diffraction/scattering type particle size distribution analyzer.

The median diameter d50 thereof is generally 0.1 μm or more, preferably 0.5 μm or more, more preferably 1 μm or more, especially preferably 3 μm or more, and is generally 20 μm or less, preferably 18 μm or less, more preferably 16 μm or less, especially preferably 15 (am or less. When the median diameter d50 thereof is less than that range, there are cases where a product having a high bulk density cannot be obtained. When the median diameter d50 thereof exceeds that range, lithium diffusion within individual particles requires a longer period and this results in a decrease in battery characteristics. In addition, there are cases where when such positive-electrode active-material particles are used in producing a positive electrode for batteries, i.e., when the active material and other ingredients including a conductive material and a binder are slurried with a solvent and this slurry is applied in a thin-film form, then streak lines or the like is caused.

Incidentally, it is possible to attain further improved loading during positive-electrode production by mixing, in any desired proportion, two or more positive-electrode active materials differing in median diameter d50.

Median diameter d50 is determined using a 0.1% by mass aqueous solution of sodium hexametaphosphate as a dispersion medium and using LA-920, manufactured by HORIBA Ltd., as a particle size distribution analyzer. After a 5-minute ultrasonic dispersing treatment is conducted, the particles are examined at a measuring refractive index set at 1.24.

(6) Average Primary-particle Diameter

In the case where the primary particles have aggregated to form secondary particles, the average primary-particle diameter of this positive-electrode active material is generally 0.03 μm or more, preferably 0.05 μm or more, more preferably 0.08 μm or more, especially preferably 0.1 (am or more, and is generally 5 μm or less, preferably 4 μm or less, more preferably 3 μm or less, especially preferably 2 μm or less. In case where the average primary-particle diameter thereof exceeds that range, such primary particles are less apt to form spherical secondary particles, resulting in an adverse influence on powder loading, and this material has a considerably reduced specific surface area. There are hence cases where battery performances, e.g., output characteristics, are apt to decrease. When the average primary-particle diameter thereof is less than that range, the crystals usually are in an insufficiently grown state and, hence, there are cases where this positive-electrode active material makes the secondary battery have reduced performances, e.g., poor charge/discharge reversibility.

Incidentally, average primary-particle diameter is determined through an examination with a scanning electron microscope (SEM). Specifically, arbitrarily selected 50 primary-particle images in a photograph having a magnification of 10,000 diameters each are examined for the length of the longest segment of a horizontal line which extends across the primary-particle image from one side to the other side of the boundary. These measured lengths are averaged to determine the average value.

(7) BET Specific Surface Area

The BET specific surface area of the positive-electrode active material, in terms of the value of specific surface area as determined by the BET method, is generally 0.1 m$^2$·g$^{-1}$ or larger, preferably 0.2 m$^2$·g$^{-1}$ or larger, more preferably 0.3 m$^2$·g$^{-1}$ or larger, and is generally 50 m$^2$·g$^{-1}$ or less, preferably 40 m$^2$·g$^{-1}$ or less, more preferably 30 m$^2$·g$^{-1}$ or less. In case where the value of the BET specific surface area thereof is less than that range, use of this positive-electrode active material is apt to result in a decrease in battery performance. When the specific surface area thereof exceeds that range, this positive-electrode active material is less apt to have a high tap density and there are cases where the applicability required for forming a positive-electrode active-material decreases.

The determination of BET specific surface area is made with a surface area meter (a fully automatic surface area measuring apparatus manufactured by Ohkura Riken Co., Ltd.). A sample is preliminarily dried at 150° C. for 30 minutes in a nitrogen stream, and the specific surface area thereof is thereafter measured by the gas-flowing nitrogen adsorption BET one-point method using a nitrogen/helium mixture gas precisely regulated so as to have a nitrogen pressure of 0.3 relative to atmospheric pressure. The specific surface area determined through this measurement is defined as the BET specific surface area of the positive-electrode active material according to the invention.

(8) Processes for Producing Positive-Electrode Active Materials

Processes for producing positive-electrode active materials are not particularly limited unless the processes depart from the spirit of the invention. Examples thereof include several processes, and use may be made of general processes for producing inorganic compounds.

Various processes are thought to be usable for producing, in particular, a spherical or ellipsoidal active material. Examples thereof include a process in which a transition metal source, e.g., a transition metal nitrate or sulfate, and a source of another element, which is used according to need, are dissolved in or pulverized and dispersed in a solvent, e.g., water, and the pH of this solution or dispersion is regulated with stirring to produce spherical precursor particles. The precursor particles are recovered and optionally dried. Thereafter, a lithium source, e.g., LiOH, $Li_2CO_3$, or $LiNO_3$, is added to the precursor, and the mixture is burned at a high temperature to obtain an active material.

Another example is a process in which a transition metal source, e.g., a transition metal nitrate, sulfate, hydroxide, or oxide, and a source of another element, which is used according to need, are dissolved in or pulverized and dispersed in a solvent, e.g., water, and this solution or dispersion is dried and molded with a spray dryer or the like to obtain spherical or ellipsoidal precursor particles. A lithium source, e.g., LiOH, $Li_2CO_3$, or $LiNO_3$, is added to the precursor, and the mixture is burned at a high temperature to obtain an active material.

Still another process is a process in which a transition metal source, e.g., a transition metal nitrate, sulfate, hydroxide, or oxide, a lithium source, e.g., LiOH, $Li_2CO_3$, or $LiNO_3$, and a source of another element, which is used according to need, are dissolved in or pulverized and dispersed in a solvent, e.g., water, and this solution or dispersion is dried and molded with a spray dryer or the like to obtain spherical or ellipsoidal precursor particles. This precursor is burned at a high temperature to obtain an active material.

<2-4-2 Electrode Structure and Production Process>

The configuration of the positive electrode to be used in the invention and a process for producing the positive electrode are explained below.

(1) Process for Producing Positive Electrode

The positive electrode is produced by forming a positive-electrode active-material layer including positive-electrode active-material particles and a binder on a current collector. The production of the positive electrode using a positive-electrode active material can be conducted by any known method. Namely, a positive-electrode active material and a binder are mixed together by a dry process optionally together with a conductive material, thickener, etc., and this mixture is formed into a sheet and press-bonded to a positive-electrode current collector. Alternatively, those materials are dissolved or dispersed in a liquid medium to obtain a slurry, and this slurry is applied to a positive-electrode current collector and dried. Thus, a positive-electrode active-material layer is formed on the current collector, and the positive electrode can be thereby obtained.

The content of the positive-electrode active material in the positive-electrode active-material layer is preferably 80% by mass or higher, more preferably 82% by mass or higher, especially preferably 84% by mass or higher. The upper limit thereof is preferably 99% by mass or less, more preferably 98% by mass or less. When the content of the positive-electrode active material in the positive-electrode active-material layer is too low, there are cases where an insufficient electrical capacity results. Conversely, when the content thereof is too high, there are cases where the positive electrode has insufficient strength. Incidentally, one positive-electrode active-material powder according to the invention may be used alone, or any desired two or more positive-electrode active-material powders according to the invention which differ in composition or powder property may be used in combination in any desired proportion.

(2) Conductive Material

As the conductive material, a known conductive material can be used at will. Examples thereof include metallic materials such as copper and nickel; graphites such as natural graphites and artificial graphites; carbon blacks such as acetylene black; and carbonaceous materials such as amorphous carbon, e.g., needle coke. One of these materials may be used alone, or any desired two or more thereof may be used in combination in any desired proportion.

The conductive material may be used so that the material is incorporated in the positive-electrode active-material layer in an amount which is generally 0.01% by mass or more, preferably 0.1% by mass or more, more preferably 1% by mass or more, and is generally 50% by mass or less, preferably 30% by mass or less, more preferably 15% by mass or less. When the content thereof is less than that range, there are cases where electrical conductivity is insufficient. When the content thereof exceeds that range, there are cases where a decrease in battery capacity results.

(3) Binder

The binder to be used for producing the positive-electrode active-material layer is not particularly limited so long as the binder is a material which is stable to the nonaqueous electrolytic solution and to the solvent to be used for electrode production.

In the case where the layer is to be formed through coating fluid application, any binder may be used so long as it is a material which is soluble or dispersible in the liquid medium for use in electrode production. Examples thereof include resinous polymers such as polyethylene, polypropylene, poly(ethylene terephthalate), poly(methyl methacrylate), aromatic polyamides, cellulose, and nitrocellulose; rubbery polymers such as SBR (styrene/butadiene rubbers), NBR (acrylonitrile/butadiene rubbers), fluororubbers, isoprene rubbers, butadiene rubbers, and ethylene/propylene rubbers; thermoplastic elastomeric polymers such as styrene/butadiene/styrene block copolymers or products of hydrogenation thereof, EPDM (ethylene/propylene/diene terpolymers), styrene/ethylene/butadiene/ethylene copolymers, and styrene/isoprene/styrene block copolymers or products of hydrogenation thereof; flexible resinous polymers such as syndiotactic 1,2-polybutadiene, poly(vinyl acetate), ethylene/vinyl acetate copolymers, and propylene/α-olefin copolymers; fluorochemical polymers such as poly(vinylidene fluoride) (PVdF), polytetrafluoroethylene, fluorinated poly(vinylidene fluoride), and polytetrafluoroethylene/ethylene copolymers; and polymer compositions having the property of conducting alkali metal ions (especially lithium ions). One of these substances may be used alone, or any desired two or more thereof may be used in combination in any desired proportion.

The proportion of the binder in the positive-electrode active-material layer is generally 0.1% by mass or higher, preferably 1% by mass or higher, more preferably 3% by mass or higher, and is generally 50% by mass or less, preferably 30% by mass or less, more preferably 10% by mass or less, especially preferably 8% by mass or less. When the proportion of the binder is less than that range, there are cases where the positive-electrode active material cannot be sufficiently held and the positive electrode has insufficient mechanical strength, resulting in a decrease in battery performance, e.g., cycle characteristics. When the proportion thereof exceeds that range, there are cases where such too high a proportion leads to a decrease in battery capacity or electrical conductivity.

(4) Liquid Medium

The kind of the liquid medium to be used for forming a slurry is not particularly limited so long as the liquid medium is a solvent in which the positive-electrode active material, conductive material, and binder and a thickener, which is used according to need, can be dissolved or dispersed. Either an aqueous solvent or an organic solvent may be used.

Examples of the aqueous medium include water and mixed solvents composed of an alcohol and water. Examples of the organic medium include: aliphatic hydrocarbons such as hexane; aromatic hydrocarbons such as benzene, toluene, xylene, and methylnaphthalene; heterocyclic compounds such as quinoline and pyridine; ketones such as acetone, methyl ethyl ketone, and cyclohexanone; esters such as methyl acetate and methyl acrylate; amines such as diethylenetriamine and N,N-dimethylaminopropylamine; ethers such as diethyl ether and tetrahydrofuran (THF); amides such as N-methylpyrrolidone (NMP), dimethylformamide, and dimethylacetamide; and aprotic polar solvents such as hexamethylphosphoramide and dimethyl sulfoxide. One of these media may be used alone, or any desired two or more thereof may be used in combination in a desired proportion.

(5) Thickener

In the case where an aqueous medium is used as the liquid medium for slurry formation, it is preferred to produce a slurry using a thickener and a latex of, for example, a styrene/butadiene rubber (SBR). The thickener is used in order to regulate the viscosity of the slurry.

The thickener is not limited unless the effects of the invention are considerably lessened thereby. Examples thereof include carboxymethyl cellulose, methyl cellulose, hydroxymethyl cellulose, ethyl cellulose, poly(vinyl alcohol), oxidized starch, phosphorylated starch, casein, and salts of these. One of these thickeners may be used alone, or any desired two or more thereof may be used in combination in any desired proportion.

In the case where such a thickener is further added, it is desirable that the proportion of the thickener to the active material should be generally 0.1% by mass or higher, preferably 0.5% by mass or higher, more preferably 0.6% by mass or higher, and be generally 5% by mass or less, preferably 3% by mass or less, more preferably 2% by mass or less. When the proportion of the thickener to the active material is less than that range, there are cases where applicability decreases considerably. When the proportion thereof exceeds that range, the proportion of the active material in the positive-electrode active-material layer is low. There is hence a problem that the battery has a reduced capacity, and there are cases where resistance among the particles of the positive-electrode active material increases.

(6) Densification by Pressing

It is preferred that the positive-electrode active-material layer obtained by coating fluid application and drying should be densified by pressing with a handpress, roller press, or the like in order to heighten the loading density of the positive-electrode active material. The density of the positive-electrode active-material layer is preferably 1 $g \cdot cm^{-3}$ or higher, more preferably 1.5 $g \cdot cm^{-3}$ or higher, especially preferably 2 $g \cdot cm^{-3}$ or higher, and is preferably 4 $g \cdot cm^{-3}$ or less, more preferably 3.5 $g \cdot cm^{-3}$ or less, especially preferably 3 $g \cdot cm^{-3}$ or less.

When the density of the positive-electrode active-material layer exceeds that range, there are cases where the nonaqueous electrolytic solution is less apt to infiltrate into around the current collector/active material interface and the battery has reduced charge/discharge characteristics especially at a high current density. When the density thereof is less than that range, there are cases where electrical conductivity among the active-material particles decreases and this increases battery resistance.

(7) Current Collector

The material of the positive-electrode current collector is not particularly limited, and a known one can be used at will. Examples thereof include metallic materials such as aluminum, stainless steel, nickel-plated materials, titanium, and tantalum; and carbonaceous materials such as carbon cloths and carbon papers. Of these, metallic materials are preferred. Especially preferred is aluminum.

In the case of a metallic material, examples of the shape of the current collector include metal foils, metal cylinders, metal coils, metal plates, thin metal films, expanded metals, punching metals, and metal foam. In the case of a carbonaceous material, examples of the collector shape include carbon plates, thin carbon films, and carbon cylinders. Of these, a thin metal film is preferred. The thin film may be suitably processed into a mesh form.

Although the current collector may have any desired thickness, the thickness thereof is generally 1 μm or more, preferably 3 μm or more, more preferably 5 μm or more, and is generally 1 mm or less, preferably 100 μm or less, more preferably 50 μm or less. When the thin film has a thickness less than that range, there are cases where this thin film is insufficient in the strength required of current collectors. When the thin film has a thickness larger than that range, there are cases where this film has impaired handleability.

The thickness ratio between the current collector and the positive-electrode active-material layer is not particularly limited. However, the value of (thickness of the positive-electrode active-material layer on one surface just before impregnation with electrolytic solution)/(thickness of the current collector) is preferably 20 or less, more preferably 15 or less, most preferably 10 or less, and the lower limit thereof is preferably 0.5 or greater, more preferably 0.8 or greater, most preferably 1 or greater. When the thickness ratio exceeds that range, there are cases where the current collector is heated up by Joule's heat during high-current-density charge/discharge. When the thickness ratio is less than that range, there are cases where the proportion by volume of the current collector to the positive-electrode active material increases to reduce the capacity of the battery.

<2-5. Separator>

A separator is generally interposed between the positive electrode and the negative electrode in order to prevent short-circuiting. In this case, the nonaqueous electrolytic solution of the invention is usually infiltrated into the separator.

The material and shape of the separator are not particularly limited, and known separators can be employed at will unless the effects of the invention are considerably lessened thereby. In particular, use may be made of separators constituted of materials stable to the nonaqueous electrolytic solution of the invention, such as resins, glass fibers, and inorganic materials. It is preferred to use a separator which is in the form of a porous sheet, nonwoven fabric, or the like and has excellent liquid retentivity.

As the material of the resinous or glass-fiber separators, use can be made of, for example, polyolefins such as polyethylene and polypropylene, polytetrafluoroethylene, polyethersulfones, glass filters, and the like. Preferred of these are glass filters and polyolefins. More preferred are polyolefins. One of these materials may be used alone, or any desired two or more thereof may be used in combination in any desired proportion.

The separator may have any desired thickness. However, the thickness thereof is generally 1 μm or more, preferably 5 μm or more, more preferably 10 μm or more, and is generally 50 μm or less, preferably 40 μm or less, more preferably 30 μm or less. When the thickness of the separator is less than that range, there are cases where insulating properties or mechanical strength decreases. When the thickness thereof exceeds that range, there are cases where not only battery performances, e.g., rate characteristics, decrease but also the nonaqueous-electrolyte secondary battery as a whole has a reduced energy density.

In the case where a porous material such as, e.g., a porous sheet or nonwoven fabric is used as the separator, this separator may have any desired porosity. However, the porosity thereof is generally 20% or higher, preferably 35% or higher, more preferably 45% or higher, and is generally 90% or lower, preferably 85% or lower, more preferably 75% or lower. In case where the porosity thereof is less than that range, this separator tends to have increased film resistance, resulting in impaired rate characteristics. In case where the porosity thereof is higher than that range, this separator tends to have reduced mechanical strength, resulting in reduced insulating properties.

The separator may have any desired average pore diameter. However, the average pore diameter thereof is generally 0.5 µm or less, preferably 0.2 µm or less, and is generally 0.05 µm or more. In case where the average pore diameter thereof exceeds that range, short-circuiting is apt to occur. When the average pore diameter thereof is less than that range, there are cases where this separator has increased film resistance, resulting in reduced rate characteristics.

On the other hand, examples of the inorganic materials which may be used include oxides such as alumina and silicon dioxide, nitrides such as aluminum nitride and silicon nitride, and sulfates such as barium sulfate and calcium sulfate. Such materials of a particulate shape or fibrous shape may be used.

With respect to form, a separator of a thin film form may be used, such as nonwoven fabric, woven fabric, or microporous film. Suitable separators of a thin film form have a pore diameter of 0.01-1 µm and a thickness of 5-50 µm. Besides such a separator in an independent thin film form, use can be made of a separator obtained by forming a composite porous layer containing particles of the inorganic material using a resinous binder on a surface layer of the positive electrode and/or negative electrode. Examples thereof include to form a porous layer from alumina particles having a 90% particle diameter smaller than 1 µm on both surfaces of the positive electrode using a fluororesin as a binder.

<2-6. Battery Design>

[Electrode Group]

The electrode group may be either of: an electrode group having a multilayer structure in which the positive-electrode plate and the negative-electrode plate have been superposed through the separator; and an electrode group having a wound structure in which the positive-electrode plate and the negative-electrode plate have been spirally wound through the separator. The proportion of the volume of the electrode group to the internal volume of the battery (hereinafter referred to as electrode group proportion) is generally 40% or higher, preferably 50% or higher, and is generally 90% or less, preferably 80% or less. In case where the electrode group proportion is less than that range, the battery has reduced capacity. In case where the electrode group proportion exceeds that range, the battery has too small a space volume and undergoes an increase in internal pressure when the battery is heated up to cause members to expand or a liquid component of the electrolyte to have a heightened vapor pressure. There are hence cases where this battery is reduced in various characteristics including charge/discharge cycle performance and high-temperature storability, and where the gas release valve, which releases the internal pressure outside, works.

[Structure for Current Collection]

The structure for current collection is not particularly limited. However, for more effectively attaining the improvement in discharge characteristics which is brought about by the nonaqueous electrolytic solution of the invention, it is preferred to employ a structure reduced in the resistance of wiring parts and joint parts. In the case where internal resistance has been reduced in this manner, use of the nonaqueous electrolytic solution of the invention produces the effects thereof especially satisfactorily.

In the case of an electrode group assembled into the multilayer structure described above, a structure obtained by bundling the metallic core parts of respective electrode layers and welding the bundled parts to terminals is suitable. When each electrode has a large area, this results in increased internal resistance. In this case, it is preferred to dispose a plurality of terminals in each electrode to reduce the resistance. In the case of an electrode group having the wound structure described above, a plurality of lead structures may be disposed on each of the positive electrode and negative electrode and bundled into a terminal. Thus, internal resistance can be reduced.

[Outer Case]

The material of the outer case to be used is not particularly limited so long as the material is stable to the nonaqueous electrolytic solution to be used. Specifically, use is made of a metal, e.g., a nickel-plated steel sheet, stainless steel, aluminum, an aluminum alloy, or a magnesium alloy, or a laminated film composed of a resin and an aluminum foil. From the standpoint of weight reduction, a metal such as aluminum or an aluminum alloy or a laminated film is suitable.

Examples of the outer case employing any of those metals include: an outer case formed by fusion-bonding the metal to itself by laser welding, resistance welding, or ultrasonic welding to constitute a sealed structure; and an outer case formed by caulking the metal through a resinous gasket to constitute a caulked structure. Examples of the outer case employing the laminated film include an outer case having a sealed structure obtained by thermally fusion-bonding the resin layer to itself. A resin which is different from the resin used in the laminated film may be interposed between the resin layers in order to enhance sealing properties. Especially in the case where resin layers are thermally fusion-bonded to each other through collector terminals to form a sealed structure, either a resin having polar groups or a resin which has been modified by introducing polar groups thereinto is suitable for use as the resin to be interposed, because metal/resin bonding is involved.

[Protective Element]

Examples of the protective element include a PTC (positive temperature coefficient), which increases in resistance upon abnormal heating-up or when an excessive current flows, a temperature fuse, a thermister, and a valve (current breaker valve) which, upon abnormal heating-up, breaks the current flowing through the circuit, on the basis of an abrupt increase in the internal pressure or internal temperature of the battery. It is preferred to select such a protective element which does not work under ordinary high-current use conditions. From the standpoint of high output, it is more preferred to employ a design which prevents abnormal heating-up and thermal run-away even without a protective element.

[Case]

The nonaqueous-electrolyte secondary battery of the invention usually is fabricated by housing the nonaqueous electrolytic solution, negative electrode, positive electrode, separator, etc. in a case. This case is not limited, and a known case can be employed at will unless this considerably lessens the effects of the invention.

Specifically, although the case may be made of any desired material, use is generally made of nickel-plated iron, stainless steel, aluminum or an alloy thereof, nickel, titanium, or the like.

The case may have any desired shape. For example, the case may be any of the cylindrical type, prismatic type, laminate type, coin type, large type, and the like.

EXAMPLES

The invention will be explained below in more detail by reference to Examples and Comparative Examples. However, the invention should not be construed as being limited to the following Examples.

Example 1

Production of Negative Electrode

To 98 parts by mass of artificial-graphite powder KS-44 (trade name; manufactured by Timcal) were added 100 parts by mass of an aqueous dispersion of sodium carboxymethyl cellulose (concentration of sodium carboxymethyl cellulose, 1% by mass) as a thickener and 2 parts by mass of an aqueous dispersion of a styrene/butadiene rubber (concentration of styrene/butadiene rubber, 50% by mass) as a binder. The ingredients were mixed together by means of a disperser to obtain a slurry. The slurry obtained was applied to one surface of a copper foil having a thickness of 10 μm and dried. This coated foil was pressed by rolling with a pressing machine, and a piece of a shape having an active-material layer size with a width of 30 mm and a length of 40 mm and having an uncoated area with a width of 5 mm and a length of 9 mm was cut out of the rolled sheet. Thus, a negative electrode was obtained.

[Production of Positive Electrode]

Ninety percents by mass Li(Ni$_{1/3}$Mn$_{1/3}$Co$_{1/3}$)O$_2$ (LNMC) as a positive-electrode active material was mixed with 5% by mass acetylene black as a conductive material and 5% by mass poly(vinylidene fluoride) (PVdF) as a binder in N-methylpyrrolidone solvent to obtain a slurry. The slurry obtained was applied to one surface of an aluminum foil having a thickness of 15 μm and coated beforehand with a conduction aid, and dried. This coated foil was rolled with a pressing machine to a thickness of 80 μm, and a piece of a shape having an active-material layer size with a width of 30 mm and a length of 40 mm and having a uncoated area with a width of 5 mm and a length of 9 mm was cut out of the rolled sheet. Thus, a positive electrode was obtained.

[Production of Electrolytic Solution]

In a dry argon atmosphere, 99.5 parts by mass of a mixture of ethylene carbonate (EC), dimethyl carbonate (DMC), and ethyl methyl carbonate (EMC) (volume ratio, 30:30:40) was mixed with 0.5 parts by mass of vinylene carbonate (VC). Subsequently, sufficiently dried LiFSO$_3$ and LiPF$_6$ were dissolved therein so as to result in proportions thereof of 0.01 mol/L and 1 mol/L, respectively. Thus, an electrolytic solution was obtained.

[Production of Lithium Secondary Battery]

The positive electrode and negative electrode described above and a separator made of polyethylene were superposed in the order of negative electrode/separator/positive electrode to produce a battery element. This battery element was inserted into a bag constituted of a laminated film obtained by coating both surfaces of aluminum (thickness, 40 μm) with a resin layer, with the terminals of the positive and negative electrodes projecting outward. Thereafter, the electrolytic solution was introduced into the bag, and this bag was vacuum-sealed to produce a sheet battery which came into a fully charged state at 4.1 V. The battery design is shown in Table 1.

[Evaluation of Initial Discharge Capacity]

The lithium secondary battery was evaluated in the state of being sandwiched between glass plates in order to enhance contact between the electrodes. At 25° C., this battery was charged to 4.1 V at a constant current corresponding to 0.2 C and then discharged to 3.0 V at a constant current of 0.2 C. Two cycles of this charge/discharge were conducted to stabilize the battery. In the third cycle, the battery was charged to 4.1 V at a constant current of 0.2 C, subsequently charged at a constant voltage of 4.1 V until the current value became 0.05 C, and then discharged to 3.0 V at a constant current of 0.2 C. Thereafter, in the fourth cycle, the battery was charged to 4.1 V at a constant current of 0.2 C, subsequently charged at a constant voltage of 4.1 V until the current value became 0.05 C, and then discharged to 3.0 V at a constant current of 0.2 C to determine initial discharge capacity. Here, "1 C" means a current value at which the reference capacity of the battery is discharged over 1 hour; "5 C" means the current value which is 5 times the current of 1 C, "0.1 C" means the current value which is 1/10 the current of 1 C, and "0.2 C" means the current value which is 1/5 the current of 1 C. The results of the evaluation are shown in Table 2.

[Evaluation of −30° C. Impedance]

The battery which had undergone the evaluation of initial capacity was charged at 25° C. and a constant current of 0.2 C to a half of the initial discharge capacity. At −30° C., an alternating-voltage amplitude of 10 mV was applied to the battery to measure the impedance of the battery. Thus, real resistance at 0.08 Hz was determined. The results of the evaluation are shown in Table 2.

Example 2

In a dry argon atmosphere, 99.5 parts by mass of a mixture of ethylene carbonate (EC), dimethyl carbonate (DMC), and ethyl methyl carbonate (EMC) (volume ratio, 30:30:40) was mixed with 0.5 parts by mass of vinylene carbonate (VC). Subsequently, sufficiently dried LiFSO$_3$ and LiPF$_6$ were dissolved therein so as to result in proportions thereof of 0.1 mol/L and 0.9 mol/L, respectively. Thus, an electrolytic solution was obtained. A sheet-form lithium secondary battery was produced and evaluated in the same manners as in Example 1. The battery design is shown in Table 1, and the results of the evaluation are shown in Table 2.

Example 3

A sheet-form lithium secondary battery was produced and evaluated in the same manners as in Example 1, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried LiFSO$_3$ and LiPF$_6$ therein so as to result in proportions thereof of 0.3 mol/L and 0.7 mol/L, respectively. The battery design is shown in Table 1, and the results of the evaluation are shown in Table 2.

Example 4

A sheet-form lithium secondary battery was produced and evaluated in the same manners as in Example 1, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried $LiFSO_3$ and $LiPF_6$ therein so as to result in proportions thereof of 0.5 mol/L and 0.5 mol/L, respectively. The battery design is shown in Table 1, and the results of the evaluation are shown in Table 2.

Example 5

A sheet-form lithium secondary battery was produced and evaluated in the same manners as in Example 1, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried tetraethylammonium fluorosulfonate ($TEAFSO_3$) and $LiPF_6$ therein so as to result in proportions thereof of 0.05 mol/L and 1 mol/L, respectively. The battery design is shown in Table 1, and the results of the evaluation are shown in Table 2.

Example 6

A sheet-form lithium secondary battery was produced and evaluated in the same manners as in Example 1, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried tetrabuthylammonium fluorosulfonate ($TBAFSO_3$) and $LiPF_6$ therein so as to result in proportions thereof of 0.05 mol/L and 1 mol/L, respectively. The battery design is shown in Table 1, and the results of the evaluation are shown in Table 2.

Example 7

A sheet-form lithium secondary battery was produced and evaluated in the same manners as in Example 1, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried tetraethylphosphonium fluorosulfonate ($TEPFSO_3$) and $LiPF_6$ therein so as to result in proportions thereof of 0.05 mol/L and 1 mol/L, respectively. The battery design is shown in Table 1, and the results of the evaluation are shown in Table 2.

Example 8

A sheet-form lithium secondary battery was produced and evaluated in the same manners as in Example 1, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried tetrabuthylphosphonium fluorosulfonate ($TBPFSO_3$) and $LiPF_6$ therein so as to result in proportions thereof of 0.05 mol/L and 1 mol/L, respectively. The battery design is shown in Table 1, and the results of the evaluation are shown in Table 2.

Comparative Example 1

A sheet-form lithium secondary battery was produced and evaluated in the same manners as in Example 1, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried $LiFSO_3$ therein so as to result in a proportion thereof of 1 mol/L. The battery design is shown in Table 1, and the results of the evaluation are shown in Table 2.

Comparative Example 2

A sheet-form lithium secondary battery was produced and evaluated in the same manners as in Example 1, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried $LiFSO_3$ and $LiPF_6$ therein so as to result in proportions thereof of 0.7 mol/L and 0.3 mol/L, respectively. The battery design is shown in Table 1, and the results of the evaluation are shown in Table 2.

Comparative Example 3

A sheet-form lithium secondary battery was produced and evaluated in the same manners as in Example 1, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried $LiFSO_3$ and $LiPF_6$ therein so as to result in proportions thereof of 0.55 mol/L and 0.45 mol/L, respectively. The battery design is shown in Table 1, and the results of the evaluation are shown in Table 2.

Comparative Example 4

A sheet-form lithium secondary battery was produced and evaluated in the same manners as in Example 1, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried $LiPF_6$ therein so as to result in a proportion thereof of 1 mol/L. The battery design is shown in Table 1, and the results of the evaluation are shown in Table 2.

TABLE 1

| | Electrolyte (concentration) | Solvent (volume ratio) | Additive (parts by mass) | Positive-electrode active material (evaluation voltage) | [FSO$_3$]/[PF$_6$] |
|---|---|---|---|---|---|
| Example 1 | LiFSO$_3$ (0.01M) LiPF$_6$ (1.0M) | EC:DMC:EMC (30:30:40) | VC (0.5) | LNMC (4.1 V) | 0.010 |
| Example 2 | LiFSO$_3$ (0.1M) LiPF$_6$ (0.9M) | EC:DMC:EMC (30:30:40) | VC (0.5) | LNMC (4.1 V) | 0.111 |
| Example 3 | LiFSO$_3$ (0.3M) LiPF$_6$ (0.7M) | EC:DMC:EMC (30:30:40) | VC (0.5) | LNMC (4.1 V) | 0.429 |
| Example 4 | LiFSO$_3$ (0.5M) LiPF$_6$ (0.5M) | EC:DMC:EMC (30:30:40) | VC (0.5) | LNMC (4.1 V) | 1.000 |
| Example 5 | TEAFSO$_3$ (0.05M) LiPF$_6$ (1.0M) | EC:DMC:EMC (30:30:40) | VC (0.5) | LNMC (4.1 V) | 0.050 |
| Example 6 | TBAFSO$_3$ (0.05M) LiPF$_6$ (1.0M) | EC:DMC:EMC (30:30:40) | VC (0.5) | LNMC (4.1 V) | 0.050 |
| Example 7 | TEPFSO$_3$ (0.05M) LiPF$_6$ (1.0M) | EC:DMC:EMC (30:30:40) | VC (0.5) | LNMC (4.1 V) | 0.050 |
| Example 8 | TBPFSO$_3$ (0.05M) LiPF$_6$ (1.0M) | EC:DMC:EMC (30:30:40) | VC (0.5) | LNMC (4.1 V) | 0.050 |
| Comparative Example 1 | LiFSO$_3$ (1.0M) | EC:DMC:EMC (30:30:40) | VC (0.5) | LNMC (4.1 V) | ∞ |
| Comparative Example 2 | LiFSO$_3$ (0.7M) LiPF$_6$ (0.3M) | EC:DMC:EMC (30:30:40) | VC (0.5) | LNMC (4.1 V) | 2.333 |
| Comparative Example 3 | LiFSO$_3$ (0.55M) LiPF$_6$ (0.45M) | EC:DMC:EMC (30:30:40) | VC (0.5) | LNMC (4.1 V) | 1.222 |
| Comparative Example 4 | LiPF$_6$ (1.0M) | EC:DMC:EMC (30:30:40) | VC (0.5) | LNMC (4.1 V) | 0.000 |

TABLE 2

| | Initial discharge capacity (mAh/g) | Initial impedance (relative value; the value in Comparative Example 4 being taken as 1) |
|---|---|---|
| Example 1 | 140.9 | 0.78 |
| Example 2 | 141.2 | 0.67 |
| Example 3 | 141.2 | 0.61 |
| Example 4 | 139.0 | 0.85 |
| Example 5 | 140.8 | 0.86 |
| Example 6 | 141.8 | 0.82 |
| Example 7 | 139.2 | 0.76 |
| Example 8 | 139.8 | 0.77 |
| Comparative Example 1 | 132.8 | 22.32 |
| Comparative Example 2 | 132.3 | 2.24 |
| Comparative Example 3 | 137.2 | 1.15 |
| Comparative Example 4 | 140.2 | 1.00 |

Example 9

A sheet-form lithium secondary battery was produced in the same manner as in Example 1, except that an electrolytic solution was obtained in a dry argon atmosphere by preparing 99.5 parts by mass of a mixture of ethylene carbonate (EC), dimethyl carbonate (DMC), and ethyl methyl carbonate (EMC) (volume ratio, 30:30:40) and 0.5 parts by mass of vinylene carbonate (VC) and then dissolving sufficiently dried LiFSO$_3$ and LiPF$_6$ therein so as to result in proportions thereof of 0.05 mol/L and 1 mol/L, respectively. The battery design is shown in Table 3.

[Evaluation of Initial Discharge Capacity]

The lithium secondary battery was evaluated in the state of being sandwiched between glass plates in order to enhance contact between the electrodes. At 25° C., this battery was charged to 4.1 V at a constant current corresponding to 0.2 C and then discharged to 3.0 V at a constant current of 0.2 C. Two cycles of this charge/discharge were conducted to stabilize the battery. In the third cycle, the battery was charged to 4.1 V at a constant current of 0.2 C, subsequently charged at a constant voltage of 4.1 V until the current value became 0.05 C, and then discharged to 3.0 V at a constant current of 0.2 C. Thereafter, in the fourth cycle, the battery was charged to 4.1 V at a constant current of 0.2 C, subsequently charged at a constant voltage of 4.1 V until the current value became 0.05 C, and then discharged to 3.0 V at a constant current of 0.2 C to determine initial discharge capacity.

[Evaluation of Initial 25° C. Output]

The battery which had undergone the evaluation of initial discharge capacity was charged at 25° C. and a constant current of 0.2 C to a half of the initial discharge capacity. This battery was discharged at 25° C. at each of 1 C, 2 C, 3 C, 5 C, 10 C, 15 C, and 20 C, and the voltage was measured at the time when 10 seconds had passed since the discharge initiation. The area of the triangle surrounded by the current-voltage line and the lower-limit voltage (3 V) was regarded as output (W). The relative value (%) of the output was calculated, with the output value at 25° C. in Comparative Example 5 being taken as 100. The results of the battery evaluation are shown in Table 4.

[Evaluation of Initial −30° C. Output]

The battery which had undergone the evaluation of initial discharge capacity was charged at 25° C. and a constant current of 0.2 C to a half of the initial discharge capacity. This battery was discharged at −30° C. at each of 0.2 C, 0.4 C, 0.8 C, 1 C, and 2 C, and the voltage was measured at the time when 2 seconds had passed since the discharge initiation. The area of the triangle surrounded by the current-voltage line and the lower-limit voltage (3 V) was regarded as output (W). The relative value (%) of the output was calculated, with the output value at −30° C. in Comparative Example 5 being taken as 100. The results of the battery evaluation are shown in Table 4.

Example 10

A sheet-form lithium secondary battery was produced in the same manner as in Example 1, except that an electrolytic solution was obtained in a dry argon atmosphere by preparing 99.5 parts by mass of a mixture of ethylene carbonate (EC), dimethyl carbonate (DMC), and ethyl methyl carbonate (EMC) (volume ratio, 30:30:40) and 0.5 parts by mass of vinylene carbonate (VC) and then dissolving sufficiently dried $LiFSO_3$ and $LiPF_6$ therein so as to result in proportions thereof of 0.1 mol/L and 1 mol/L, respectively. The battery design is shown in Table 3, and the results of the evaluation are shown in Table 4.

Example 11

A sheet-form lithium secondary battery was produced in the same manner as in Example 1, except that an electrolytic solution was obtained in a dry argon atmosphere by preparing 99.5 parts by mass of a mixture of ethylene carbonate (EC), dimethyl carbonate (DMC), and ethyl methyl carbonate (EMC) (volume ratio, 30:30:40) and 0.5 parts by mass of vinylene carbonate (VC) and then dissolving sufficiently dried $LiFSO_3$ and $LiPF_6$ therein so as to result in proportions thereof of 0.2 mol/L and 1 mol/L, respectively. The battery design is shown in Table 3, and the results of the evaluation are shown in Table 4.

Example 12

A sheet-form lithium secondary battery was produced in the same manner as in Example 1, except that an electrolytic solution was obtained in a dry argon atmosphere by preparing 99.5 parts by mass of a mixture of ethylene carbonate (EC), dimethyl carbonate (DMC), and ethyl methyl carbonate (EMC) (volume ratio, 30:30:40) and 0.5 parts by mass of vinylene carbonate (VC) and then dissolving sufficiently dried $LiFSO_3$ and $LiPF_6$ therein so as to result in proportions thereof of 0.3 mol/L and 0.7 mol/L, respectively. The battery design is shown in Table 3, and the results of the evaluation are shown in Table 4.

Example 13

A sheet-form lithium secondary battery was produced in the same manner as in Example 1, except that an electrolytic solution was obtained in a dry argon atmosphere by preparing 99.5 parts by mass of a mixture of ethylene carbonate (EC), dimethyl carbonate (DMC), and ethyl methyl carbonate (EMC) (volume ratio, 30:30:40) and 0.5 parts by mass of monofluoroethylene carbonate (MFEC) and then dissolving sufficiently dried $LiFSO_3$ and $LiPF_6$ therein so as to result in proportions thereof of 0.1 mol/L and 1 mol/L, respectively. The battery design is shown in Table 3, and the results of the evaluation are shown in Table 4.

Example 14

A sheet-form lithium secondary battery was produced in the same manner as in Example 1, except that an electrolytic solution was obtained in a dry argon atmosphere by preparing 99.8 parts by mass of a mixture of ethylene carbonate (EC), dimethyl carbonate (DMC), and ethyl methyl carbonate (EMC) (volume ratio, 30:30:40) and 0.2 parts by mass of 1-propene-1,3-sultone (PRES) and then dissolving sufficiently dried $LiFSO_3$ and $LiPF_6$ therein so as to result in proportions thereof of 0.1 mol/L and 1 mol/L, respectively. The battery design is shown in Table 3, and the results of the evaluation are shown in Table 4.

Example 15

A sheet-form lithium secondary battery was produced in the same manner as in Example 1, except that an electrolytic solution was obtained in a dry argon atmosphere by preparing 99.8 parts by mass of a mixture of ethylene carbonate (EC), dimethyl carbonate (DMC), and ethyl methyl carbonate (EMC) (volume ratio, 30:30:40) and 0.2 parts by mass of succinonitrile (SN) and then dissolving sufficiently dried $LiFSO_3$ and $LiPF_6$ therein so as to result in proportions thereof of 0.1 mol/L and 1 mol/L, respectively. The battery design is shown in Table 3, and the results of the evaluation are shown in Table 4.

Comparative Example 5

A sheet-form lithium secondary battery was produced in the same manner as in Example 1, except that an electrolytic solution was obtained in a dry argon atmosphere by preparing 99.5 parts by mass of a mixture of ethylene carbonate (EC), dimethyl carbonate (DMC), and ethyl methyl carbonate (EMC) (volume ratio, 30:30:40) and 0.5 parts by mass of vinylene carbonate (VC) and then dissolving sufficiently dried $LiPF_6$ therein so as to result in a proportion thereof of 1 mol/L. The battery design is shown in Table 3, and the results of the evaluation are shown in Table 4.

Comparative Example 6

A sheet-form lithium secondary battery was produced in the same manner as in Example 1, except that an electrolytic solution was obtained in a dry argon atmosphere by preparing 99.5 parts by mass of a mixture of ethylene carbonate (EC), dimethyl carbonate (DMC), and ethyl methyl carbonate (EMC) (volume ratio, 30:30:40) and 0.5 parts by mass of 1-propene-1,3-sultone (PRES) and then dissolving sufficiently dried $LiPF_6$ therein so as to result in a proportion thereof of 1 mol/L. The battery design is shown in Table 3, and the results of the evaluation are shown in Table 4.

TABLE 3

|  | Electrolyte (concentration) | Solvent (volume ratio) | Additive (parts by mass) | Positive-electrode active material (evaluation voltage) | [FSO$_3$]/[PF$_6$] |
|---|---|---|---|---|---|
| Example 9 | LiFSO$_3$ (0.05M) LiPF$_6$ (1.0M) | EC:DMC:EMC (30:30:40) | VC (0.5) | LNMC (4.1 V) | 0.050 |
| Example 10 | LiFSO$_3$ (0.1M) LiPF$_6$ (1.0M) | EC:DMC:EMC (30:30:40) | VC (0.5) | LNMC (4.1 V) | 0.100 |
| Example 11 | LiFSO$_3$ (0.2M) LiPF$_6$ (1.0M) | EC:DMC:EMC (30:30:40) | VC (0.5) | LNMC (4.1 V) | 0.200 |
| Example 12 | LiFSO$_3$ (0.3M) LiPF$_6$ (0.7M) | EC:DMC:EMC (30:30:40) | VC (0.5) | LNMC (4.1 V) | 0.429 |
| Example 13 | LiFSO$_3$ (0.1M) LiPF$_6$ (1.0M) | EC:DMC:EMC (30:30:40) | MFEC (0.5) | LNMC (4.1 V) | 0.100 |
| Example 14 | LiFSO$_3$ (0.1M) LiPF$_6$ (1.0M) | EC:DMC:EMC (30:30:40) | PRES (0.2) | LNMC (4.1 V) | 0.100 |
| Example 15 | LiFSO$_3$ (0.1M) LiPF$_6$ (1.0M) | EC:DMC:EMC (30:30:40) | SN (0.2) | LNMC (4.1 V) | 0.100 |
| Comparative Example 5 | LiFSO$_3$ (1.0M) | EC:DMC:EMC (30:30:40) | VC (0.5) | LNMC (4.1 V) | ∞ |
| Comparative Example 6 | LiPF$_6$ (1.0M) | EC:DMC:EMC (30:30:40) | PRES (0.5) | LNMC (4.1 V) | ∞ |

TABLE 4

|  | Initial 25° C. Output (relative value; the value in Comparative Example 5 being taken as 1) | Initial −30° C. Output (relative value; the value in Comparative Example 5 being taken as 1) |
|---|---|---|
| Example 9 | 1.02 | 1.14 |
| Example 10 | 1.03 | 1.21 |
| Example 11 | 1.04 | 1.24 |
| Example 12 | 1.04 | 1.53 |
| Example 13 | 1.04 | 1.27 |
| Example 14 | 1.02 | 1.16 |
| Example 15 | 1.02 | 1.14 |
| Comparative Example 5 | 1.00 | 1.00 |
| Comparative Example 6 | 0.60 | 0.80 |

Example 16

A sheet-form lithium secondary battery was produced in the same manner as in Example 1, except that an electrolytic solution was obtained in a dry argon atmosphere by preparing a mixture of ethylene carbonate (EC), dimethyl carbonate (DMC), and ethyl methyl carbonate (EMC) (volume ratio, 30:30:40) and then dissolving sufficiently dried LiFSO$_3$ and LiPF$_6$ therein so as to result in proportions thereof of 0.05 mol/L and 1 mol/L, respectively. The battery design is shown in Table 5.

[Evaluation of Initial Discharge Capacity]

The lithium secondary battery was evaluated in the state of being sandwiched between glass plates in order to enhance contact between the electrodes. At 25° C., this battery was charged to 4.1 V at a constant current corresponding to 0.2 C and then discharged to 3.0 V at a constant current of 0.2 C. Two cycles of this charge/discharge were conducted to stabilize the battery. In the third cycle, the battery was charged to 4.1 V at a constant current of 0.2 C, subsequently charged at a constant voltage of 4.1 V until the current value became 0.05 C, and then discharged to 3.0 V at a constant current of 0.2 C. Thereafter, in the fourth cycle, the battery was charged to 4.1 V at a constant current of 0.2 C, subsequently charged at a constant voltage of 4.1 V until the current value became 0.05 C, and then discharged to 3.0 V at a constant current of 0.2 C to determine initial discharge capacity. Here, "1 C" means a current value at which the reference capacity of the battery is discharged over 1 hour; "5 C" means the current value which is 5 times the current of 1 C, "0.1 C" means the current value which is 1/10 the current of 1 C, and "0.2 C" means the current value which is 1/5 the current of 1 C. The results of the battery evaluation are shown in Table 6.

[Evaluation of High-Temperature Cycle Characteristics]

At 60° C., the battery which had undergone the evaluation of initial capacity was charged to 4.1 V at a constant current of 2 C and then discharged to 3.0 V at a constant current of 2 C. This operation was taken as one cycle, and 500 cycles were conducted. At 25° C., the battery which had undergone the cycling was charged to 4.1 V and was then discharged to 3.0 V at a constant current of 0.2 C to determine the after-cycling capacity. The results of the battery evaluation are shown in Table 6.

[Evaluation of 25° C. Output after High-Temperature Cycling]

The battery which had undergone the evaluation of high-temperature cycle characteristics was charged at 25° C. and a constant current of 0.2 C to a half of the initial discharge capacity. This battery was discharged at 25° C. at each of 1 C, 2 C, 3 C, 5 C, 10 C, 15 C, and 20 C, and the voltage was measured at the time when 10 seconds had passed since the discharge initiation. The area of the triangle surrounded by the current-voltage line and the lower-limit voltage (3 V) was regarded as output (W). The relative value (%) of the output was calculated, with the output value at 25° C. in Comparative Example 5 being taken as 100. The results of the battery evaluation are shown in Table 6.

[Evaluation of −30° C. Output after High-Temperature Cycling]

The battery which had undergone the evaluation of high-temperature cycle characteristics was charged at 25° C. and a constant current of 0.2 C to a half of the initial discharge capacity. This battery was discharged at −30° C. at each of 0.2 C, 0.4 C, 0.8 C, 1 C, and 2 C, and the voltage was measured at the time when 2 seconds had passed since the discharge initiation. The area of the triangle surrounded by the current-voltage line and the lower-limit voltage (3 V) was regarded as output (W). The relative value (%) of the output was calculated, with the output value at −30° C. in Comparative Example 7 being taken as 100. The results of the battery evaluation are shown in Table 6.

[Evaluation of High-Temperature Storability]

The battery which had undergone the test for evaluating initial discharge capacity was charged to 4.1 V at a constant current of 0.2 C and then charged at a constant voltage of 4.1 V until the current value became 0.05 C. This battery was stored at 60° C. for 20 days, cooled to room temperature, and then discharged at 25° C. to 3 V at a constant current of 0.2 C to determine the residual capacity. Thereafter, the recovery capacity of this battery was determined through a test in which the battery was charged to 4.1 V at a constant current of 0.2 C, subsequently charged at a constant voltage of 4.1 V until the current value became 0.05 C, and then discharged to 3 V at a constant current of 0.2 C. Finally, the capacity retention after storage (%) was determined by calculating (recovery capacity)÷(initial discharge capacity)<100. The results of the battery evaluation are shown in Table 6.

Example 17

A sheet-form lithium secondary battery was produced in the same manner as in Example 1, except that an electrolytic solution was obtained in a dry argon atmosphere by preparing a mixture of ethylene carbonate (EC), dimethyl carbonate (DMC), and ethyl methyl carbonate (EMC) (volume ratio, 30:30:40) and then dissolving sufficiently dried LiFSO$_3$ and LiPF$_6$ therein so as to result in proportions thereof of 0.1 mol/L and 1 mol/L, respectively. This battery was subjected to the same evaluation as in Example 16. The battery design is shown in Table 5, and the results of the evaluation are shown in Table 6.

Example 18

A sheet-form lithium secondary battery was produced in the same manner as in Example 1, except that an electrolytic solution was obtained in a dry argon atmosphere by preparing a mixture of ethylene carbonate (EC), dimethyl carbonate (DMC), and ethyl methyl carbonate (EMC) (volume ratio, 30:30:40) and then dissolving sufficiently dried LiFSO$_3$, LiPO$_2$F$_2$, and LiPF$_6$ therein so as to result in proportions thereof of 0.05 mol/L, 0.05 mol/L, and 1 mol/L, respectively. This battery was subjected to the same evaluation as in Example 16. The battery design is shown in Table 5, and the results of the evaluation are shown in Table 6.

Example 19

A sheet-form lithium secondary battery was produced in the same manner as in Example 1, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried LiFSO$_3$, LiPO$_2$F$_2$, and LiPF$_6$ therein so as to result in proportions thereof of 0.05 mol/L, 0.05 mol/L, and 1 mol/L, respectively. This battery was subjected to the same evaluation as in Example 16. The battery design is shown in Table 5, and the results of the evaluation are shown in Table 6.

Comparative Example 7

A sheet-form lithium secondary battery was produced in the same manner as in Example 1, except that an electrolytic solution was obtained in a dry argon atmosphere by preparing a mixture of ethylene carbonate (EC), dimethyl carbonate (DMC), and ethyl methyl carbonate (EMC) (volume ratio, 30:30:40) and then dissolving sufficiently dried LiPF$_6$ therein so as to result in a proportion thereof of 1 mol/L. This battery was subjected to the same evaluation as in Example 16. The battery design is shown in Table 5, and the results of the evaluation are shown in Table 6.

TABLE 5

|  | Electrolyte (concentration) | Solvent (volume ratio) | Additive (parts by mass) | Positive-electrode active material (evaluation voltage) | [FSO$_3$]/ [PF$_6$] |
|---|---|---|---|---|---|
| Example 16 | LiFSO$_3$ (0.05M) LiPF$_6$ (1.0M) | EC:DMC:EMC (30:30:40) | none | LNMC (4.1 V) | 0.050 |
| Example 17 | LiFSO$_3$ (0.1M) LiPF$_6$ (1.0M) | EC:DMC:EMC (30:30:40) | none | LNMC (4.1 V) | 0.100 |
| Example 18 | LiFSO$_3$ (0.05M) LiPF$_6$ (1.0M) LiPO$_2$F$_2$ (0.05M) | EC:DMC:EMC (30:30:40) | none | LNMC (4.1 V) | 0.050 |
| Example 19 | LiFSO$_3$ (0.05M) LiPF$_6$ (1.0M) | EC:DMC:EMC (30:30:40) | VC (0.5) | LNMC (4.1 V) | 0.050 |

TABLE 5-continued

|  | Electrolyte (concentration) | Solvent (volume ratio) | Additive (parts by mass) | Positive-electrode active material (evaluation voltage) | [FSO$_3$]/ [PF$_6$] |
|---|---|---|---|---|---|
| Comparative Example 7 | LiPO$_2$F$_2$ (0.05M) LiPF$_6$ (1.0M) | EC:DMC:EMC (30:30:40) | none | LNMC (4.1 V) | 0.000 |

TABLE 6

| | | | Evaluation of cycle characteristics | | | | |
|---|---|---|---|---|---|---|---|
| | | | Relative 25° C. output after cycling (W); the 25° C. | Relative −30° C. output after cycling (W); the | Evaluation of high-temperature storability | | |
| | Initial battery capacity (mAh/g) | Capacity after 500 cycles (mAh/g) | output after cycling in Comparative Example 7 being taken as 1 | −30° C. output after cycling in Comparative Example 7 being taken as 1 | Residual capacity (mAh/g) | Recovery capacity (mAh/g) | Capacity retention (%) |
| Example 16 | 138.1 | 118.5 | 1.11 | 1.13 | 122.5 | 132.9 | 96.2 |
| Example 17 | 138.1 | 119.3 | 1.12 | 1.11 | 123.8 | 133.7 | 96.8 |
| Example 18 | 138.7 | 120.5 | 1.28 | 1.27 | 124.1 | 133.4 | 96.2 |
| Example 19 | 138.0 | 123.5 | 1.24 | 1.06 | 124.6 | 133.2 | 96.5 |
| Comparative Example 7 | 138.1 | 111.0 | 1.00 | 1.00 | 120.0 | 131.6 | 95.3 |

Example 20

Production of Positive Electrode

Ninety percents by mass iron lithium phosphate (LiFePO$_4$, LFP) as a positive-electrode active material was mixed with 5% by mass acetylene black as a conductive material and 5% by mass poly(vinylidene fluoride) (PVdF) as a binder in N-methylpyrrolidone solvent to obtain a slurry. The slurry obtained was applied to one surface of an aluminum foil having a thickness of 15 μm and coated beforehand with a conduction aid, and dried. This coated foil was pressed by rolling with a pressing machine, and a piece of a shape having an active-material layer size with a width of 30 mm and a length of 40 mm and having a uncoated area with a width of 5 mm and a length of 9 mm was cut out of the rolled sheet. Thus, a positive electrode was obtained.

[Production of Electrolytic Solution]

In a dry argon atmosphere, 99.5 parts by mass of a mixture of ethylene carbonate (EC), dimethyl carbonate (DMC), and ethyl methyl carbonate (EMC) (volume ratio, 30:30:40) was mixed with 0.5 parts by mass of vinylene carbonate (VC). Subsequently, sufficiently dried LiFSO$_3$ and LiPF$_6$ were dissolved therein so as to result in proportions thereof of 0.05 mol/L and 1 mol/L, respectively. Thus, an electrolytic solution was obtained.

[Production of Lithium Secondary Battery]

A sheet battery was produced in the same manner as in Example 1, except that the positive electrode and electrolytic solution described above were used. The battery design is shown in Table 7.

[Evaluation of Initial Discharge Capacity]

The lithium secondary battery was evaluated in the state of being sandwiched between glass plates in order to enhance contact between the electrodes. At 25° C., this battery was charged to 4.0 V at a constant current corresponding to 0.2 C and then discharged to 2.5 V at a constant current of 0.1 C. Two cycles of this charge/discharge were conducted to stabilize the battery. In each of the third to sixth cycles, the battery was charged to 4.0 V at a constant current of 0.2 C, subsequently charged at a constant voltage of 4.0 V until the current value became 0.05 C, and then discharged to 2.5 V at a constant current of 0.2 C. Thereafter, in the seventh cycle, the battery was charged to 4.0 V at a constant current of 0.2 C, subsequently charged at a constant voltage of 4.0 V until the current value became 0.05 C, and then discharged to 2.5 V at a constant current of 0.2 C to determine initial discharge capacity.

[Evaluation of −30° C. Output]

The battery which had undergone the evaluation of initial capacity was charged at 25° C. and a constant current of 0.2 C to a half of the initial discharge capacity. This battery was discharged at −30° C. for 10 seconds at each of 0.2 C, 0.4 C, 0.8 C, 1 C, and 2 C, and the voltage was measured at the time when the 10 seconds had passed. The area of the triangle surrounded by the current-voltage line and the lower-limit voltage (3V) was regarded as output (W). The relative value (%) of the output was calculated, with the output value at −30° C. in Comparative Example 6 being taken as 100. The results of the battery evaluation are shown in Table 8.

[Evaluation of −30° C. Output after High-Temperature Cycling]

At 60° C., the battery which had undergone the evaluation of initial output was charged to 4.1 V at a constant current of 2 C and then discharged to 3.0 V at a constant current of 2 C. This operation was taken as one cycle, and 500 cycles were conducted. The battery which had undergone the cycling was charged at 25° C. and a constant current of 0.2 C to a half of the initial discharge capacity. This battery was discharged at −30° C. at each of 0.2 C, 0.4 C, 0.8 C, 1 C, and 2 C, and the voltage was measured at the time when 2 seconds had passed since the discharge initiation. The area of the triangle surrounded by the current-voltage line and the lower-limit voltage (3 V) was regarded as output (W). The relative value (%) of the output was calculated, with the output value at −30° C. in Comparative Example 6 being taken as 100. The results of the battery evaluation are shown in Table 8.

Comparative Example 8

A sheet-form lithium secondary battery was produced and evaluated in the same manners as in Example 20, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried $LiPF_6$ therein so as to result in a proportion thereof of 1 mol/L. The battery design is shown in Table 7, and the results of the evaluation are shown in Table 8.

Comparative Example 9

A sheet-form lithium secondary battery was produced and evaluated in the same manners as in Example 20, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried lithium trifluoroacetate ($LiCF_3CO_2$) and $LiPF_6$ therein so as to result in proportions thereof of 0.05 mol/L and 1 mol/L, respectively. The battery design is shown in Table 7, and the results of the evaluation are shown in Table 8.

Comparative Example 10

A sheet-form lithium secondary battery was produced and evaluated in the same manners as in Example 20, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried lithium trifluoromethanesulfonate ($LiCF_3SO_3$) and $LiPF_6$ therein so as to result in proportions thereof of 0.05 mol/L and 1 mol/L, respectively. The battery design is shown in Table 7, and the results of the evaluation are shown in Table 8.

Comparative Example 11

A sheet-form lithium secondary battery was produced and evaluated in the same manners as in Example 20, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried lithium bisoxalatoborate ($LiB(C_2O_4)$, LiBOB) and $LiPF_6$ therein so as to result in proportions thereof of 0.05 mol/L and 1 mol/L, respectively. The battery design is shown in Table 7, and the results of the evaluation are shown in Table 8.

Comparative Example 12

A sheet-form lithium secondary battery was produced and evaluated in the same manners as in Example 20, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried lithium bistrifluoromethylsulfonylimide ($LiN(SO_2CF_3)_2$, LiTFSI) and $LiPF_6$ therein so as to result in proportions thereof of 0.05 mol/L and 1 mol/L, respectively. The battery design is shown in Table 7, and the results of the evaluation are shown in Table 8.

TABLE 7

| | Electrolyte (concentration) | Solvent (volume ratio) | Additive (parts by mass) | Positive-electrode active material | $[FSO_3]/[PF_6]$ |
|---|---|---|---|---|---|
| Example 20 | $LiFSO_3$ (0.05M) $LiPF_6$ (1.0M) | EC:DMC:EMC (30:30:40) | VC (0.5) | LFP | 0.050 |
| Comparative Example 8 | $LiPF_6$ (1.0M) | EC:DMC:EMC (30:30:40) | VC (0.5) | LFP | 0.000 |
| Comparative Example 9 | $LiCF_3CO_2$ (0.05M) $LiPF_6$ (1.0M) | EC:DMC:EMC (30:30:40) | VC (0.5) | LFP | 0.000 |
| Comparative Example 10 | $LiCF_3SO_3$ (0.05M) $LiPF_6$ (1.0M) | EC:DMC:EMC (30:30:40) | VC (0.5) | LFP | 0.000 |
| Comparative Example 11 | LiBOB (0.05M) $LiPF_6$ (1.0M) | EC:DMC:EMC (30:30:40) | VC (0.5) | LFP | 0.000 |
| Comparative Example 12 | LiTFSI (0.05M) $LiPF_6$ (1.0M) | EC:DMC:EMC (30:30:40) | VC (0.5) | LFP | 0.000 |

TABLE 8

| | Relative initial −30° C. output; the initial −30° C. output in Comparative Example 8 being taken as 1 | Relative −30° C. output after cycling; the −30° C. output after cycling in Comparative Example 8 being taken as 1 |
|---|---|---|
| Example 20 | 1.20 | 1.21 |
| Comparative Example 8 | 1.00 | 1.00 |
| Comparative Example 9 | 1.13 | 0.81 |
| Comparative Example 10 | 1.13 | 1.04 |
| Comparative Example 11 | 0.66 | 0.89 |
| Comparative Example 12 | 0.95 | 0.99 |

Example 21

Production of Positive Electrode

Eighty percents by mass lithium manganate ($Li_{1.1}Mn_{1.9}Al_{0.1}O_4$, LMO) and 20% by mass $Li_{1.15}Ni_{0.45}Mn_{0.45}Co_{0.10}O_2$(Co-less LNMC) were mixed as positive-electrode active materials with 5% by mass acetylene black as a conductive material and 5% by mass poly(vinylidene fluoride) (PVdF) as a binder in N-methylpyrrolidone solvent to obtain a slurry. The slurry obtained was applied to one surface of an aluminum foil having a thickness of 15 μm and coated beforehand with a conduction aid, and dried. This coated foil was pressed by rolling with a pressing machine, and a piece of a shape having an active-material layer size with a width of 30 mm and a length of 40 mm and having an uncoated area with a width of 5 mm and a length of 9 mm was cut out of the rolled sheet. Thus, a positive electrode was obtained.

[Production of Electrolytic Solution]

In a dry argon atmosphere, a mixture of ethylene carbonate (EC), dimethyl carbonate (DMC), and ethyl methyl carbonate (EMC) (volume ratio, 30:30:40) was prepared. Subsequently, sufficiently dried $LiFSO_3$ and $LiPF_6$ were dissolved therein so as to result in proportions thereof of 0.1 mol/L and 1 mol/L, respectively. Thus, an electrolytic solution was obtained.

[Production of Lithium Secondary Battery]

A sheet battery was produced in the same manner as in Example 1, except that the positive electrode and electrolytic solution described above were used. The battery design is shown in Table 9.

[Evaluation of Initial Discharge Capacity]

The lithium secondary battery was evaluated in the state of being sandwiched between glass plates in order to enhance contact between the electrodes. At 25° C., this battery was charged to 4.2 V at a constant current corresponding to 0.1 C and then discharged to 3.0 V at a constant current of 0.1 C. In the second and third cycles, the battery was charged to 4.2 V at 0.33 C, subsequently charged at a constant voltage of 4.2 V until the current value became 0.05 C, and then discharged to 3.0 V at a constant current of 0.33 C. The initial discharge capacity was determined from the results obtained in the third-cycle discharge.

[Evaluation of Initial Output]

The battery which had undergone the evaluation of initial capacity was charged at 25° C. and a constant current of 0.33 C to a half of the initial discharge capacity. This battery was discharged at 25° C. for 10 seconds at each of 1 C, 2 C, 3 C, 5 C, 10 C, 15 C, and 20 C, and the voltage was measured at the time when the 10 seconds had passed. The area of the triangle surrounded by the current-voltage line and the lower-limit voltage (3 V) was regarded as output (W).

[Evaluation of High-Temperature Storability]

The battery which had undergone the test for evaluating initial discharge capacity was charged to 4.2 V at a constant current of 0.33 C and then charged at a constant voltage of 4.2 V until the current value became 0.05 C. This battery was stored at 75° C. for 24 hours, cooled to room temperature, and then discharged at 25° C. to 3.0 V at a constant current of 0.33 C to determine the residual capacity. Thereafter, the recovery capacity of this battery was determined through a test in which the battery was charged to 4.2 V at a constant current of 0.33 C, subsequently charged at a constant voltage of 4.2 V until the current value became 0.05 C, and then discharged to 3.0 V at a constant current of 0.33 C. Finally, the capacity retention after storage (%) was determined by calculating (recovery capacity)÷(initial discharge capacity)×100. The results of the battery evaluation are shown in Table 10.

[Evaluation of Output after High-Temperature Storage]

The battery which had undergone the high-temperature storage test was charged at 25° C. and a constant current of 0.33 C to a half of the initial discharge capacity. This battery was discharged at 25° C. at each of 1 C, 2 C, 3 C, 5 C, 10 C, 15 C, and 20 C, and the voltage was measured at the time when 10 seconds had passed since the discharge initiation. The area of the triangle surrounded by the current-voltage line and the lower-limit voltage (3 V) was regarded as output (W). Finally, the relative value of the output obtained after the high-temperature storage test, when the value of initial output was taken as 1, was calculated. The results of the battery evaluation are shown in Table 10.

Example 22

A sheet-form lithium secondary battery was produced and evaluated in the same manners as in Example 21, except that an electrolytic solution was obtained in a dry argon atmosphere by mixing ethylene carbonate (EC), dimethyl carbonate (DMC), and ethyl methyl carbonate (EMC) (volume ratio, 30:30:40) and then dissolving sufficiently dried $LiFSO_3$, lithium bisoxalatoborate ($LiB(C_2O_4)$, LiBOB), and $LiPF_6$ therein so as to result in proportions thereof 0.1 mol/L, 0.1 mol/L, and 1 mol/L, respectively. The battery design is shown in Table 9, and the results of the evaluation are shown in Table 10.

Example 23

A sheet-form lithium secondary battery was produced and evaluated in the same manners as in Example 21, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried $LiFSO_3$ and $LiPF_6$ therein so as to result in proportions thereof of 0.1 mol/L and 1 mol/L, respectively. The battery design is shown in Table 9, and the results of the evaluation are shown in Table 10.

Example 24

A sheet-form lithium secondary battery was produced and evaluated in the same manners as in Example 21, except that an electrolytic solution was obtained in a dry argon atmosphere by mixing 99 parts by mass of a mixture of ethylene carbonate (EC), dimethyl carbonate (DMC), and ethyl methyl carbonate (EMC) (volume ratio, 30:30:40) with 1.0 part by mass of hexamethylene diisocyanate (HMDI) and then dissolving sufficiently dried $LiFSO_3$ and $LiPF_6$ therein so as to result in proportions thereof of 0.1 mol/L and 1 mol/L, respectively. The battery design is shown in Table 9, and the results of the evaluation are shown in Table 10.

Comparative Example 13

A sheet-form lithium secondary battery was produced and evaluated in the same manners as in Example 21, except that an electrolytic solution was obtained in a dry argon atmosphere by preparing a mixture of ethylene carbonate (EC), dimethyl carbonate (DMC), and ethyl methyl carbonate (EMC) (volume ratio, 30:30:40) and then dissolving sufficiently dried $LiPF_6$ therein so as to result in a proportion thereof of 1 mol/L. The battery design is shown in Table 9, and the results of the evaluation are shown in Table 10.

Comparative Example 14

A sheet-form lithium secondary battery was produced and evaluated in the same manners as in Example 21, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving $LiPF_6$ therein so as to result in a proportion thereof of 1 mol/L. The battery design is shown in Table 9, and the results of the evaluation are shown in Table 10.

TABLE 9

|  | Electrolyte (concentration) | Solvent (volume ratio) | Additive (parts by mass) | Positive-electrode active material | $[FSO_3]/[PF_6]$ |
|---|---|---|---|---|---|
| Example 21 | $LiFSO_3$ (0.1M) $LiPF_6$ (1.0M) | EC:DMC:EMC (30:30:40) | none | LMO Co-less LNMC | 0.100 |
| Example 22 | $LiFSO_3$ (0.1M) LiBOB (0.1M) $LiPF_6$ (1.0M) | EC:DMC:EMC (30:30:40) | none | LMO Co-less LNMC | 0.100 |
| Example 23 | $LiFSO_3$ (0.1M) $LiPF_6$ (1.0M) | EC:DMC:EMC (30:30:40) | VC (0.5) | LMO Co-less LNMC | 0.100 |
| Example 24 | $LiFSO_3$ (0.1M) $LiPF_6$ (1.0M) | EC:DMC:EMC (30:30:40) | HMDI (1.0) | LMO Co-less LNMC | 0.100 |
| Comparative Example 13 | $LiPF_6$ (1.0M) | EC:DMC:EMC (30:30:40) | none | LMO Co-less LNMC | 0.000 |
| Comparative Example 14 | $LiPF_6$ (1.0M) | EC:DMC:EMC (30:30:40) | VC (0.5) | LMO Co-less LNMC | 0.000 |

TABLE 10

|  | Residual capacity after 60° C. storage (mAh/g) | Recovery capacity after 60° C. storage (mAh/g) | Capacity retention after storage (%) | Relative 25° C. output after storage; the 25° C. output before storage being taken as 1 |
|---|---|---|---|---|
| Example 21 | 90.7 | 97.4 | 77.8 | 0.90 |
| Example 22 | 91.1 | 98.6 | 80.9 | 0.96 |
| Example 23 | 92.0 | 97.8 | 78.1 | 0.90 |
| Example 24 | 87.0 | 96.4 | 90.4 | 1.07 |
| Comparative Example 13 | 83.8 | 92.2 | 71.9 | 0.83 |
| Comparative Example 14 | 86.3 | 93.1 | 73.6 | 0.85 |

Example 25

A sheet-form lithium secondary battery was produced in the same manner as in Example 1, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried $LiFSO_3$ and $LiPF_6$ therein so as to result in proportions thereof of 0.1 mol/L and 1 mol/L, respectively, and that the battery came into a fully charged state at 4.4 V. The battery design is shown in Table 11.

[Evaluation of Initial Discharge Capacity]

The lithium secondary battery was evaluated in the state of being sandwiched between glass plates in order to enhance contact between the electrodes. At 25° C., this battery was charged to 4.1 V at a constant current corresponding to 0.2 C and then discharged to 3.0 V at a constant current of 0.2 C. Two cycles of this charge/discharge were conducted to stabilize the battery. In the third cycle, the battery was charged to 4.4 V at a constant current of 0.2 C, subsequently charged at a constant voltage of 4.4 V until the current value became 0.05 C, and then discharged to 3.0 V at a constant current of 0.2 C. Thereafter, in the fourth cycle, the battery was charged to 4.4 V at a constant current of 0.2 C, subsequently charged at a constant voltage of 4.4 V until the current value became 0.05

C, and then discharged to 3.0 V at a constant current of 0.2 C to determine initial discharge capacity.

[Evaluation of High-Temperature Storability]

The battery which had undergone the test for evaluating initial discharge capacity was charged to 4.4 V at a constant current of 0.2 C and then charged at a constant voltage of 4.4 V until the current value became 0.05 C. This battery was stored at 75° C. for 120 hours, subsequently cooled, and then discharged at 25° C. to 3 V at a constant current of 0.2 C to determine the residual capacity. Thereafter, the recovery capacity of this battery was determined through a test in which the battery was charged to 4.4 V at a constant current of 0.2 C, subsequently charged at a constant voltage of 4.4 V until the current value became 0.05 C, and then discharged to 3 V at a constant current of 0.2 C. Finally, the capacity retention after storage (%) was determined by calculating (recovery capacity)÷(initial discharge capacity)×100. The results of the evaluation are shown in Table 12.

Example 26

A sheet-form lithium secondary battery was produced and evaluated in the same manners as in Example 25, except that an electrolytic solution was obtained in a dry argon atmosphere by mixing 99 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and 0.5 parts by mass of 1,3-propanesultone (PS) and then dissolving sufficiently dried LiFSO$_3$ and LiPF$_6$ therein so as to result in proportions thereof of 0.1 mol/L and 1 mol/L, respectively. The battery design is shown in Table 11, and the results of the evaluation are shown in Table 12.

Example 27

A sheet-form lithium secondary battery was produced and evaluated in the same manners as in Example 25, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried tetraethylammonium fluorosulfonate (TEAFSO$_3$) and LiPF$_6$ therein so as to result in proportions thereof of 0.05 mol/L and 1 mol/L, respectively. The battery design is shown in Table 11, and the results of the evaluation are shown in Table 12.

Example 28

A sheet-form lithium secondary battery was produced and evaluated in the same manners as in Example 25, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried tetraethylammonium fluorosulfonate (TEAFSO$_3$) and LiPF$_6$ therein so as to result in proportions thereof of 0.1 mol/L and 1 mol/L, respectively. The battery design is shown in Table 11, and the results of the evaluation are shown in Table 12.

Example 29

A sheet-form lithium secondary battery was produced and evaluated in the same manners as in Example 25, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried tetrabuthylammonium fluorosulfonate (TBAFSO$_3$) and LiPF$_6$ therein so as to result in proportions thereof of 0.05 mol/L and 1 mol/L, respectively. The battery design is shown in Table 11, and the results of the evaluation are shown in Table 12.

Example 30

A sheet-form lithium secondary battery was produced and evaluated in the same manners as in Example 25, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried tetrabuthylammonium fluorosulfonate (TBAFSO$_3$) and LiPF$_6$ therein so as to result in proportions thereof of 0.1 mol/L and 1 mol/L, respectively. The battery design is shown in Table 11, and the results of the evaluation are shown in Table 12.

Comparative Example 15

A sheet-form lithium secondary battery was produced and evaluated in the same manners as in Example 25, except that an electrolytic solution was obtained in a dry argon atmosphere by mixing 99.5 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and then dissolving sufficiently dried LiPF$_6$ therein so as to result in a proportion thereof of 1 mol/L. The battery design is shown in Table 11, and the results of the evaluation are shown in Table 12.

Comparative Example 16

A sheet-form lithium secondary battery was produced and evaluated in the same manners as in Example 25, except that an electrolytic solution was obtained in a dry argon atmosphere by mixing 99 parts by mass of a mixture of ethylene carbonate (EC), dimethyl carbonate (DMC), and ethyl methyl carbonate (EMC) (volume ratio, 30:30:40) with 0.5 parts by mass of vinylene carbonate (VC) and 0.5 parts by mass of 1,3-propanesultone(PS) and then dissolving sufficiently dried LiPF$_6$ therein so as to result in a proportion thereof of 1 mol/L. The battery design is shown in Table 11, and the results of the evaluation are shown in Table 12.

TABLE 11

|  | Electrolyte (concentration) | Solvent (volume ratio) | Additive (parts by mass) | Positive-electrode active material (evaluation voltage) | [FSO₃]/ [PF₆] |
|---|---|---|---|---|---|
| Example 25 | LiFSO₃ (0.1M) LiPF₆ (1.0M) | EC:DMC:EMC (30:30:40) | VC (0.5) | LNMC (4.4V) | 0.100 |
| Example 26 | LiFSO₃ (0.1M) LiPF₆ (1.0M) | EC:DMC:EMC (30:30:40) | VC (0.5) PS (0.5) | LNMC (4.4V) | 0.100 |
| Example 27 | TEAFSO₃ (0.05M) LiPF₆ (1.0M) | EC:DMC:EMC (30:30:40) | VC (0.5) | LNMC (4.4V) | 0.050 |
| Example 28 | TEAFSO₃ (0.1M) LiPF₆ (1.0M) | EC:DMC:EMC (30:30:40) | VC (0.5) | LNMC (4.4V) | 0.100 |
| Example 29 | TBAFSO₃ (0.05M) LiPF₆ (1.0M) | EC:DMC:EMC (30:30:40) | VC (0.5) | LNMC (4.4V) | 0.050 |
| Example 30 | TBAFSO₃ (0.1M) LiPF₆ (1.0M) | EC:DMC:EMC (30:30:40) | VC (0.5) | LNMC (4.4V) | 0.100 |
| Comparative Example 15 | LiPF₆ (1.0M) | EC:DMC:EMC (30:30:40) | VC (0.5) | LNMC (4.4V) | 0.000 |
| Comparative Example 16 | LiPF₆ (1.0M) | EC:DMC:EMC (30:30:40) | VC (0.5) PS (0.5) | LNMC (4.4V) | 0.000 |

TABLE 12

|  | Battery capacity before storage (mAh/g) | After 75° C. 120-hour storage ||||
|---|---|---|---|---|---|
|  |  | Residual capacity (mAh/g) | Recovery capacity (mAh/g) | Capacity retention (%) | Relative −30° C. output after storage; the −30° C. output before storage in Comparative Example 14 being taken as 1 |
| Example 25 | 179.1 | 138.0 | 157.1 | 77.1 | 1.13 |
| Example 26 | 179.6 | 139.5 | 159.0 | 77.7 | 1.10 |
| Example 27 | 177.6 | 130.3 | 151.0 | 73.4 | 1.18 |
| Example 28 | 176.1 | 132.8 | 152.3 | 75.4 | 1.13 |
| Example 29 | 178.0 | 132.4 | 153.0 | 74.4 | 1.13 |
| Example 30 | 177.8 | 136.7 | 156.4 | 76.9 | 1.17 |
| Comparative Example 15 | 178.9 | 123.7 | 147.3 | 69.1 | 1.00 |
| Comparative Example 16 | 179.3 | 127.9 | 150.4 | 71.3 | 0.76 |

As apparent from the Examples and Comparative Examples given above, the batteries each employing a nonaqueous electrolytic solution according to the invention are superior in initial discharge capacity, impedance characteristics, and output characteristics to the batteries each employing a nonaqueous electrolytic solution which is not a nonaqueous electrolytic solution according to the invention. In addition, the former batteries are satisfactory also with respect to cycle characteristics, storage durability, and output characteristics determined after the durability test. It can be seen that the invention produces excellent effects on overall battery characteristics. Namely, those characteristics are improved by regulating the ratio of the molar content of $FSO_3$ derived from the fluorosulfonic acid salt ([$FSO_3$]) to the molar content of $PF_6$ derived from $LiPF_6$ ([$PF_6$]), i.e., [$FSO_3$]/[$PF_6$], so as to be within the range according to the invention. The cation used in the fluorosulfonic acid salt may be any of metals represented by lithium, a quaternary ammonium, and a quaternary phosphonium. Even when aids such as, for example, a carbonate having an unsaturated bond, a carbonate having fluorine atoms, a nitrile compound, an isocyano compound, and a cyclic sulfonic acid ester have been added, the effects according to the invention are maintained. Furthermore, even when another electrolyte has been incorporated besides $LiPF_6$ and the fluorosulfonic acid salt, the effects of the invention are produced so long as the amount of the optional electrolyte is within the range according to the invention. Moreover, it can be understood that the effects of the invention are produced even when the invention is applied to various battery voltages or to any electrode active material.

While the invention has been described in detail and with reference to specific embodiments thereof, it will be apparent to one skilled in the art that various changes and modifications can be made therein without departing from the spirit and scope thereof. This application is based on a Japanese patent application filed on Feb. 12, 2010 (Application No. 2010-029484), the contents thereof being incorporated herein by reference.

INDUSTRIAL APPLICABILITY

According to the nonaqueous electrolytic solution of the invention, it is possible to improve the initial charge capacity and input/output characteristics of a nonaqueous-electrolyte secondary battery. The nonaqueous-electrolyte secondary battery employing the nonaqueous electrolytic solution of the invention has a high capacity retention and excellent input/output performance even after a durability test, such as a high-temperature storage test or a cycle test, and further has excellent low-temperature input/output characteristics. This battery hence is useful. Consequently, the nonaqueous electrolytic solution of the invention and the nonaqueous-electrolyte secondary battery which employs the electrolytic solution can be used in various known applications. Examples thereof include notebook type personal computers, pen-input personal computers, mobile personal computers, electronic-book players, portable telephones, portable facsimile telegraphs, portable copiers, portable printers, headphone stereos, video movie cameras, liquid-crystal TVs, handy cleaners, portable CD players, mini-disk players, transceivers, electronic pocketbooks, electronic calculators, memory cards, portable tape recorders, radios, backup power sources, motors, motor vehicles, motor cycles, bicycles fitted with a motor, bicycles, illuminators, toys, game machines, clocks and watches, power tools, stroboscopes, cameras, power sources for load leveling, and power sources for storing natural energy.

The invention claimed is:

1. A nonaqueous electrolytic solution which comprises: a nonaqueous solvent; $LiPF_6$; and a fluorosulfonic acid salt represented by formula (I):

wherein M is a metal atom, $N(R)_4$, or $P(R)_4$, wherein R is either an organic group having 1-12 carbon atoms or a hydrogen atom, not all of the four R's are hydrogen atoms, the R's may be the same or different, and a part or all of the four R's may form a ring in cooperation with the nitrogen atom or phosphorus atom to which the R's have been bonded;

when M is a metal atom, x indicates the valence of the metal atom M and is an integer of 1 or larger; and when M is $N(R)_4$ or $P(R)_4$, x is 1, wherein the ratio of the molar content of $FSO_3$ in the nonaqueous electrolytic solution to the molar content of $PF_6$ in the nonaqueous electrolytic solution is 0.001-1.2.

2. The nonaqueous electrolytic solution according to claim 1, wherein the molar content of $FSO_3$ in the nonaqueous electrolytic solution is 0.0005-0.5 mol/L.

3. The nonaqueous electrolytic solution according to claim 1, wherein the fluorosulfonic acid salt represented by formula (1) is lithium fluorosulfonate.

4. The nonaqueous electrolytic solution according to claim 1, which comprises a cyclic carbonate having a fluorine atom.

5. The nonaqueous electrolytic solution according to claim 4, which comprises the cyclic carbonate having a fluorine atom in the nonaqueous electrolytic solution in an amount of 0.001-85% by mass.

6. The nonaqueous electrolytic solution according to claim 1, which comprises a cyclic carbonate having a carbon-carbon unsaturated bond.

7. The nonaqueous electrolytic solution according to claim 6, which comprises the cyclic carbonate having a carbon-carbon unsaturated bond in the nonaqueous electrolytic solution in an amount of 0.001-10% by mass.

8. The nonaqueous electrolytic solution according to claim 1, which comprises a cyclic sulfonic acid ester.

9. The nonaqueous electrolytic solution according to claim 8, which comprises the cyclic sulfonic acid ester in the nonaqueous electrolytic solution in an amount of 0.001-10% by mass.

10. The nonaqueous electrolytic solution according to claim 1, which comprises a compound having a cyano group.

11. The nonaqueous electrolytic solution according to claim 10, which comprises the compound having a cyano group in the nonaqueous electrolytic solution in an amount of 0.001-10% by mass.

12. The nonaqueous electrolytic solution according to claim 1, which comprises a diisocyanate compound.

13. The nonaqueous electrolytic solution according to claim 12, which comprises the diisocyanate compound in the nonaqueous electrolytic solution in an amount of 0.001-5% by mass.

14. The nonaqueous electrolytic solution according to claim 1, which comprises at least one fluorophosphoric acid lithium salt other than $LiPF_6$ and lithium imide salts.

15. The nonaqueous electrolytic solution according to claim 1, which comprises a lithium salt having an oxalic acid group.

16. The nonaqueous electrolytic solution according to claim 14, wherein the concentration of the at least one fluorophosphoric acid lithium salt other than $LiPF_6$ and lithium imide salts in the nonaqueous electrolytic solution is 0.0005-0.5 mol/L.

17. The nonaqueous electrolytic solution according to claim 15, wherein the concentration of the lithium salt having an oxalic acid group in the nonaqueous electrolytic solution is 0.0005-0.5 mol/L.

18. The nonaqueous electrolytic solution according to claim 1, wherein a ratio of a molar content of $FSO_3$ to a molar content of $PF_6$ ($[FSO_3]/[PF_6]$) in the nonaqueous electrolytic solution is 0.01-1.2.

19. The nonaqueous electrolytic solution according to claim 1, which is obtained by adding the $LiPF_6$ and the fluorosulfonic acid salt represented by formula (1) to the nonaqueous solvent.

20. The nonaqueous electrolytic solution according to claim 1, which is a nonaqueous electrolytic solution before housing in a case.

21. A nonaqueous-electrolyte secondary battery which comprises: a negative electrode and a positive electrode that are capable of occluding and releasing lithium ions; and the nonaqueous electrolytic solution according to claim 1.

22. The nonaqueous-electrolyte secondary battery according to claim 21, wherein the negative electrode comprises a current collector and a negative-electrode active-material layer disposed on the current collector, the negative-electrode active-material layer containing a negative-electrode active material which comprises at least one member selected from an elemental metal, alloys and compounds of silicon, and an elemental metal, alloys and compounds of tin.

23. The nonaqueous-electrolyte secondary battery according to claim 21, wherein the negative electrode comprises a current collector and a negative-electrode active-material layer disposed on the current collector, the negative-electrode active-material layer containing a negative-electrode active material which comprises a carbonaceous material.

24. The nonaqueous-electrolyte secondary battery according to claim 21, wherein the negative electrode comprises a current collector and a negative-electrode active-material layer disposed on the current collector, the negative-electrode active-material layer containing a negative-electrode active material which comprises a lithium-titanium composite oxide.

25. The nonaqueous-electrolyte secondary battery according to claim 21, wherein the positive electrode comprises a current collector and a positive-electrode active-material layer disposed on the current collector, the positive-electrode active-material layer containing one member selected from the group consisting of lithium-cobalt composite oxides, lithium-manganese composite oxides, lithium-cobalt-manganese composite oxides, lithium-nickel composite oxides, lithium-cobalt-nickel composite oxides, lithium-nickel-manganese composite oxides, and lithium-nickel-cobalt-manganese composite oxides.

26. The nonaqueous-electrolyte secondary battery according to claim 21, wherein the positive electrode comprises a current collector and a positive-electrode active-material layer disposed on the current collector, the positive-electrode active-material layer containing $Li_xMPO_4$ (M is one element selected from the group consisting of the Group-4 to Group-11 transition metals belonging to the fourth period of the periodic table, and x satisfies 0<x<1.2).

27. The nonaqueous electrolytic solution according to claim 1, wherein the $LiPF_6$ is present in a molar amount of from 0.5 M to 1.0 M and the fluorosulfonic acid salt is present in an amount of from 0.01 M to 0.5 M.

28. The nonaqueous electrolytic solution of claim 27, wherein the nonaqueous solvent comprises at least one selected from the group consisting of ethylene carbonate, dimethyl carbonate, ethyl methyl carbonate and vinyl carbonate.

29. The nonaqueous-electrolyte secondary battery of claim 21, having an initial discharge of 139.0-141.8 mAh/g.

30. The nonaqueous-electrolyte secondary battery of claim 21, having an initial impedance of 0.67 to 0.77 in comparison to a nonaqueous-electrolyte secondary battery that contains an electrolyte containing only $LiPF_6$.

* * * * *